US010033966B2

(12) United States Patent
Inoue et al.

(10) Patent No.: US 10,033,966 B2
(45) Date of Patent: Jul. 24, 2018

(54) INFORMATION PROCESSING APPARATUS, COMMUNICATION SYSTEM, AND INFORMATION PROCESSING METHOD

(71) Applicants: Takeru Inoue, Kanagawa (JP); Yoshinaga Kato, Kanagawa (JP); Atsuhiro Fujii, Kanagawa (JP)

(72) Inventors: Takeru Inoue, Kanagawa (JP); Yoshinaga Kato, Kanagawa (JP); Atsuhiro Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/597,640

(22) Filed: May 17, 2017

(65) Prior Publication Data

US 2017/0339370 A1 Nov. 23, 2017

(30) Foreign Application Priority Data

May 20, 2016 (JP) .................. 2016-101311
Jun. 22, 2016 (JP) .................. 2016-123948

(51) Int. Cl.
*H04N 7/14* (2006.01)
*H04N 5/77* (2006.01)
(Continued)

(52) U.S. Cl.
CPC .......... *H04N 7/147* (2013.01); *G06F 3/0488* (2013.01); *H04N 5/38* (2013.01); *H04N 5/44* (2013.01); *H04N 5/772* (2013.01)

(58) Field of Classification Search
USPC ..................................... 348/14.03
See application file for complete search history.

(56) References Cited

U.S. PATENT DOCUMENTS 6,701,095 B1  3/2004 Fujimoto et al.
9,077,850 B1*  7/2015 Groves ............... H04N 7/155
(Continued)

FOREIGN PATENT DOCUMENTS

JP   2010-147820   7/2010
JP   2011-216984   10/2011
(Continued)

OTHER PUBLICATIONS

U.S. Appl. No. 15/372,535, filed Dec. 8, 2016.
(Continued)

*Primary Examiner* — Amal Zenati
(74) *Attorney, Agent, or Firm* — Oblon, McClelland, Maier & Neustadt, L.L.P.

(57) ABSTRACT

An information processing apparatus includes: a transmitter to transmit content data to one or more counterpart information processing apparatuses through a network to have a communication with the one or more counterpart information processing apparatuses, the content data being at least one of image data and audio data; a receiver to receive, from a first information processing apparatus of the one or more counterpart information processing apparatuses, a recording start notification indicating that the first counterpart information processing apparatus starts recording or is recording the content data that is transmitted from the information processing apparatus, the recording start notification being transmitted with first identification information of the first counterpart information processing apparatus that is recording; and circuitry to output, based on the recording start notification, notification information indicating that recording of the communication is being performed, in association with information regarding the first counterpart information processing apparatus.

15 Claims, 34 Drawing Sheets

(51) Int. Cl.
*H04N 5/38* (2006.01)
*H04N 5/44* (2011.01)
*G06F 3/0488* (2013.01)

(56) References Cited

U.S. PATENT DOCUMENTS

| | | |
|---|---|---|
| 2003/0036909 A1 | 2/2003 | Kato |
| 2003/0218642 A1 | 11/2003 | Sakayori et al. |
| 2005/0078967 A1 | 4/2005 | Fujimoto et al. |
| 2005/0149863 A1 | 7/2005 | Kato et al. |
| 2005/0246604 A1 | 11/2005 | Fujimoto et al. |
| 2006/0181750 A1 | 8/2006 | Lu et al. |
| 2006/0274388 A1 | 12/2006 | Miyazawa et al. |
| 2007/0058210 A1 | 3/2007 | Sakuramata et al. |
| 2007/0058226 A1 | 3/2007 | Lu et al. |
| 2007/0070470 A1 | 3/2007 | Takami et al. |
| 2007/0070472 A1 | 3/2007 | Kato et al. |
| 2007/0070473 A1 | 3/2007 | Lu et al. |
| 2007/0091394 A1 | 4/2007 | Sakayori et al. |
| 2007/0115491 A1 | 5/2007 | Kato et al. |
| 2007/0133015 A1 | 6/2007 | Saeki et al. |
| 2007/0133073 A1 | 6/2007 | Shida et al. |
| 2007/0139707 A1 | 6/2007 | Takami et al. |
| 2007/0157084 A1 | 7/2007 | Yano et al. |
| 2007/0165105 A1* | 7/2007 | Lengeling ............ H04N 7/147 348/14.08 |
| 2009/0033972 A1 | 2/2009 | Kato |
| 2009/0036056 A1 | 2/2009 | Oshima et al. |
| 2009/0052348 A1 | 2/2009 | Kato et al. |
| 2009/0068998 A1 | 3/2009 | Kato |
| 2010/0046044 A1 | 2/2010 | Ishizu et al. |
| 2010/0066749 A1 | 3/2010 | Mihara et al. |
| 2010/0067049 A1 | 3/2010 | Kawada et al. |
| 2010/0069006 A1 | 3/2010 | Oshima et al. |
| 2011/0205331 A1 | 8/2011 | Kato |
| 2011/0292445 A1 | 12/2011 | Kato |
| 2012/0026279 A1 | 2/2012 | Kato |
| 2012/0026529 A1 | 2/2012 | Sakuramata et al. |
| 2012/0069132 A1 | 3/2012 | Kato |
| 2012/0072895 A1 | 3/2012 | Koyama et al. |
| 2012/0140021 A1 | 6/2012 | Tanaka et al. |
| 2012/0140022 A1 | 6/2012 | Kato et al. |
| 2012/0185685 A1 | 7/2012 | Volmat et al. |
| 2013/0060926 A1 | 3/2013 | Kato et al. |
| 2013/0070297 A1 | 3/2013 | Kato |
| 2013/0242030 A1 | 9/2013 | Kato et al. |
| 2013/0242033 A1 | 9/2013 | Kato et al. |
| 2013/0242034 A1 | 9/2013 | Kato et al. |
| 2013/0249773 A1 | 9/2013 | Kato |
| 2013/0250354 A1 | 9/2013 | Kato et al. |
| 2013/0271557 A1 | 10/2013 | Kato et al. |
| 2014/0015917 A1 | 1/2014 | Kato |
| 2014/0043431 A1 | 2/2014 | Kato |
| 2014/0049597 A1 | 2/2014 | Inoue |
| 2014/0071225 A1 | 3/2014 | Uchiyama et al. |
| 2014/0074932 A1 | 3/2014 | Mihara et al. |
| 2014/0077937 A1 | 3/2014 | Kato et al. |
| 2014/0101721 A1 | 4/2014 | Nagase et al. |
| 2014/0104373 A1 | 4/2014 | Kato et al. |
| 2014/0118476 A1 | 5/2014 | Nagase et al. |
| 2014/0137193 A1 | 5/2014 | Inoue |
| 2014/0204833 A1 | 7/2014 | Negishi et al. |
| 2014/0253676 A1 | 9/2014 | Nagase et al. |
| 2014/0267585 A1 | 9/2014 | Naakafuji et al. |
| 2014/0288978 A1 | 9/2014 | Ishigami et al. |
| 2014/0292816 A1 | 10/2014 | Shigemasa et al. |
| 2014/0298311 A1 | 10/2014 | Abe et al. |
| 2016/0021340 A1 | 1/2016 | Kato |
| 2016/0077783 A1 | 3/2016 | Kato |
| 2016/0105490 A1 | 4/2016 | Kato et al. |
| 2016/0105642 A1 | 4/2016 | Nagase et al. |
| 2016/0127686 A1 | 5/2016 | Nagase et al. |
| 2016/0149960 A1 | 5/2016 | Kato |
| 2016/0165180 A1 | 6/2016 | Kato et al. |
| 2016/0259434 A1 | 9/2016 | Kato |
| 2016/0294571 A1 | 10/2016 | Kato et al. |
| 2016/0295162 A1 | 10/2016 | Kato |
| 2016/0295354 A1 | 10/2016 | Kato et al. |
| 2016/0295626 A1 | 10/2016 | Kato et al. |
| 2016/0316099 A1 | 10/2016 | Kato |
| 2016/0330253 A1 | 11/2016 | Inoue |
| 2016/0343347 A1 | 11/2016 | Kato |
| 2016/0352787 A1 | 12/2016 | Kato |
| 2016/0366371 A1 | 12/2016 | Kato et al. |
| 2016/0381094 A1 | 12/2016 | Inoue |
| 2017/0013234 A1 | 1/2017 | Inoue |
| 2017/0017592 A1 | 1/2017 | Kato |
| 2017/0064252 A1 | 3/2017 | Inoue et al. |
| 2017/0085717 A1 | 3/2017 | Kawahara et al. |
| 2017/0090843 A1 | 3/2017 | Kato et al. |
| 2017/0111405 A1 | 4/2017 | Kato |

FOREIGN PATENT DOCUMENTS

| | | |
|---|---|---|
| JP | 2014-021790 | 2/2014 |
| JP | 2014-042259 | 3/2014 |
| JP | 2017-046192 | 3/2017 |

OTHER PUBLICATIONS

U.S. Appl. No. 15/449,012, filed Mar. 3, 2017.
U.S. Appl. No. 15/436,388, filed Feb. 17, 2017.
U.S. Appl. No. 15/439,334, filed Aug. 19, 2015.
U.S. Appl. No. 15/324,018, filed Jan. 5, 2017.
U.S. Appl. No. 15/501,113, filed Feb. 1, 2017.
Extended European Search Report dated Sep. 25, 2017 in Patent Application No. 17169585.1.

* cited by examiner

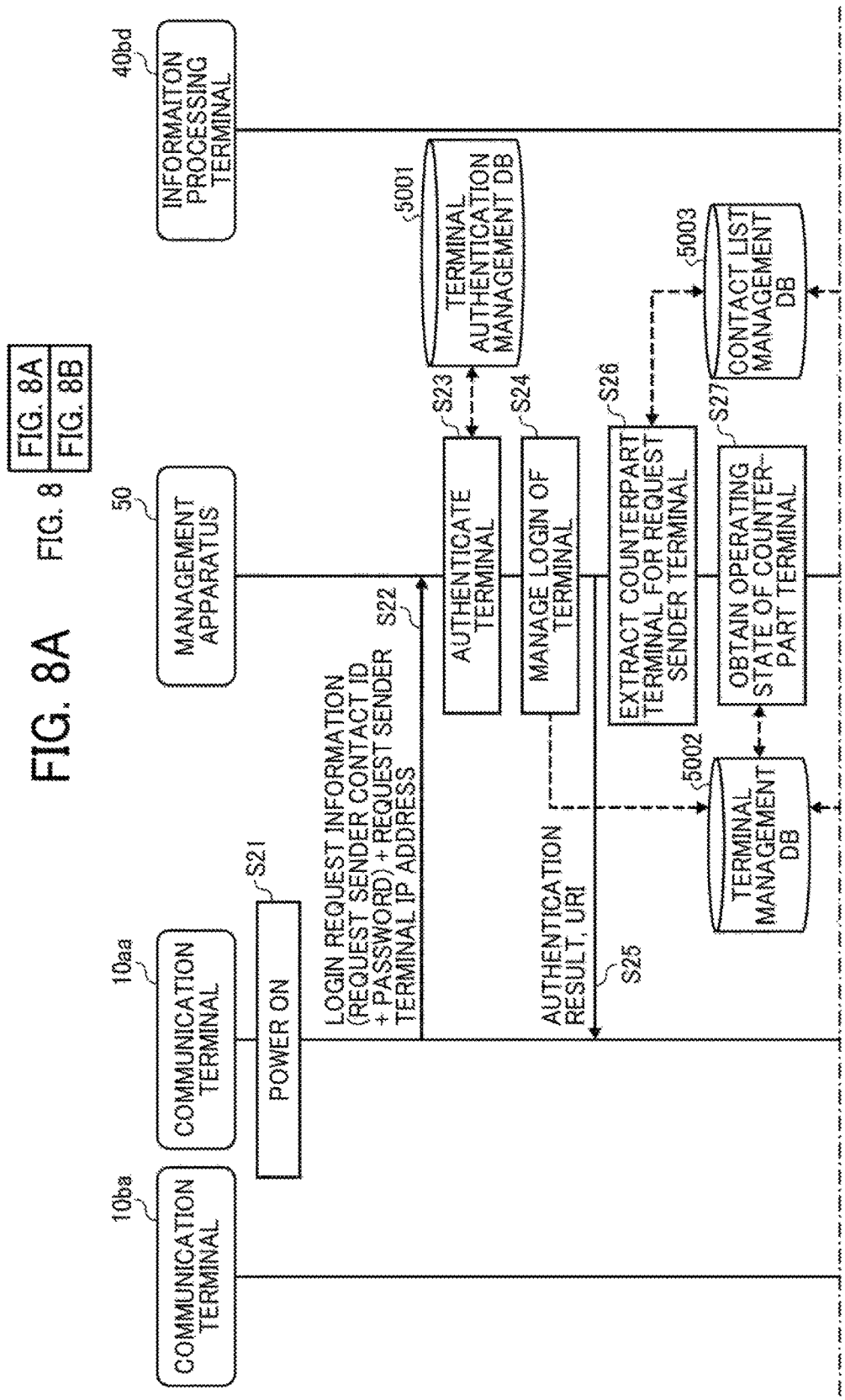

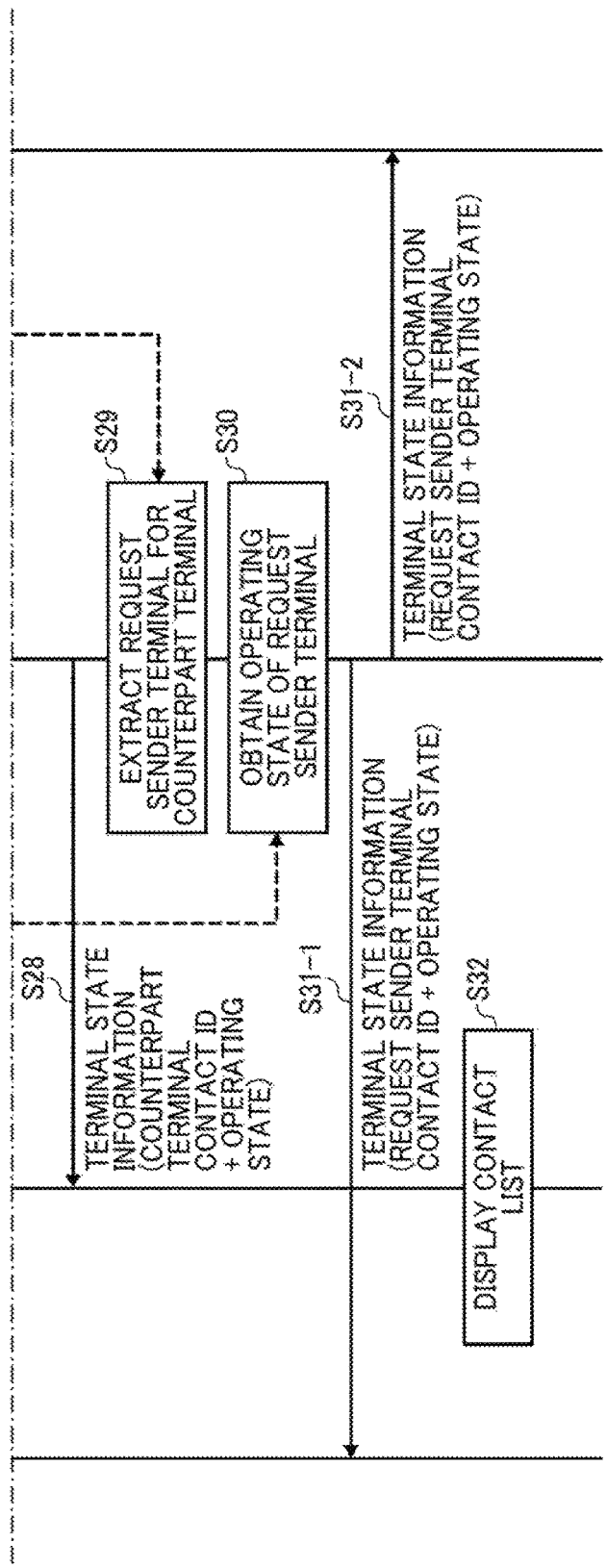

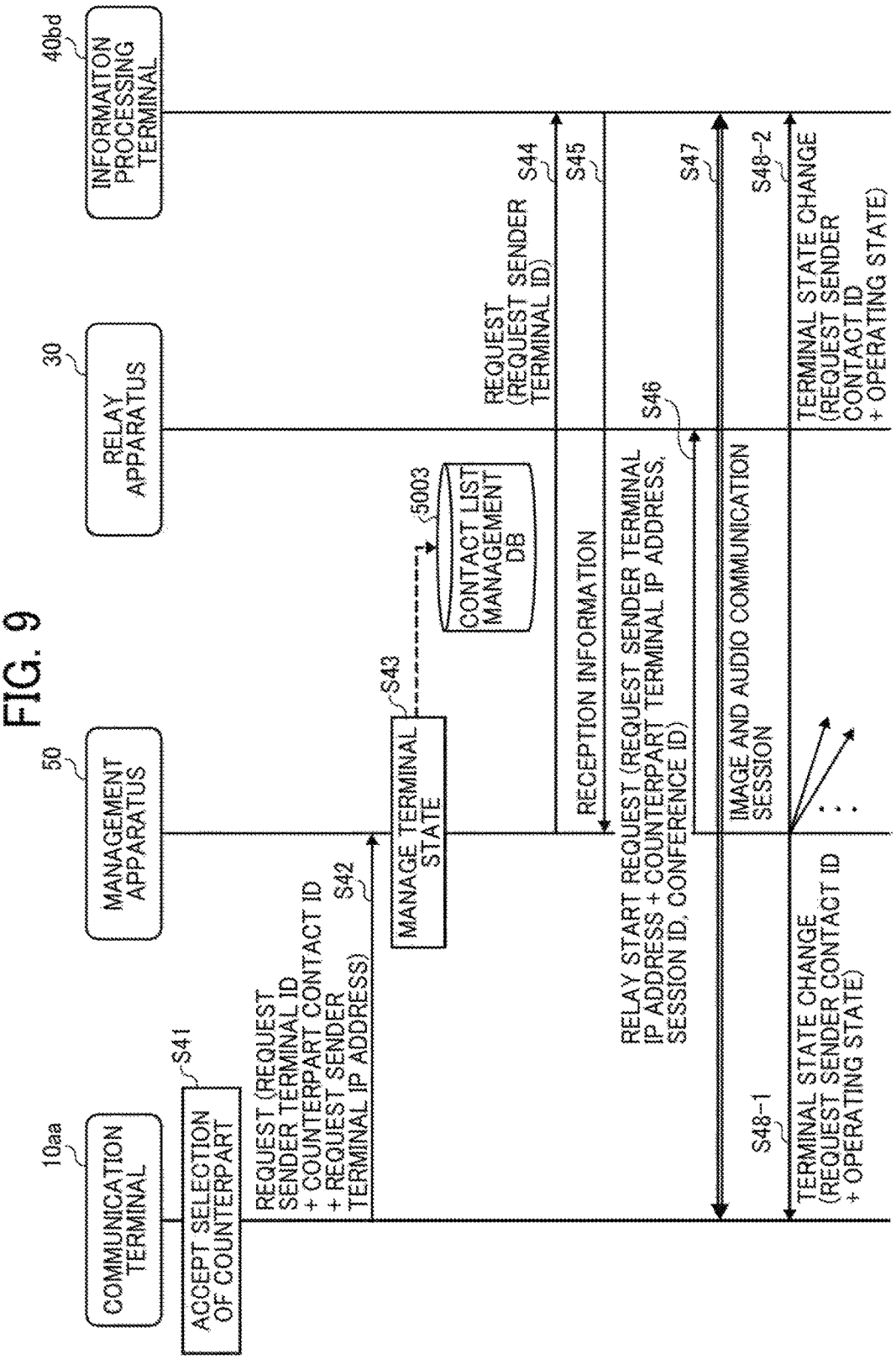

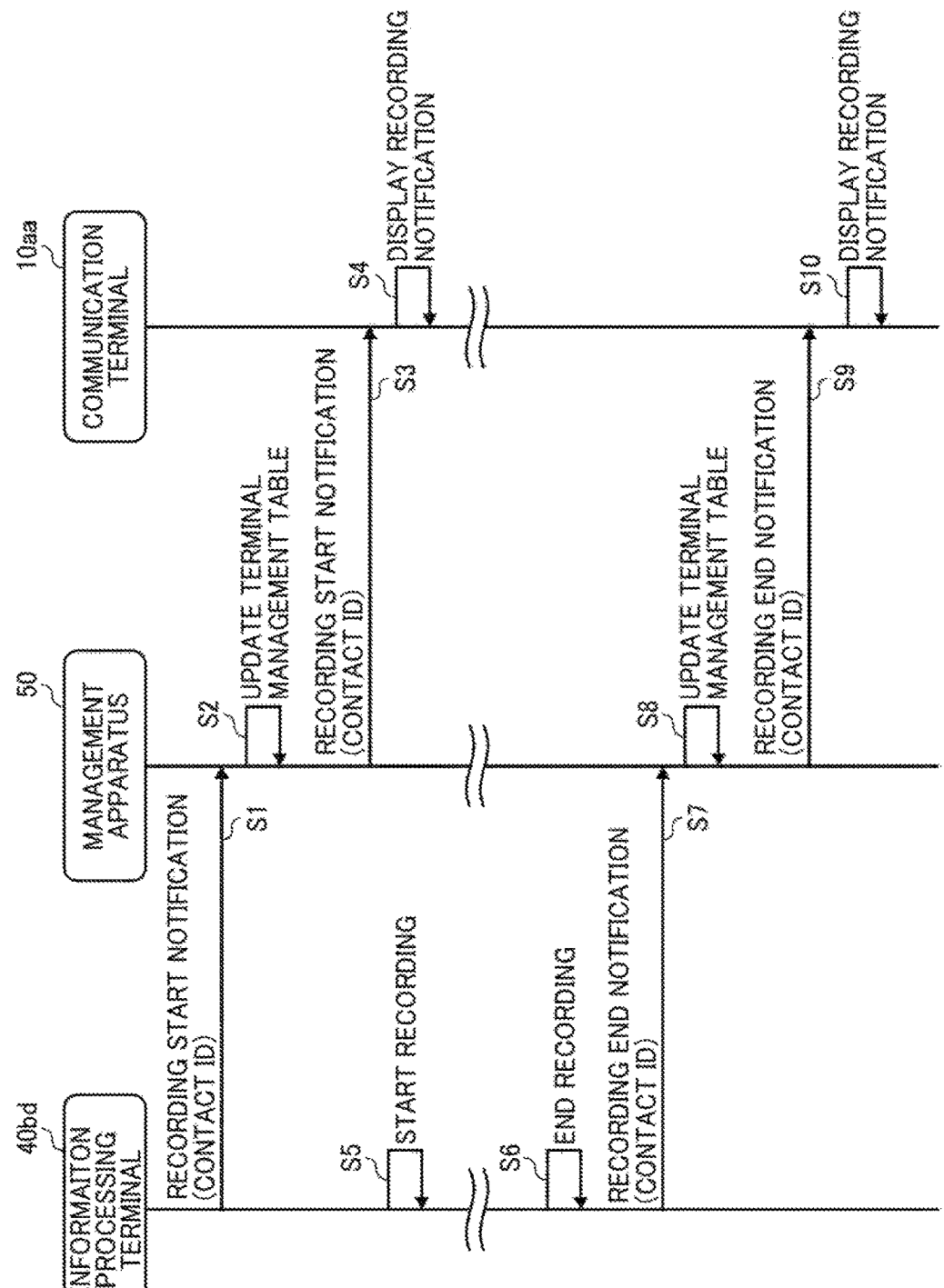

FIG. 11

| CONTACT LIST | JAPAN TOKYO OFFICE AA TERMINAL | | |
|---|---|---|---|
| OPERATING STATE | TERMINAL NAME | | |
| 📞 | JAPAN | TOKYO OFFICE | AB TERMINAL |
| 📞 | JAPAN | TOKYO OFFICE | AC TERMINAL |
| ● (71) | JAPAN | OSAKA OFFICE | BA TERMINAL |
| 📞 | JAPAN | OSAKA OFFICE | BB TERMINAL |
| 📞 | JAPAN | OSAKA OFFICE | BC TERMINAL |
| ● (71) | JAPAN | OSAKA OFFICE | BD TERMINAL |
| 📞 | JAPAN | OSAKA OFFICE | BE TERMINAL |
| 📞 | U.S.A | WASHINGTON, D.C. OFFICE | CA TERMINAL |

FIG. 12

CONTACT LIST    JAPAN TOKYO OFFICE AA TERMINAL

PARTICIPATE IN CONFERENCE BEING RECORDED — 510

Are you sure you want to participate in conference being recorded? } 511

OK — 512

CANCEL — 513

FIG. 20

DETAILED CONFERENCE INFORMATION
LIST OF SITES OF PARTICIPANTS

| | TERMINAL NAME | TERMINAL ID |
|---|---|---|
| | 01: JAPAN TOKYO OFFICE AA TERMINAL | 01aa |
| | 02: | 01cd |
| | 03: JAPAN TOKYO OFFICE AB TERMINAL | 01ab |
| | 04: JAPAN TOKYO OFFICE AC TERMINAL | 01ac |
| | 05: JAPAN OSAKA OFFICE BA TERMINAL | 01ba |
| | 06: JAPAN OSAKA OFFICE BB TERMINAL | 01bb |
| | 07: JAPAN OSAKA OFFICE BC TERMINAL | 01bc |
| ● | 08: JAPAN OSAKA OFFICE BD TERMINAL | 04bd |
| | 09: JAPAN OSAKA OFFICE BE TERMINAL | 04be |
| | 10: U.S.A WASHINGTON, D.C. OFFICE CA TERMINAL | 01ca |

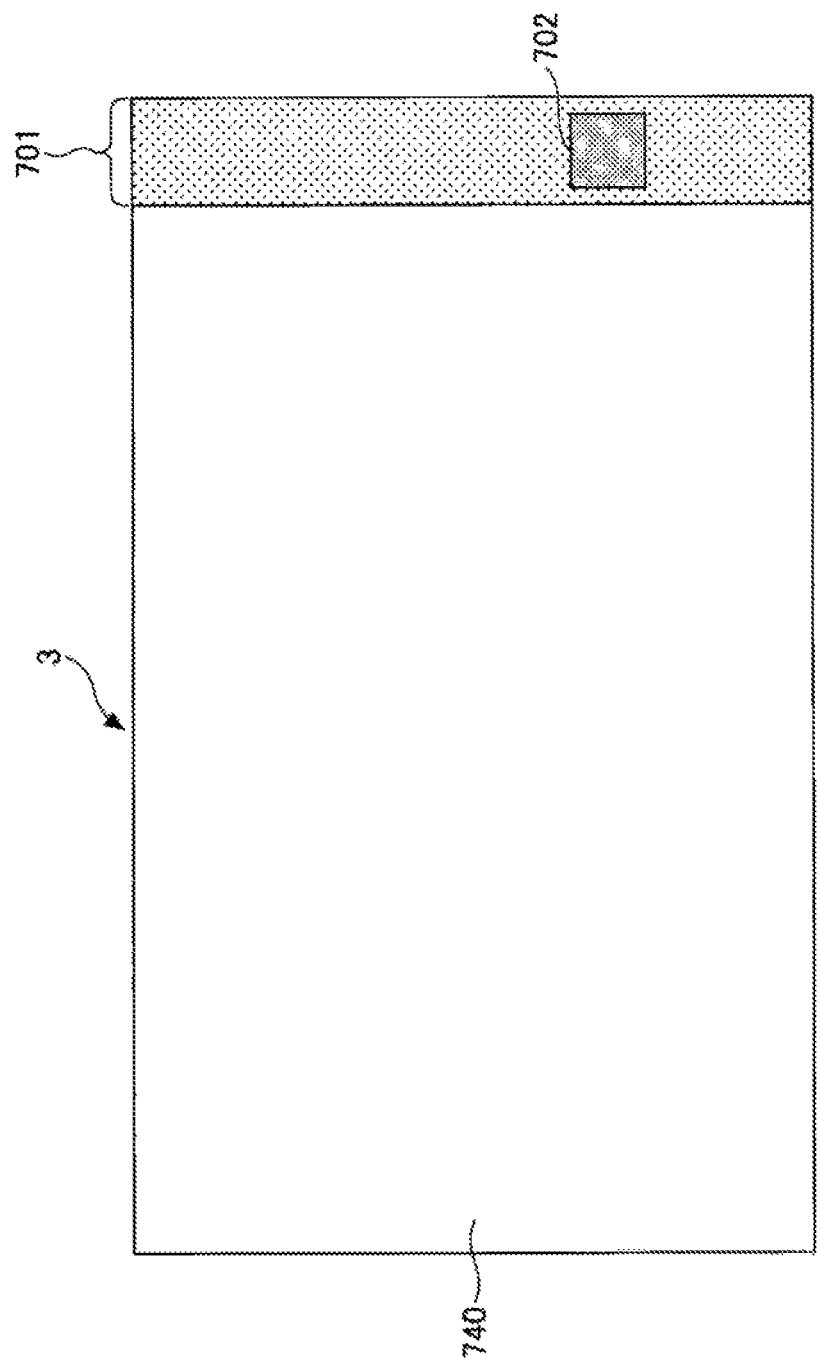

FIG. 28
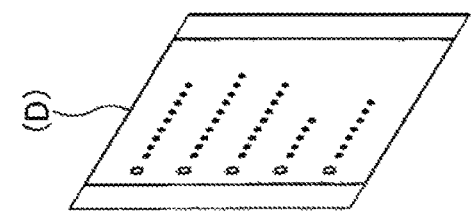
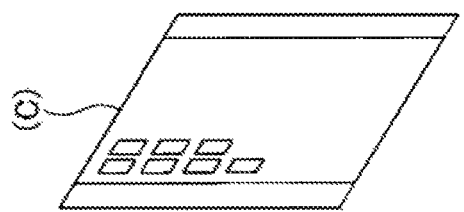
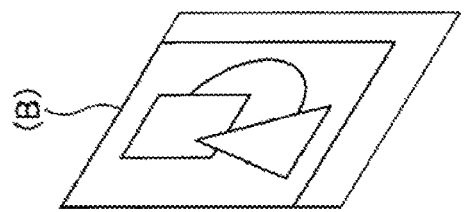
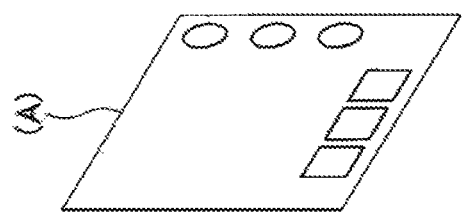
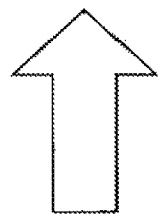
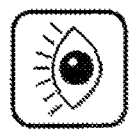

FIG. 29

| PAGE DATA ID | START TIME | END TIME | STROKE ARRANGEMENT DATA ID | MEDIUM DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| ... | ... | ... | ... | ... |

FIG. 30 st003 st002 st001

| STROKE DATA ID | START TIME | END TIME | COLOR | WIDTH | COORDINATE ARRANGEMENT DATA ID |
|---|---|---|---|---|---|
| s001 | 20130610102502 | 20130610102505 | ff0000 | 2 | c001 |
| s002 | 20130610102612 | 20130610102615 | 00ff0 | 3 | c002 |
| s003 | 20130610102704 | 20130610102712 | 0 | 1 | c003 |
| ... | ... | ... | ... | ... | ... |

FIG. 31 c001

| X COORDINATE | Y COORDINATE | DIFFERENCE TIME | PRESSURE |
|---|---|---|---|
| 10 | 10 | 100 | 255 |
| 12 | 10 | 200 | 255 |
| 14 | 12 | 300 | 255 |
| ... | ... | ... | ... | c002 c003

FIG. 32

| MEDIUM DATA ID | DATA TYPE | RECORDING TIME | X COORDINATE | Y COORDINATE | WIDTH | HEIGHT | DATA |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| ... | ... | ... | ... | ... | ... | ... | ... |

# INFORMATION PROCESSING APPARATUS, COMMUNICATION SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2016-123948, filed on Jun. 22, 2016, and 2016-101311, filed on May 20, 2016, in the Japan Patent Office, the entire disclosure of which is hereby incorporated by reference herein.

BACKGROUND

Technical Field

The present invention relates to an information processing apparatus, a communication system, and an information processing method.

Description of the Related Art

The communication systems are widely used, which are capable of carrying out videoconferences among remotely located sites through a communication network such as the internet. In such communication systems, image data and audio data that are obtained at one communication terminal are transmitted to a counterpart communication terminal. The counterpart communication terminal, which receives image data and audio data, displays an image on a display based on the image data, or outputs audio through a speaker based on the audio data, to carry out a videoconference with the counterpart communication terminal.

In such communication systems, a number of participating communication terminals is not limited to two, such that three or more communication terminals may participate in the videoconference, which are located at different sites.

Further, at least one communication terminal at one site may record the image or audio during videoconferencing. For example, the recorded image or audio may be shared with a person who could not attend such videoconference.

SUMMARY

Example embodiments of the present invention include an information processing apparatus, which includes: a transmitter to transmit content data to one or more counterpart information processing apparatuses through a network to have a communication with the one or more counterpart information processing apparatuses, the content data being at least one of image data and audio data; a receiver to receive, from a first information processing apparatus of the one or more counterpart information processing apparatuses, a recording start notification indicating that the first counterpart information processing apparatus starts recording or is recording the content data that is transmitted from the information processing apparatus, the recording start notification being transmitted with first identification information of the first counterpart information processing apparatus that is recording; and a circuitry to output, based on the recording start notification, notification information indicating that recording of the communication is being performed, in association with information regarding the first counterpart information processing apparatus.

Example embodiments of the present invention include a communication system including the above-described information processing apparatus, and a communication management apparatus that manages communication performed by the information processing apparatus. The communication system may further include the first information processing apparatus that is recording.

Example embodiments of the present invention include a method performed by the above-described information processing apparatus, and a non-transitory recording medium that stores a control program for the information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 8A and 8B (FIG. 8) are a data sequence diagram illustrating operation of preparing for communication, performed by the communication terminal, according to an embodiment;

FIG. 9 is a data sequence diagram illustrating operation of preparing to start communication between the communication terminals to have videoconference, according to an embodiment;

FIG. 10 is a data sequence diagram illustrating operation of starting or ending recording, performed by the information processing terminal, according to an embodiment;

FIG. 11 is an illustration of an example contact list screen, displayed at S32 of FIG. 8;

FIG. 12 is an illustration of an example confirmation dialog, displayed in response to selection of a counterpart with a recording site mark;

FIG. 20 is an illustration of an example information display image, displayed on the display, in the information display mode;

FIG. 24 is an illustration of an example electronic whiteboard UI screen generated with electronic whiteboard, displayed on a display of the electronic whiteboard;

FIG. 28 is an illustration of example image layers, displayed on the display of the electronic whiteboard;

FIG. 29 is an illustration of an example data structure of page data;

FIG. 30 is an illustration of an example data structure of stroke arrangement data;

FIG. 31 is an illustration of an example data structure of coordinate arrangement data;

FIG. 32 is an illustration of an example data structure of medium data;

Figure 1:
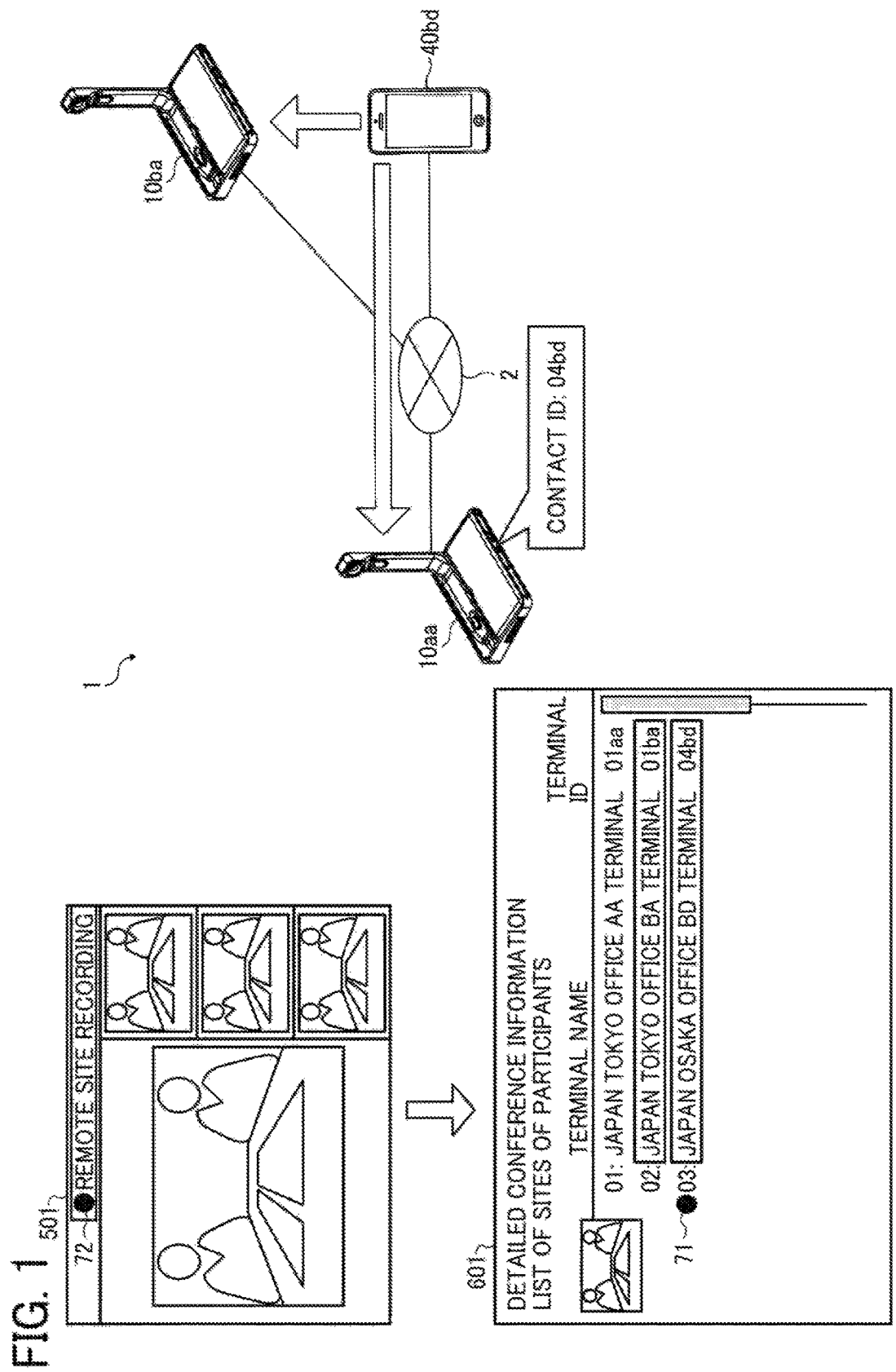
FIG. 1 is a schematic diagram illustrating operation of a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed tor the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present invention are described First, referring to FIGS. 1 to 21, a communication system is described according to a first embodiment.

FIG. 1 is a schematic diagram illustrating operation of a communication system 1 according to an embodiment of the present invention. A communication terminal 10aa communicates with a communication terminal 10ba and an information processing terminal 40bd, to carry out a videoconference with the communication terminal 10ba and the information processing terminal 40bd. The communication terminal 10aa combines images respectively received from the communication terminal 10ba and the information processing terminal 40bd, to display on a display 120 a combined image. This combined image is referred to as a full-screen display image 501. In a substantially similar manner, the communication terminal 10ba and the information processing terminal 40bd each display the full-screen display image.

In this embodiment, at the start of recording images during videoconferencing, the information processing terminal 40bd sends a recording start notification to the communication terminals 10aa and 10ba. For simplicity, in the following, the example ease of operation performed at the communication terminal 10aa is described.

The communication terminal 10aa stores a contact ID "04bd" of the information processing terminal 40bd, included in the recording start notification transmitted from the information processing terminal 40bd.

When the communication terminal 10aa switches to display an information display screen 601 in response to a user request for checking a recording site, the communication terminal 10aa identifies a recording site with the stored contact ID "04bd", and displays the information display screen 601 that highlights the identified recording site. More specifically, the information display screen 601 of FIG. 1 displays a terminal name and a contact ID (here, a terminal ID) for each videoconferencing site. For the information processing terminal 40bd that is recording, a recording site mark 71 is displayed next to the terminal name. With this recording site mark 71, a user at the communication terminal 10aa can instantly know which one of the sites is recording images.

As described above, the communication system 1 in this embodiment allows a user to know or check the recording site that is recording images, while performing a videoconference with other sites.

In this embodiment, the communication terminal 10 and the information processing terminal 40 are examples of an information processing apparatus. For simplicity, the communication terminal 10 and the information processing terminal 40 may be collectively referred to as the terminal 10 or 40, the information processing apparatus, or the communication terminal. Further, identification information identifying the information processing apparatus is any information capable of identifying a specific information processing apparatus or a specific user operating the information processing apparatus. In this embodiment, a contact ID is used as identification information. The contact ID may be a terminal ID of the terminal or a user ID operating the terminal. Alternatively, any other information may be used including a terminal name of the information processing apparatus, MAC address of the information processing apparatus, email address of the user, or user name of the user.

Further, the information processing apparatus is capable of transmitting or receiving at least one of image data and audio data.

In this disclosure, information indicating whether recording is performed is notified in association with each one of one or more information processing apparatuses at videoconferencing sites. That is, information indicating whether images or audio is being recorded is output in association with identification information identifying an information processing apparatus at a specific site. The identification information may be a contact ID of the information processing apparatus, which may be a terminal name in this example. The notification may be output in various ways including displaying as an image and outputting as audio. In this embodiment, as illustrated in FIG. 1, the recording site mark 71 is displayed in association with the terminal name and the contact ID (terminal name) of the information processing apparatus that is recording.

Further, in this disclosure, recording images or audio means storing image data or audio data in a local memory at the recording site. The image data or audio data that has been stored may be reproduced again. Further, recording images or audio may be simply referred to as recording.

The identification information identifying the information processing apparatus at other site is any information that uniquely identities a meeting participant at a remote site. In this example, the identification information of the information processing apparatus may be at least one of a terminal name and a contact ID.

In this disclosure, a communicating state is a state in which two or more information processing apparatuses (such as the communication terminal 10 and the information processing terminal 40) are transmitting or receiving content data or audio data. More specifically, the communicating state is a state in which the videoconference is taking place, or users are participating in the videoconference.

The recording notification includes a recording start notification indicating starting of recording, and a recording notification indicating recording is being performed. The recording end notification indicates ending of recording.

Figure 2:
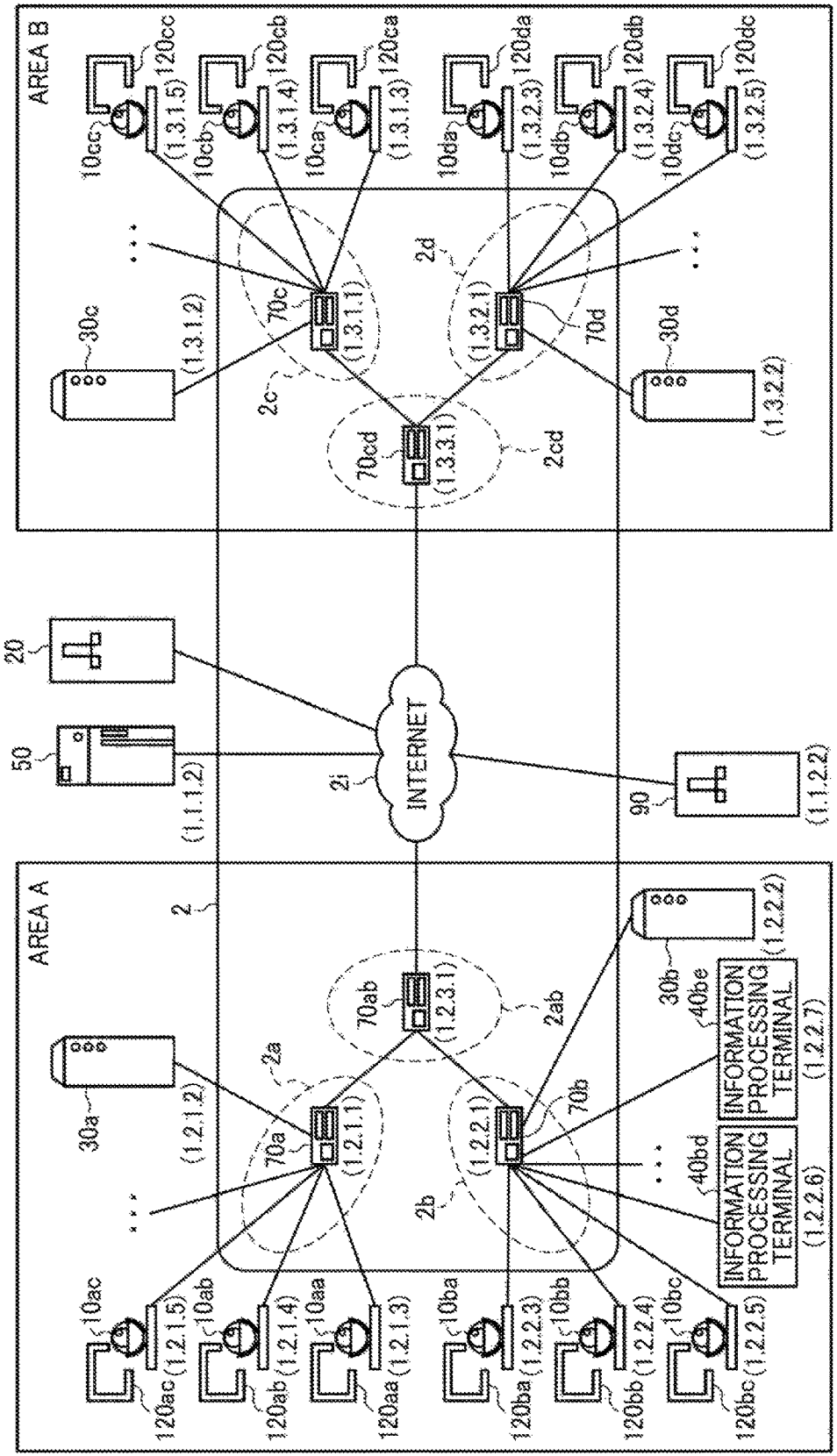
FIG. 2 is a schematic diagram illustrating the communication system illustrated in FIG. 1 according to an embodiment of the present invention.
Figure 3:
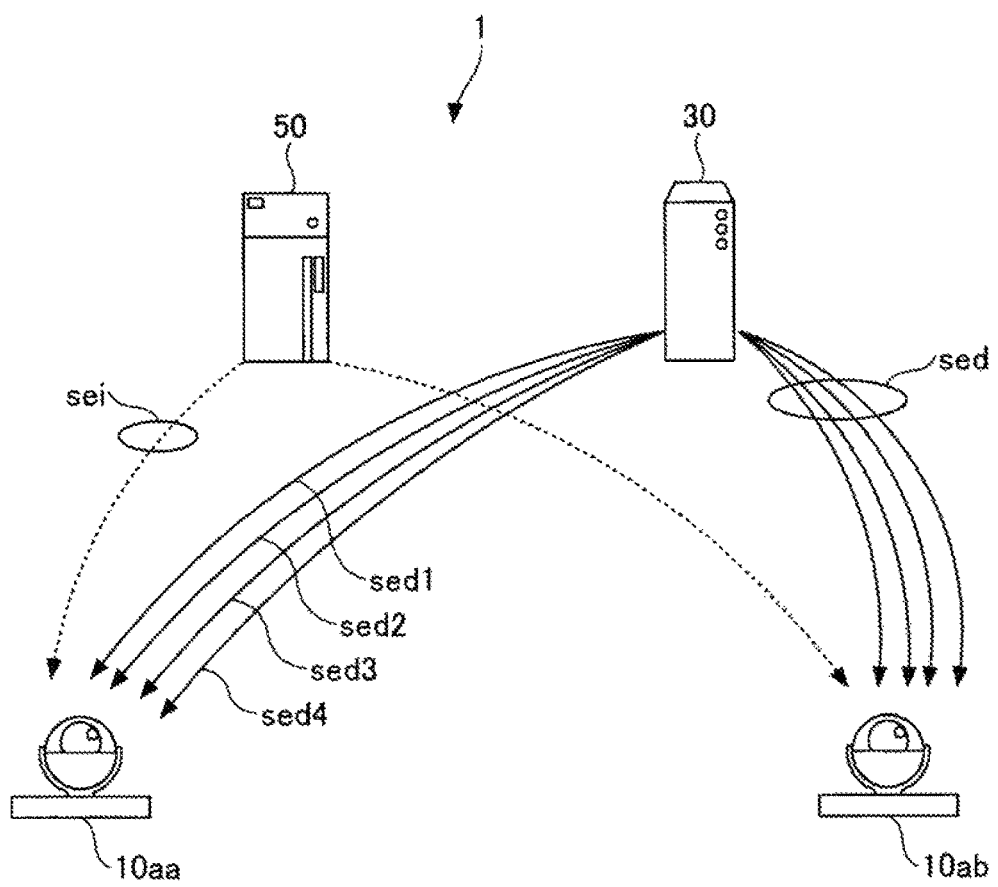
FIG. 3 is a conceptual diagram illustrating transmission or reception of image data, audio data, and various management information in the communication system of FIG. 1, according to an embodiment of the present invention.

FIG. 2 is an overall configuration diagram of a communication system I according to an embodiment of the present invention. FIG. 3 is a conceptual diagram illustrating transmission or reception of image data, audio data, and various management information in the communication system 1, according to the embodiment of the present invention. Examples of the communication system 1 include a data providing system that performs one-way transmission of content data from one communication terminal to another communication terminal via a communication management apparatus 50, and a communication system that intercommunicates information, information reflecting feelings, or the like between a plurality of communication terminals via the communication management apparatus 50. The communication system is a system for intercommunicating information, information reflecting feelings, or the like between a plurality of communication terminals via the communication management apparatus 50, and examples thereof include a teleconference system and a videoconference system.

In this embodiment, the communication system, the communication management apparatus, and the communication terminal will be described while assuming a videoconference system serving as an example of the communication system, a videoconference management apparatus serving as an example of the communication management apparatus, and a videoconference terminal serving as an example of the communication terminal. That is, the communication terminal 10 and the communication management apparatus 50 according to the embodiment of the present invention are applied not only to a videoconference system, but also to any desired communication system.

As illustrated in FIG. 2, the communication system 1 includes a plurality of communication terminals 10aa, 10ab, . . . , a plurality of displays 120aa, 120ab, . . . for the respective communication terminals 10aa, 10ab, . . . , a user interface (UI) providing apparatus 20, information processing terminals 40bd and 40be, a plurality of relay devices 30a, 30b, 30c, and 30d, a communication management apparatus 50, and a program providing apparatus 90. In the following, any arbitrary terminal of the plurality of terminals 10aa, 10ab, . . . is referred to as the communication terminal 10 or simply the terminal 10. Any arbitrary display of the plurality of displays 120aa, 120ab, . . . is referred to as the display 120. Any arbitrary relay device of the plurality of relay devices 30a to 30d is referred to as the relay device 30. Further, any arbitrary one of the plurality of information processing terminals 40bd and 40be is referred to as the information processing terminal 40 or simply the terminal 40. The communication terminal 10 transmits or receives image data and audio data as an example of content data.

The UI providing apparatus 20 transmits layout information, which is to be used for displaying mainly a number of videoconferencing sites, at the communication terminal 10. The functions of the UI providing apparatus 20 may be performed by the communication management apparatus 50 or the relay device 30.

The information processing terminal 40 performs videoconferencing, according to software installed in the information processing terminal 40. In this embodiment, the information processing terminal 40 may be implemented by a personal computer (PC), a tablet terminal, a smart phone, a mobile phone, a personal digital assistant (PDA), a game machine, a car navigation system, and an electronic book terminal.

Further, in the this disclosure, the communication terminal Hi or the information processing terminal 40 that sends a request for starting videoconference is referred to as the "request sender terminal", and the communication terminal 10 or the information processing terminal 40 serving as a request destination (relay destination) of videoconference is referred to as the "counterpart terminal".

The terminal 10 or 40 participating in a videoconference, or a site where such terminal 10 or 40 is provided is simply referred to as a "site". Alternatively, the terminal 10 or 40 or the site of the terminal 10 or 40 may be expressed as a user operating the terminal 10 or 40, such as a user at the terminal 10 or 40. As long as the terminal 10 or 40 participating in a videoconference is specified, the user is able to specify the site where the terminal 10 or 40 is provided or the user operating the terminal 10 or 40. For example, as long as the terminal name of the communication terminal 10 is obtained, the user at one site is able to identify a specific user operating the communication terminal 10 or a specific site where the communication terminal 10 is provided. Further, the site in this disclosure may not exactly be a physical location where the user resides. In other words, as long as the specific terminal 10 or 40 or the specific user can be identified, the exact physical location of the site does not matter. Further, the user operating the terminal 10 or 40 does not have to be an individual user, but could be an organization name such as a name of a company or a name of a group or a team. Especially, the communication terminal 10 is usually assigned to a group of users. In an example ease of videoconferencing within the same company, a group name may be assigned as a terminal name. In such case, as long as the terminal name is identified, a user at one site is able to know a name of a user at the counterpart site as well as a location of the counterpart site. While a number of sites is the same as a number of terminals 10 or 40 participating in a videoconference, any number of terminals 10 or 40 may be located within the same area (such as within the same meeting room or floor).

As illustrated in FIG. 3, in the communication system 1, a management data session "sei" is established between the request sender terminal 10*aa* and the counterpart terminal 10*ab* via the communication management apparatus 50 to transmit or receive various management information.

Between the request sender terminal 10*aa* and the counterpart terminal 10*ab*, four sessions are established via the relay device 30 to transmit or receive four items of data including high-resolution image data sed1, intermediate-resolution image data sed2, low-resolution image data sed3, and audio data sed4. In this disclosure, these four sessions are collectively referred to as image and audio data session "sed".

In FIG. 2, the relay device 30, which may be implemented by one or more computers, relays content data between the plurality of terminals 10 or 40. The communication management apparatus 50 centrally controls login authentication of the terminal 10 or 40, management of the communication state of the terminal 10 or 40, management of a contact list or the like, and management of the communication state or the like of the relay device 30. The image data may be a video image or a still image, or both of the video image and the still image.

One or more of a plurality of routers 70*a*, 70*b*, 70*c*, 70*d*, 70*ab*, and 70*cd* are selected to relay content data, such as image data and audio data, via an optical route. Any arbitrary router of the plurality of routers 70*a*, 70*b*, 70*c*, 70*d*, 70*ab*, and 70*cd* is referred to as the router 70.

The program providing apparatus 90 is provided with a hard disk (HD) 204 to be describe later. The HD 204 stores a communication terminal control program 1000*a*, which is to be transmitted to the communication terminal 10 to cause the communication terminal 10 to perform various functions.

The HD 204 of the program providing apparatus 90 further stores a relay device control program, which is to be transmitted to the relay device 30 to cause the relay device 30 to perform various functions.

The HD 204 of the program providing apparatus 90 further stores a communication management program 5000*a*, which is to be transmitted to the communication management apparatus 50 to cause the communication management apparatus 50 to perform various functions.

The HD 204 of the program providing apparatus 90 further stores a UI providing apparatus control program, which is to be transmitted to the UI providing apparatus 20 to cause the UI providing apparatus 20 to perform various functions.

The HD 204 of the program providing apparatus 90 further stores an information processing terminal control program 1000*c*, which is to be transmitted to the information processing terminal 40 to cause the information processing terminal 40 to perform various functions.

The communication terminals 10*aa*, 10*ab*, 10*ac*, . . . , the relay device 30*a*, and the router 70*a* are connected through a LAN 2*a* to be communicable with each other. The communication terminals 10*ba*, 10*bb*, 10*bc*, . . . , the relay device 30*b*, and the router 70*b* are connected through a LAN 2*b* to be communicable with each other.

The LAN 2*a* and the LAN 2*b* are connected through a dedicated line 2*ab* including the router 70*ab* to be communicable with each other, and are provided in an area A. For example, when the area A is Japan, the LAN 2*a* may be located in Tokyo, and the LAN 2*b* may be located in Osaka.

The communication terminals 10*ca*, 10*cb*, 10*cc*, . . . , the relay device 30*c*, and the router 70*c* are connected through a LAN 2*c* to be communicable with each other. The communication terminals 10*da*, 10*db*, 10*dc*, . . . , the relay device 30*d*, and the router 70*d* are connected through a LAN 2*d* to be communicable with each other.

The LAN 2*c* and the LAN 2*d* are connected through a dedicated line 2*cd* including the router 70*cd* to be communicable with each other, and provided in an area B. For example, when the area B is the United States, the LAN 2*c* may be located in New York, and the LAN 2*d* is located in Washington, D.C. The areas A and B are connected through the routers 70*ab* and 70*cd* to the Internet 2*i* to be communicable.

In FIG. 2, the relay device 30, the communication management apparatus 50, the UI providing apparatus 20, the information processing terminal 40, and the program providing apparatus 90 are connected to each communication terminal 10 to be communicable via the Internet 2*i*. The relay device 30, the communication management apparatus 50, the UI providing apparatus 20, the information processing terminal 40, and the program providing system 90 may be provided in any of the areas A and B, or any area other than the areas A and B.

In this example, the communication network 2 includes the LAN 2*a*, the LAN 2*b*, the dedicated line 2*ab*, the Internet 2*i*, the dedicated line 2*cd*, the LAN 2*c*, and the LAN 2*d*. The communication network 2 may not only include a wired network, but also a wireless network such as a network m compliance with WiFi (Wireless Fidelity) or Bluetooth.

In FIG. 2, four digits shown below each one of the communication terminal 10, the relay device 30, the communication management apparatus 50, the router 70, the UI providing apparatus 20, the information processing terminal 40, and the program providing system 90 indicate a simplified expression of IP address that is assigned to each device capable of functioning as a communication device. For example, the communication terminal 10*aa* is assigned with the terminal IP address "1.2.1.3". For simplicity, the IP address is expressed in IPv4, but the IP address may be expressed in IPv6 instead.

Note that the communication terminal 10 may be used not only for communication between different offices or for communication between different rooms in the same office, but also for communication within the same room or for outdoor-indoor communication or outdoor-outdoor communication. In the case where the communication terminal 10 is used outside, wireless communication using a mobile phone communication network or the like is performed.

<Hardware Configuration of Communication Terminal>

Figure 4:
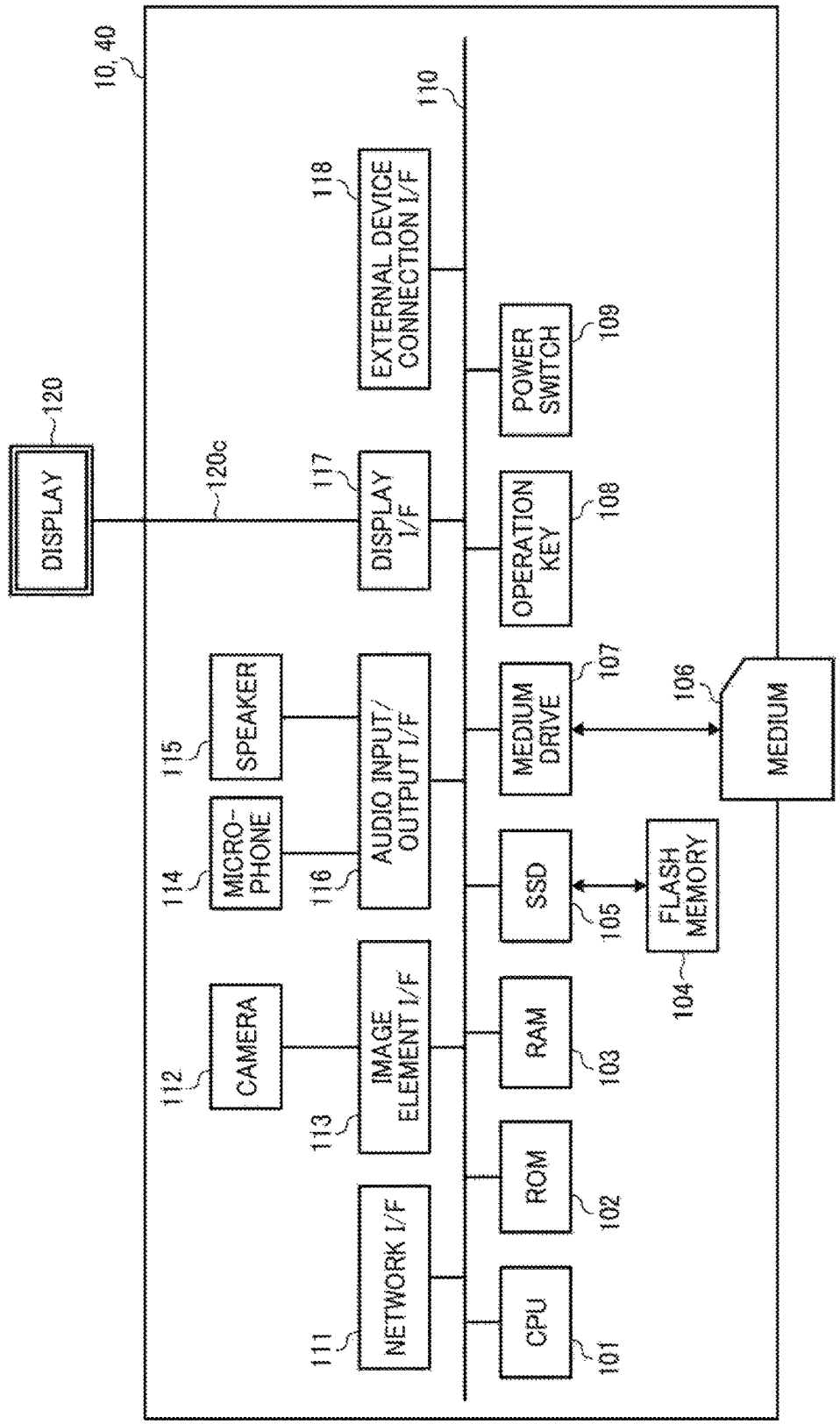
FIG. 4 is a schematic block diagram illustrating a hardware configuration of a communication terminal according to an embodiment of the present invention.

FIG. 4 is a schematic block diagram illustrating a hardware configuration of the communication terminal 10. As illustrated in FIG. 4, the communication terminal 10 includes a central processing unit (CPU) 101, a read only memory (ROM) 102, a random access memory (RAM) 103, a flash memory 104, a solid state drive (SSD) 105, a medium drive 107, operation key(s) 108, a power switch 109, and a network I/F 111. The CPU 101 controls entire operation of the communication terminal 10. The ROM 102 stores a control program for operating the CPU 101 such as an Initial Program Loader (IPL). The RAM 103 functions as a work area for the CPU 101. The flash memory 104 stores various data such as the communication terminal control program 1000a, image data, and audio data. The SSD 105 controls reading or writing of various data to or from the flash memory 104 under control of the CPU 101. The medium drive 107 controls reading or writing of data with respect to a recording medium 106 such as a flash memory. The operation key(s) 108 receives a user instruction such as a user selection of a communication counterpart of the communication terminal 10. The power switch 109 turns on or off the communication terminal 10. The network I/F 111 enables communication of data through a communication network 2.

The communication terminal 10 further includes a built-in camera 112 that captures a subject under control of the CPU 101, an image element I/F 113 that controls driving of the camera 112, and a built-in microphone 114 that inputs collected sounds. The communication terminal 10 further includes a built-in speaker 115 that outputs audio, and an audio I/O I/F 116 that inputs or outputs an audio signal between the microphone 114 and the speaker 115 under control or the CPU 101. The communication terminal 10 further includes a display I/F 117 that transmits image data to the external display 120 under control of the CPU 101. The communication terminal 10 further includes an external device connection I/F 118 that connects the communication terminal 10 with various external devices. The above-described elements are electrically connected via a bus line 110 such as an address bus or a data bus.

The display 120 is a display formed of liquid crystal or organic electroluminescence (EL) that displays an image of a subject, an operation icon, or the like. The display 120 is connected to the display I/F 117 by the cable 120c. The cable 120c may be an analog red green blue (RGB) (video graphic army (VGA)) signal cable, a component video cable, a high-definition multimedia interface (HDMI) signal cable, or a digital video interactive (DVT) signal cable.

The camera 112 includes a lens and a solid-state imaging element that converts an image (video) of a subject to electronic data through photoelectric conversion. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker through a Universal Serial Bus (USB) cable or the like.

In the case where an external camera is connected to the external device connection I/F 118, the external camera is driven in preference to the built-in camera 112 under control of the CPU 101. Similarly, in the case where an external microphone is connected or an external speaker is connected to the external device connection I/F 118, the external microphone or the external speaker is driven in preference to the built-in microphone 114 or the built-in speaker 115 under control of the CPU 101.

The recording medium 106 is removable from the communication terminal 10. Further, in the communication terminal 10, a non-volatile memory that reads or writes data under control of the CPU 101 is not limited to the flash memory 104, and an electrically erasable and programmable read-only memory (EEPROM) may be used instead.

Further, the communication terminal control program 1000a may be recorded in a file in a formal installable or executable on a computer-readable recording medium such as the recording medium 106 for distribution. In addition, the communication terminal control program 1000a may be stored on the ROM 102, instead of the flash memory 104.

The information processing terminal 40 has a hardware configuration that is substantially similar to that of the communication terminal 10. In the information processing terminal 40, the SSD 105 stores the information processing terminal control program 1000c in alternative to the communication terminal control program 1000a.

<Hardware Configuration of Communication Management Apparatus, UI Providing Apparatus, Relay Device, and Program Providing Apparatus>

Figure 5:
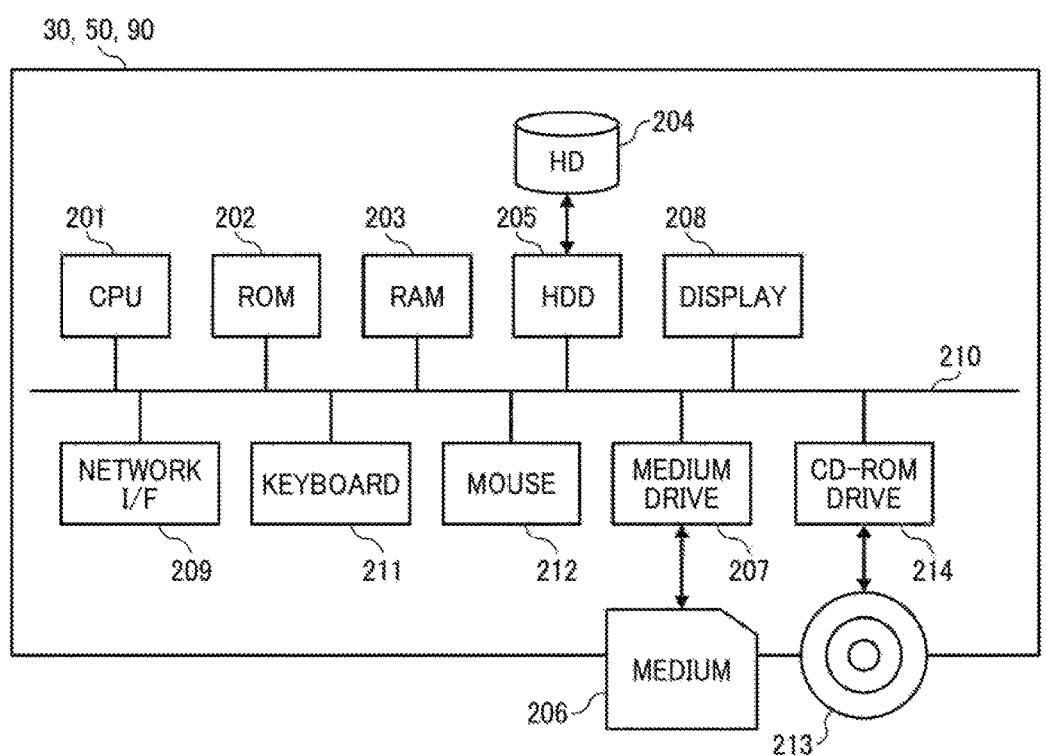
FIG. 5 is a schematic block diagram illustrating a hardware configuration of a communication management system, a relay device, and a program providing apparatus of the communication system of FIG. 1.

FIG. 5 is a schematic block diagram illustrating a hardware configuration of the communication management apparatus 50, the UI providing apparatus 20, the relay device 30, and the program providing apparatus 90 of the communication system of FIG. 2. For simplicity, the example case of the communication management apparatus 50 is described in the following. As illustrated in FIG. 5, the communication management apparatus 50 includes a CPU 201 that controls entire operation of the communication management apparatus 50, a ROM 202 that stores a control program for operating the CPU 201 such as an IPL, and a RAM 203 that functions as a work area for the CPU 201. The communication management apparatus 50 further includes a HD 204 that stores various data such as the communication management program, and a HDD 205 that controls reading or writing of various data to or from the HD 204 under control of the CPU 201. The communication management apparatus 50 further includes a medium drive 207 that controls reading or writing of data with respect to a recording medium 206 such as a flash memory, and a display 208 that displays various information such as a cursor, menu, window, characters, or image. The communication management apparatus 50 further includes a network I/F 209 that enables communication of data through the communication network 2, and a keyboard 211 provided with a plurality of keys for allowing a user to input characters, numerals, or various instructions. The communication management apparatus 50 further includes a mouse 212 that allows the user to select a specific instruction or execution, select a target for processing, or move a cursor being displayed. The communication management apparatus 50 further includes an optical (CD-ROM) drive 214 that reads or writes various data with respect to an optical disc (CD-ROM) 213, which is one example of removable recording medium. The above-described elements are electrically connected via a bus line 210 such as an address bus or a data bus.

Note that the communication management program may be recorded in a file in a format installable or executable on a computer-readable recording medium such as the recording medium 206 or the CD-ROM 213 for distribution. In addition, the communication management program may be stored on the ROM 202, instead of the HD 204.

Since the relay device 30 has a hardware configuration that is the same as or similar to that of the above-described communication management apparatus 50, descriptions thereof are omitted. In the relay device 30, the HD 204 stores a relay device control program in alternative to the communication management program.

Note that the relay device control program may be recorded in a file in a format installable or executable on a computer-readable recording medium such as the recording medium 206 or the CD-ROM 213 for distribution. In addition, the relay device control program may be stored on the ROM 202, instead of the HD 204.

Since the program providing apparatus 90 has a hardware configuration that is the same as or similar to that of the above-described communication management apparatus 50, descriptions thereof are omitted. In the program providing apparatus 90, the HD 204 stores a program providing control program in alternative to the communication management program.

Note that the program providing control program may be recorded in a file in a format installable or executable on a computer-readable recording medium such as the recording medium 206 or the CD-ROM 213 for distribution. In addition, the program providing control program may be stored on the ROM 202, instead of the HD 204.

Since the UI providing apparatus 20 has a hardware configuration that is the same as or similar to that of the above-described communication management apparatus 50, descriptions thereof are omitted. While the hardware is substantially the same, the HD 204 of the UI providing apparatus 20 stores the UI providing apparatus control program and layout information to be described later.

Note that the UI providing apparatus control program and the layout information may be recorded in a file in a format installable or executable on a computer-readable recording medium such as the recording medium 206 or the CD-ROM 213 for distribution. In addition, the UI providing apparatus control program may be stored on the ROM 202, instead of the HD 204.

Other examples of the removable recording medium include a computer-readable recording medium such as a compact disc recordable (CD-R), a digital versatile disk (DVD), and a Blue-ray disk.

The hardware configuration of the communication management apparatus 50 is not limited to the above-described configuration illustrated in FIG. 5, which includes all hardware components in one body. For example, the communication management 50, which operates as a server, may be implemented by one or more computers such that its hardware resources may be distributed over a network, which may be dynamically changed in configuration due to processing loads, for example, by connecting or disconnecting between some of the hardware resources as needed.

<Functional Configuration of Communication System>

Figure 6:
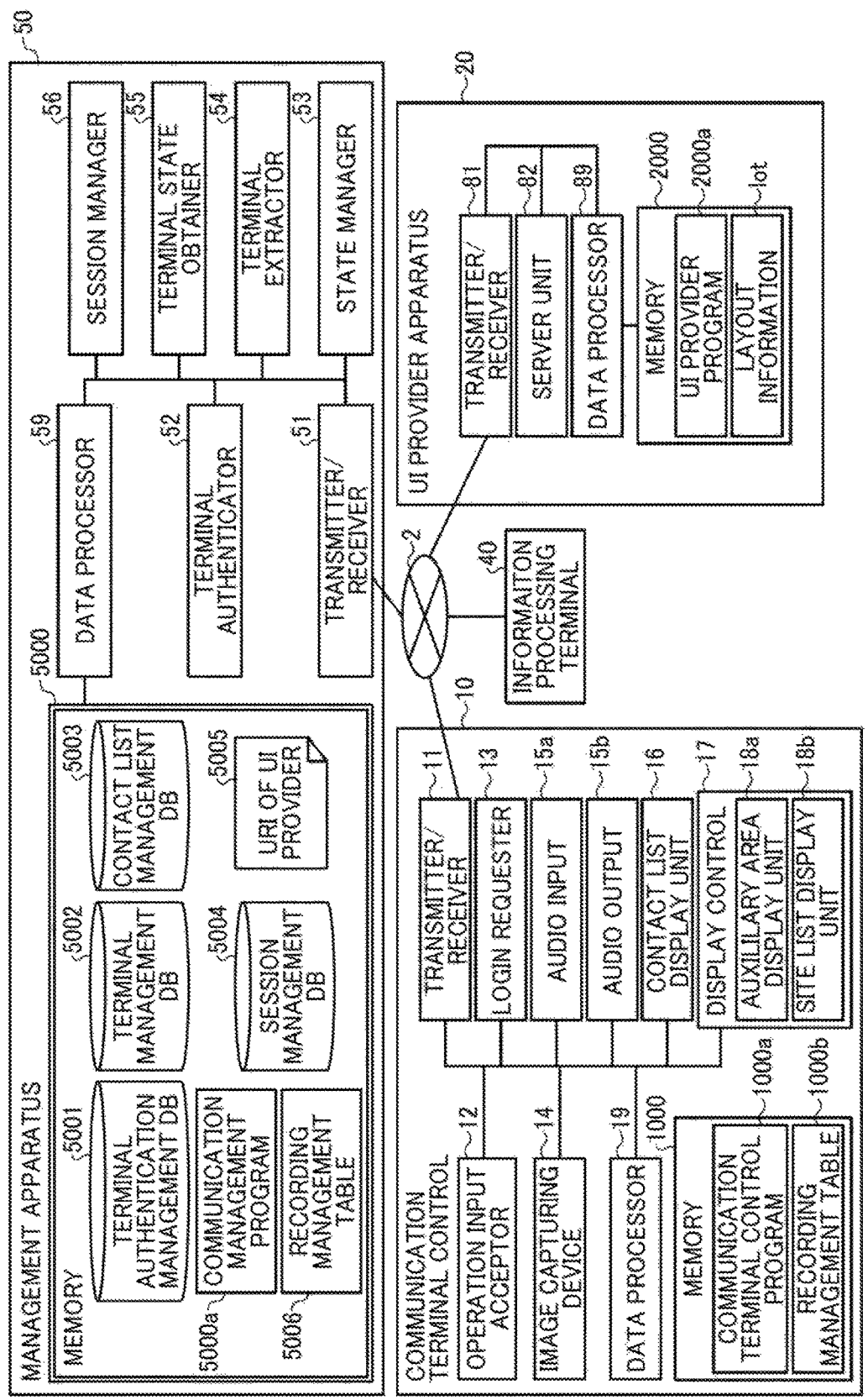
FIG. 6 is a schematic block diagram illustrating a functional configuration of the communication system 1 of FIG. 1 according to an embodiment of the present invention.

FIG. 6 is a schematic block diagram illustrating a functional configuration of the communication system 1 of FIG. 1 according to an embodiment of the present invention. In FIG. 6, the communication terminal 10, the relay device 30, the information processing terminal 40, the UI providing apparatus 20, and the communication management apparatus 50 are connected with one another to transmit or receive data via the communication network 2. The relay device 30 and the program providing apparatus 90 in FIG. 2, which are omitted in FIG. 6, are described as needed. The information processing terminal 40 is described below referring to FIG. 7.

<Functional Configuration of Communication Terminal>

The communication terminal 10 includes a transmitter/receiver 11, an operation input acceptor 12, a login requester 13, an image capturing device 14, an audio input 15a, an audio output 15b, a contact list display unit 16, a display control 17, and a data processor 19. These units are functions that are implemented by or that are caused to function by operating any of the hardware components illustrated in FIG. 4 in cooperation with the instructions of the CPU 101 according to the communication terminal control program 1000a expanded from the flash memory 104 to the RAM 103. The communication terminal 10 further includes a memory 1000 configured by the RAM 103 and the flash memory 104. The memory 1000 stores therein the communication terminal control program 1000a and a recording management table 1000b.

TABLE 1

| Recording management table Terminals that are recording |
|---|
| 04bb |
| . . . |

Table 1 illustrates an example data structure of the recording management table 1000b. The recording management table 1000b stores a contact ID of each one of a plurality of information processing apparatuses that are recording (the communication terminal 10 or the information processing terminal 40). The communication terminal 10 or the information processing terminal 40 that starts recording transmits a recording start notification (including its contact ID) to other communication terminal 10 or information processing terminal 40. The communication terminal 10 or the information processing terminal 40 that receives such notification registers the received contact ID of the terminal 10 or 40 that is recording to the recording management table 1000b. In case the plurality of terminals 10 or 40 are recording, contact IDs of all of the terminals 10 or 40 that are recording are stored in the recording management table 1000b.

For the descriptive purposes, in this embodiment, the contact ID of the communication terminal 10 starts with "01", and the contact ID of the information processing terminal 40 starts with "04".

(Functional Configuration of Communication Terminal)

The transmitter/receiver 11 is executed by a plurality of instructions from the CPU 101 and by the network I/F 111, and performs transmission/reception of various types of data (or information) to/from another communication terminal 10, information processing terminal 40, relay device 30, communication management apparatus 50, or program providing apparatus 90, via the communication network 2.

Before starting communication with a desired communication counterpart, the transmitter/receiver 11 starts receiving state information indicating the state of each candidate counterpart terminal 10, from the communication management apparatus 50. The state information not only indicates the operating state of each communication terminal 10 (whether the communication terminal 10 is online or offline), but also indicates a detailed state such as whether the communication terminal 10 whose state is online is now capable of communicating or is currently communicating.

In addition, the state information not only indicates the operating state of each communication terminal 10, but also indicates various states, such as the state that the cable 120c is disconnected from the communication terminal 10, the state that the communication terminal 10 can output sounds but not images, or the state that the communication terminal 10 is muted. Hereinafter, the case in which the state information indicates the operating state will be described by way of example.

The operation input acceptor 12, which may be implemented by the instructions of the CPU 101, the operation key 108, or the power switch 109, receives various inputs from the user. For example, when the user turns on the power switch 109, the operation input acceptor 12 accepts the power on operation and turns on the power.

The login requester 13 is implemented by the instructions of the CPU 101. In response to the power on operation, the login requester 13 causes the transmitter/receiver 11 to automatically transmit to the communication management apparatus 50 via the communication network 2, login request information indicating a login request, and the current IP address of the request sender terminal.

In addition, when the user turns the power switch 109 from on to off, the transmitter/receiver 11 transmits to the communication management apparatus 50 state information indicating that the power is to be turned off, and then the operation input acceptor 12 completely turns off the power. Accordingly, the communication management apparatus 50 can detect that the power of the communication terminal 10 is turned from on to off.

The image capturing device 14, which is implemented by instructions from the CPU 101 and by the camera 112 and the image element I/F 113, captures an image of a subject and outputs image data obtained by capturing the image to the transmitter/receiver 11.

The audio input 15a is implemented by the instructions of the CPU 101 and by the audio input/output I/F 116. After the sound of the user is converted to an audio signal by the microphone 114, the audio input 15a receives audio data according to this audio signal.

The audio output 15b is implemented by the instructions of the CPU 101 and by the audio input/output I/F 116, and outputs the audio signal according to the audio data to the speaker 115, and the speaker 115 outputs sound.

The display control 17 is implemented by the instructions of the CPU 101 and by the display I/F 117. The display control 17 combines images of different resolutions received at the transmitter/receiver 11, and transmits the combined image to the display 120. The display 120 then displays the combined image in a full-screen display mode. Alternatively, the display 120 displays detailed information regarding other site in an information display mode.

The display control 17 includes an auxiliary area display unit 18a and a site list display unit 19b. When the communication terminal 10 is in the full-screen display mode, the auxiliary area display unit 18a displays, on an auxiliary area of the full-screen display image 501, a number of sites participating in the videoconference, and a recording notification, etc. When the communication terminal 10 is in the information display mode, the site list display unit 18b displays, on the information display image 601, a name of the site participating in the videoconference, a contact ID, and a recording site mark 71 based on the recording management table 1000b.

The contact list display unit 16 controls the display 120 to display a contact list screen, based on counterpart terminal state information transmitted from the communication management apparatus 50. The counterpart terminal state information includes an operating state indicating whether the terminal 10 or 40 is recording. The contact list screen displays, for each communication terminal 10 or information processing terminal 40, whether the terminal is participating in the videoconference.

The data processor 19, which may be implemented by the instructions of the CPU 101 and the SSD 105, performs processing to store various types of data in the memory 1000 or read various types of data stored in the memory 1000.

The memory 1000 stores a contact ID for identifying the communication terminal 10 or the information processing terminal 40 as a communication counterpart, a password, and the like. Further, every time image data and audio data are received in performing communication with a counterpart terminal, the memory 1000 functions as a buffer to overwrite the image data and audio data. Note that a contact ID in the embodiment is an example of identification information that is used to uniquely identify a specific communication terminal 10 or information processing terminal 40, such that a language, a character(s), a symbol(s), or various marks are not limited to the above-described embodiment. For example, a combination of at least two of the above-mentioned language, character(s), symbol(s), and various marks may be used as a contact ID.

<Functional Configuration of Management Apparatus>

The communication management apparatus 50 includes a transmitter/receiver 51, a terminal authenticator 52, a state manager 53, a terminal extractor 54, a terminal state obtainer 55, a session manager 56, and a data processor 59. These units are functions that are implemented by or that are caused to function by operating any of the hardware components illustrated in FIG. 5 in cooperation with the instructions of the CPU 201 according to the communication management program 5000a expanded from the HD 204 to the RAM 203. In addition, the communication management apparatus 50 includes a memory 5000 configured by the HD 504 illustrated in FIG. 5. Databases stored in the memory 5000 are described below.

TABLE 2

Terminal authentication management table

| Contact ID (Terminal name) | Password |
|---|---|
| 01aa | aaaa |
| 01ab | abab |
| 01ba | baba |
| . . . | . . . |

The memory 5000 stores a terminal authentication management DB 5001, which may be implemented by a terminal authentication management table illustrated in Table 2. The terminal authentication management table stores, for each one of the terminals 10 or 40 managed by the communication management apparatus 50, the terminal ID and the password in association with each other. For example, the terminal authentication management table illustrated in Table 2 indicates that the contact ID of the terminal 10aa is "01aa", and the password of the terminal 10aa is "aaaa".

TABLE 3(a)

Terminal management table

| Contact ID | Terminal Name | Operating State | Terminal IP address |
|---|---|---|---|
| 01aa | Japan Tokyo Office AA Terminal | Online (Communicating) | 1.2.1.3 |
| 01ab | Japan Tokyo Office AB Terminal | Offline | 1.2.1.4 |
| 01ac | Japan Tokyo Office AC Terminal | Offline | 1.2.1.5 |

TABLE 3(a)-continued

Terminal management table

| Contact ID | Terminal Name | Operating State | Terminal IP address |
|---|---|---|---|
| 01ba | Japan Osaka Office BA Terminal | Online (Communicating) | 1.2.2.3 |
| 01bb | Japan Osaka Office BB Terminal | Offline | 1.2.2.4 |
| 01bc | Japan Osaka Office BC Terminal | Offline | 1.2.2.5 |
| 04bd | Japan Osaka Office BD Terminal | Online (Communicating) | 1.2.2.6 |
| 04be | Japan Osaka Office BE Terminal | Offline | 1.2.2.7 |
| 01ca | U.S.A. Washington, D.C. CA Terminal | Offline | 1.3.1.3 |

TABLE 3(b)

Terminal management table

| Contact ID | Terminal Name | Operating State | Terminal IP address |
|---|---|---|---|
| 01aa | Japan Tokyo Office AA Terminal | Recording | 1.2.1.3 |
| 01ab | Japan Tokyo Office AB Terminal | Offline | 1.2.1.4 |
| 01ac | Japan Tokyo Office AC Terminal | Offline | 1.2.1.5 |
| 01ba | Japan Osaka Office BA Terminal | Recording | 1.2.2.3 |
| 01bb | Japan Osaka Office BB Terminal | Offline | 1.2.2.4 |
| 01be | Japan Osaka Office BC Terminal | Offline | 1.2.2.5 |
| 04bd | Japan Osaka Office BD Terminal | Recording | 1.2.26 |
| 04be | Japan Osaka Office BE Terminal | Offline | 1.2.2.7 |
| 01ca | U.S.A. Washington, D.C. CA Terminal | Offline | 1.3.1.3 |

The memory 5000 further stores a terminal management DB 5002, which may be implemented by a terminal management table illustrated in Table 3 (Table 3(a) and 3(b)). The terminal management table stores, for each terminal 10 or 40 being managed by the management system 50, the contact ID of the terminal 10 or 40, a terminal name of the terminal 10 or 40, an operating state of the terminal 10 or 40, and the IP address of the terminal 10 or 40, in association with one another. The terminal name is previously stored in association with each contact ID, such that with the contact ID, the terminal name of the terminal 10 or 40 can be obtained.

For example, the terminal management table of Table 3(a) indicates that the terminal 10aa with the contact ID "01aa" has the terminal name "Japan, Tokyo office, AA terminal", the operating state "online (communicating)", and the IP address "1.2.1.3".

The terminal management table of Table 3(a) further indicates that the terminal 10aa with the contact ID "01aa", the terminal 10ba with the contact ID "01ba", and the terminal 40bd with the contact ID "04bd", which all have the operating state "online (communicating)", are having a videoconference. Before changing to the "online (communicating)", the terminal 10 or 40 is in the operating state "online (communication OK)", which is a state capable of communicating.

The terminal management table of Table 3(b) indicates that the information processing terminal 40bd participating in the videoconference is recording. In such case, the operating state "recording" is stored in association with the contact ID "04db" of the information processing terminal 40db. That is, the information processing terminal 40bd having the operating state "recording" is recording. The operating states tor the contact IDs "01aa" and "01ba" are all "recording". This is because the operating states of all other terminals 10 or 40 participating in the same videoconference that the terminal 40db is recording, are changed to the operating state "recording", even though the other terminals 10 or 40 are not recording.

In this embodiment, the contact ID is uniquely assigned to the communication terminal 10 or information processing terminal 40, each time the terminal 10 or 40 is registered to the communication system 1. The terminal name of each terminal 10 or 40 is registered or updated by an administrator of the communication management apparatus 50. Alternatively, the terminal name of each terminal 10 or 40 may be registered or updated, according to a request from the terminal 10 or 40 to the communication management apparatus 50. In this embodiment, it is assumed that the contact ID and the terminal name are previously registered.

The operating state "online (communication OK)" is a state in which the terminal 10 or 40 is logged into the communication system 1, but not participating in a videoconference. The operating state "online (communicating)" is a state in which the terminal 10 or 40 is logged into the communication system 1, and is participating in a videoconference. In other words, the terminal 10 or 40 that is participating in a videoconference, or having a videoconference, is the terminal having the operating state "online (communicating)". The operating state "offline" in a state in which the terminal 10 or 40 is not logged into the communication system 1.

TABLE 4

Contact list management table

| Contact ID of Request sender terminal | Contact ID of Counterpart terminal |
|---|---|
| 01aa | 01ab, 01ac, 01ba, 01bb, 01bc, 04bd, 04be, 01ca, 01cb, 01ca, 01da, 01db, 01dc |
| 01ba | 01aa, 01ab, 01bb, 01bc, 04bd, 04be |
| 01ca | 01aa, 01ab, 01bb, 01bc, 04bd, 04be |
| 04bd | 01aa, 01ab, 01ac, 01ba, 01bb, 01bc, 04be, 01ca |
| ... | ... |

The memory 5000 further stores a contact list management DB 5003 implemented by a contact list management table illustrated in Table 4. The contact list management table stores, for each one of the terminals 10 or 40 managed by the communication management apparatus 50, the contact ID of the terminal (request sender terminal) that requests to start communication, in association with the terminal IDs of all counterpart terminals registered as candidate counterpart terminals for the request sender terminal.

For example, the contact list management table of Table 4 indicates that candidates for a counterpart terminal to which the request sender terminal 10aa whose contact ID is "01aa" can send a request to start communication in a videoconference are the terminal 10ab whose contact ID is "01ab" . . . , the terminal 10dc whose contact ID is "01dc", the terminal 40bd whose contact ID is "04bd" and terminal 40be whose contact ID is "04be". The contact ID of the counterpart terminal may be registered or updated, according to a request from the terminal 10 or 40 to the communication management apparatus 50, only when such request is approved from the counterpart terminal. Alternatively, the contact ID of the counterpart terminal may be deleted, according to a request from the terminal 10 or 40 to the communication management apparatus 50.

TABLE 5

Session management table

| Session ID | Relay device ID | Request sender terminal ID | Counterpart terminal ID | Conference ID |
|---|---|---|---|---|
| Se1 | 111a | 01aa | 04bd | C01 |
| Se2 | 111b | 01ba | 01aa | C01 |
| ... | ... | ... | ... | ... |

The memory 5000 also stores a session management DB 5004, which may be implemented by a session management table illustrated in Table 5. The session management table stores, for each session ID of a session to be used for communication, the relay device ID of a relay device 30 to be used in relaying image data and audio data, the contact ID of a request sender terminal, the contact ID of a counterpart terminal, and a conference ID, in association with one another. The session ID is an ID for identifying a session to be established between the request sender terminal and the counterpart terminal, which is two terminals. For this reasons, the communication terminals participating in the same videoconference do not always have the same session ID. The conference ID is an ID for identifying the videoconference, performed by all of the participating terminals.

(URI of UI Providing Apparatus)

The memory 5000 further includes a URI 5005 of the UI providing apparatus 20. The URI 5005 of the UI providing apparatus 20 may be previously set by an administrator of the communication management apparatus 50 or the UI providing apparatus 20.

(Recording Management Table)

The memory 5000 further includes a recording management table 5006. The recording management table 5006 stored in the communication management apparatus 50 stores, for each videoconference, a contact ID of each one of a plurality of communication terminals 10 or information processing terminals 40 that are recording.

(Functional Configuration of Communication Management Apparatus)

The transmitter/receiver 51 is executed by a plurality of instructions from the CPU 201 and by the network I/F 209, and performs transmission/reception of various types of data (or information) to/from the communication terminal 10, information processing terminal 40, relay device 30, or program providing apparatus 90, via the communication network 2.

The terminal authenticator 52, which is implemented by the instructions of the CPU 201, searches the terminal authentication management DB 5001 using a contact ID and a password included in login request information received via the transmitter/receiver 51 as search keys. Based on the search result, the terminal authenticator 53 authenticates the terminal 10 or 40 based on determination of whether the same contact ID and password are managed in the terminal authentication management DB 5001. In alternative to the above-described authentication, the management apparatus 50 may authenticate using any other method such as by using a client certificate (public key and private key).

The state manager 53, which is implemented by the instructions of the CPU 201, manages the operating state of the terminal 10 or 40. In one example, the state manager 53 manages the operating state of the request sender terminal 10 or 40 that requests for login. That is, the terminal management DB 5002 stores, for the contact ID of each request sender terminal 10 or 40, the operating state and the IP address of the request sender terminal 10 or 40.

In another example, the state manager 53 manages turning on or off the power switch 109 at the communication terminal 10. In response to the state information indicating turning off of a power of the communication terminal 10, the state manager 53 changes the operating state indicating an online state to an offline state in the terminal management DB 5002. In another example, the state manager 53 communicates with the communication terminal 10 or information processing terminal 40 periodically or at any desired time, to check for its current operating state.

The terminal extractor 54, which is implemented by the instructions of the CPU 201, searches the contact list management DB 5003 using the contact ID of a request sender terminal that has sent a login request as a key, and reads the contact ID of a candidate counterpart terminal that can communicate with the request sender terminal, thereby extracting the contact ID.

The terminal extractor 54 also searches the contact list management DB 5003 using the contact ID of a request sender terminal that has sent a login request as a key, and extracts the contact ID of another request sender terminal that has the contact ID of the former-mentioned request sender terminal registered as a candidate for a counterpart terminal.

The terminal state obtainer 55, which is implemented by the instructions of the CPU 201, searches the terminal management DB 5002 using the contact ID of a candidate counterpart terminal, extracted by the terminal extractor 54, as a search key, and reads the operating state for each contact ID extracted by the terminal extractor 54.

Accordingly, the terminal state obtainer 55 can obtain the operating state of a candidate counterpart terminal that can communicate with a request sender terminal that has sent a login request. The terminal state obtainer 55 also searches the terminal management DB 5002 using the contact ID extracted by the terminal extractor 54 as a search key, and obtains the operating state of a request sender terminal that has sent a login request.

The session manager 56 manages a session with the session management table, when a session is established between the request sender terminal and the counterpart terminal. The session may be established between the request sender terminal 10 and the counterpart terminal 10, the request sender terminal 10 and the counterpart terminal 40, or the request sender terminal 40 and the counterpart terminal 40. In case the terminal 10 or 40 that has established a session with the counterpart terminal 10 or 40, newly establishes a session with another counterpart terminal 10 or 40, the session manager 56 assigns the same conference ID to all of the terminals 10 or 40 in the same videoconference. With the conference ID, all terminate 10 or 40 that are participating in the same videoconference can be identified.

The data processor 59, which may be implemented by the instructions of the CPU 201 and the SSD 205, performs processing to store various types of data in the memory 5000 or read various types of data stored in the memory 5000.

<Functional Configuration of UI Providing Apparatus>

The UI providing apparatus 20 includes a transmitter/receiver 81, a server unit 82, and a data processor 89. These units are functions that are implemented by or that are caused to function by operating any of the hardware components illustrated in FIG. 5 in cooperation with the instructions of the CPU 201 according to the UI providing apparatus control program 2000a expanded from the HD 204 to the RAM 203. In addition, the UI providing apparatus 20 includes a memory 2000 configured by the HD 204. The memory 2000 stores therein layout information lot.

The transmitter/receiver 81 is executed by a plurality of instructions from the CPU 201 and by the network I/F 209, and performs transmission/reception of various types of data (or information) to/from the communication terminal 10 via the communication network 2.

The server unit 82, which is implemented by the instructions of the CPU 201, receives a layout request signal from the communication terminal 10. In response to that signal, the server unit 82 transmits via the transmitter/receiver 81 layout information lot that is read from the memory 2000 by the data processor 89, to the communication terminal 10.

The data processor 89, which may be implemented by the instructions of the CPU 201, performs processing to store various types of data in the memory 2000 or read various types of data stored in the memory 2000. The memory 2000 may be implemented by the ROM 202, RAM 203, or HDD 205, and mainly stores the UI providing apparatus control program 2000a and the layout information lot.

<Functional Configuration of Information Processing Terminal>

Figure 7:
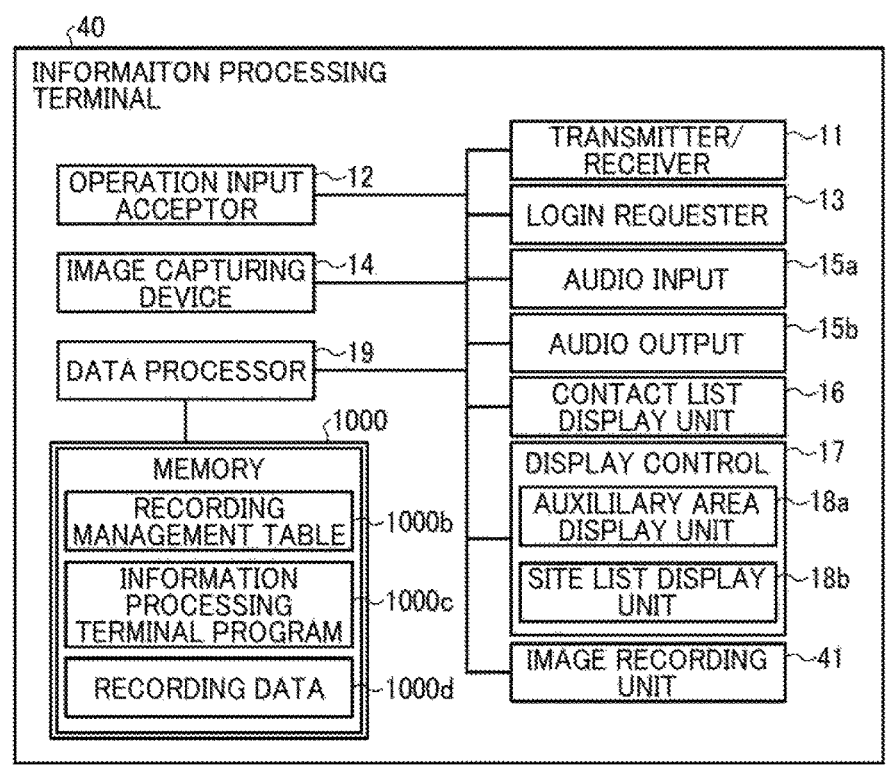
FIG. 7 is a schematic block diagram illustrating a functional configuration of an information processing terminal according to an embodiment of the present invention.

FIG. 7 is a schematic block diagram illustrating a functional configuration of the information processing terminal 40 according to an embodiment of the present invention The information processing terminal 40 is substantially similar to the information processing terminal 10 in function, except that the information processing terminal 40 additionally includes an image recording unit 41. For this reasons, only those differences will be described below. Further, these units illustrated in FIG. 7 are functions that are implemented by or that are caused to function by operating any of the hardware components illustrated in FIG. 4 in cooperation with the instructions of the CPU 101 according to the information processing terminal control program 1000c expanded from the flash memory 104 to the RAM 103. The memory 1000 stores therein the information processing terminal control program 1000c and recording data 1000d.

The image recording unit 41 records image data being displayed at the display 120 or audio data being output from the speaker 115, in the memory 1000 as recording data 1000d. For example, the recording data may be data of a full-screen display image 501 or an information display image 601, which is displayed on the display 120 by the display control 17. Any other image being displayed on the display 120 may be recorded. Any audio that is output from the speaker 115 by the audio output 15b may be recorded, as audio data. In this embodiment, the image recording unit 41 records audio data as well as image data. Alternatively, the image recording unit 41 may record only one of the image data and the audio data.

In this embodiment, the information processing terminal 40 has a function of recording, while the communication terminal 10 does not have such recording function. Alternatively, the communication terminal 10 may be configured to have a recording function.

In alternative to storing the recording data 1000d in the memory 1000, the information processing terminal 40 may store the recording data 1000d in a network attached storage (NAS) on the network.

<Operation>

Next, operation performed by the communication system 1 is described according to an embodiment of the present invention. FIG. 8 is a data sequence diagram illustrating operation of preparing to start communication between the communication terminals 10 to have a videoconference, according to an embodiment. FIG. 8 illustrates an example case in which the communication terminal 10aa prepares for communication. In operation of preparing for communication, various management information is transmitted through a management data session "sei". While the operation of FIG. 8 illustrates the case for the communication terminal 10, the information processing terminal 40 performs operation of preparing to start communication in a substantially similar manner.

When the user of the communication terminal 10aa turns on the power switch 109 of the communication terminal 10aa, the operation input accepter 12 accepts the power on operation and turns on the power (S21). In response to acceptance of the power on operation, the login requester 13 automatically transmits login request information indicating a login request from the transmitter/receiver 11 to the communication management apparatus 50 via the communication network 2 (S22). The login request includes a contact ID for identifying the communication terminal 10aa that sends the login request, and a password. These contact ID and password are read from the memory 1000 by the data processor 19, and transmitted to me transmitter/receiver 11.

p In the case of transmitting login request information from the terminal 10aa to the communication management apparatus 50, the communication management apparatus 50, which is a receiving side, receives the IP address of the communication terminal 10aa, which is a transmitting side.

The terminal authenticator 52 of the communication management apparatus 50 searches the terminal authentication management DB 5001 using a contact ID and a password included in login request information received via the transmitter/receiver 51 as search keys. Based on the search result, the terminal authenticator 52 authenticates the communication terminal 10aa based on a determination of whether the same contact ID and password are managed in the terminal authentication management DB 5001.

When the terminal authenticator 52 determines that the contact ID and password that are the same as the search keys are not managed, the terminal authenticator 52 determines that the communication terminal 10 does not have an authority to use the communication system 1. In such case, the transmitter/receiver 51 transmits authentication result information indicating an authentication result obtained by the terminal authenticator 52 to the starting terminal 10aa that has sent the login request, via the communication network 2.

When the terminal authenticator 52 determines that the same terminal ID and the same password are managed, the terminal authenticator 52 determines that the login request is a login request received from the communication terminal 10 that has a legitimate use authority. In such case, the state manager 53 stores, in the terminal management DB 5003, the contact ID of the communication terminal 10aa, the operating state, and the IP address of the communication terminal 10aa in association with one another (S24).

For example, the terminal management table stores the contact ID "01aa", the operating state "online (communication OK)", and the IP address "1.2.1.3"0 of the communication terminal 10aa, in association with one another.

Next, the transmitter/receiver 51 of the communication management apparatus 50 transmits authentication result information indicating an authentication result obtained by the terminal authenticator 52 to the communication terminal 10aa, which has sent the login request, via the communication network 2 (S25). The communication management apparatus 50 transmits the URI 5005 of the UI providing apparatus 20 to the communication terminal 10aa, together with or separately from the authentication result information. Accordingly, the communication terminal 10 is able to access a UI provided by the UI providing apparatus 20.

The URI 5005 of the UI providing apparatus 20 indicates a storage area on the communication network 2, where the layout information "lot" is stored. For example, the URI 5005 may be described as the "IP address (or domain name)+folder name+file name". However, any other desired description formal may be used, as long as it can be used to access a UI provided by the UI providing apparatus 20.

By not storing the URI 5005 at each communication terminal 10, an administrator of the communication management apparatus 50 only needs to update the URI stored at the communication management apparatus 50, when the UI providing apparatus 20 is replaced or the URI changes. Since it is not required to change the URI at each of the communication terminals 10, a time required for managing the URI is greatly reduced.

The terminal extractor 54 of the communication management apparatus 50 searches the contact list management DB 5003 using the contact ID "01aa" of the communication terminal 10aa that has sent a login request as a search key, and extracts the contact ID of a candidate counterpart terminal that can communicate with the communication terminal 10aa (S26).

Here, for example, the contact IDs (01ab, 01ac, 01ba, 01bb, 01bc, 04bd, 04be, 01ca, 01cb, 01ca, 01da, 01db, 01dc) of counterpart terminals 10 corresponding to the terminal ID "01aa" of the communication terminal 10aa are extracted from the contact list management table (Table 4).

The terminal state obtainer 55 of the communication management apparatus 50 also searches the terminal management DB 5002 by using the contact IDs extracted by the terminal extractor 54 as a search key, which are "01ab, 01ac, 01ba, 01bb, 01bc, 04bd, 04be, 01ca, 01cb, 01ca, 01da, 01db, 01dc", for example. The terminal state obtainer 55 further obtains, from the terminal management DB 5002, by using the contact IDs extracted by the terminal extractor 54, as search keys, to obtain the operating states of the counterpart terminals 10 and 40 (such as, "offline" "online (communication OK)", "online (communicating)", and "recording") (S27).

The transmitter/receiver 51 of the communication management apparatus 50 includes, in the counterpart terminal state information, the contact IDs used as search keys at S27 (01ab, 01ac, 01ba, 01bb, 01bc, 04bd, 04be, 01ca, 01cb, 01ca, 01da, 01db, 01dc), and the operating slates ("offline" "online (communication OK)", "online (communicating)", and "recording") of the counterpart terminals 10 and 40. The transmitter/receiver 51 then transmits the counterpart terminal state information to the communication terminal 10aa via the communication network 2 (S28).

With this counterpart terminal state information, the communication terminal 10aa is able to know the current operating state of each of the candidate counterpart communication terminals 10 or 40.

The terminal extractor 54 of the communication management apparatus 50 searches the contact list management DB 5003 using the contact ID "01aa" of the communication terminal 10aa that has sent a login request as a search key. The terminal extractor 54 then extracts the contact ID of a candidate counterpart terminal 10 or 40 that can communicate with the communication terminal 10aa with the contact ID "01aa" (S29). From the contact list management table of Table 4, the contact IDs "01ba" "01ca", and "04bd" are extracted.

The state manager 53 of the communication management apparatus 50 searches the terminal management DB 5002 using the contact ID "01aa" of the communication terminal 10aa that has sent a login request as a search key. Based on the search, the state manager 52 obtains, from the terminal management DB 5002, the operating state "online (communication OK)" of the communication terminal 10aa that has sent the login request (S30).

Next, the transmitter/receiver 51 of the communication management apparatus 50 selects the communication terminal 10ba and the information processing terminal 40bd each having the operating state "online" in the terminal management DB 5002, from among the communication terminals 10ba, 10ca, and 40db identified with the contact IDs "01ba" "01ca", and "04bd" that are extracted at S29. Those communication terminals 10 that are online are only selected, as the operating state information can only be transmitted to those terminals 10 or 40 that are online. The communication terminal 10 transmits counterpart terminal state information including the terminal ID "01aa" and the operating state "online" of the communication terminal 10aa, obtained at S30, to the communication terminals (10ba and 40bd) whose operating states are "online" (S31-1 and S31-2).

The contact list display unit 16 of the communication terminal 10aa controls the display 120aa to display a contact list screen, based on the counterpart terminal state information received at S28 (S32). FIG. 11 is an illustration of an example contact list screen.

In sending the counterpart terminal state information to the communication terminal 10ba and the information processing terminal 40bd, the transmitter/receiver 51 refers to the IP addresses of the communication terminals with the contact IDs "01ba" and "04bd", which are managed with the terminal management table.

Accordingly, the contact ID "01aa" and the operating state "online (communication OK)" of the communication terminal 10aa which has sent the login request can be transmitted to other counterpart terminals 10ba and 40bd that can communicate with the communication terminal 10aa.

After S28, the display control 17 of the communication terminal 10aa controls the display 120 to display, on the contact list screen, the terminals that are participating in a videoconference with highlight. In this example, the communication terminal 10ba and the information processing terminal 40bd, having the operating state "online (communicating)" are displayed with highlight. This helps the user to easily notice the terminal that is participating in a videoconference.

FIG. 9 is a data sequence diagram illustrating operation of preparing to start communication between the terminals 10 or 40 to have a videoconference, according to an embodiment. FIG. 9 illustrates an example case in which the communication terminal 10aa communicates with the information processing terminal 40bd to have a videoconference. In operation for preparing to start videoconferencing, various management information is transmitted or received through the management data session "sei".

As the user at the communication terminal 10aa presses the operation key 108 and selects the information processing terminal 40bd as a counterpart, the operation input acceptor 12 accepts a request for starting communication with the information processing terminal 40bd to have a videoconference (S41). Since the information processing terminal 40bd is having the videoconference, the request is for participating in the videoconference being carried by the information processing terminal 40bd. In case the communication terminal 10aa is implemented by the information processing terminal 40, instead of selecting with the operation key 108, the user selects a hardware key on the information processing terminal 40 or a software key displayed on a touch panel of the information processing terminal 40.

In response to the selection of the counterpart, the transmitter/receiver 11 of the communication terminal 10*aa* transmits participation request information to the communication management apparatus 50 (S42). The participation request, which requests for participating in videoconference, includes the contact ID "01aa" of the communication terminal 10*aa*, and the contact ID "04bd" of the information processing terminal 40*bd*.

The transmitter/receiver 51 of the communication management apparatus 50 obtains the participation request information, and further receives the IP address "1.2.1.3" of the communication terminal 10*aa*, which is the transmission source.

The state manager 53 of the communication management apparatus 50 searches the terminal management DB 5002 using the contact ID "01aa" of the communication terminal 10*aa* included in the participation request as a search key. The state manager 53 then sets the operating state of the communication terminal 10*aa*, which requests for participation, to the operating state "online (communicating)" (S43). Accordingly, the operating state of the communication terminal 10*aa*, in the terminal management table, is updated as illustrated in Table 3(a).

Next, the transmitter/receiver 51 of the communication management apparatus 50 transmits participation request information, which includes the contact ID "01aa" of the communication terminal 10*aa*, to the information processing terminal 40*bd* through the communication network 2 (S44). With this information, the information processing terminal 40*bd* is able to know the communication terminal 10 that has sent a participation request.

The transmitter/receiver 11 of the information processing terminal 40*bd* transmits reception information that acknowledges reception of the participation request information, to the communication management apparatus 50 via the communication network 2 (S45). The session manager 55 uniquely assigns a session ID to a session to be established between the communication terminal 10*aa* as a request sender, and the information processing terminal 40*bd* as a counterpart. The session manager 55 further registers, in the session management table, the session ID, a relay device ID of a relay device to be used for relaying, a request sender contact ID that is the contact ID "01aa", a counterpart contact ID that is the contact ID "04bd", and a conference ID for the videoconference being performed by the information processing terminal 40*bd*.

The transmitter/receiver 51 of the communication management apparatus 50 transmits relay start request information, which requests for starting relay of content data, to the relay device 30 through the communication network 2 (S46). The relay start request includes the IP addresses "1.2.1.3" and "1.3.1.3" of the communication terminal 10*aa* and the information processing terminal 40*bd*, the session ID, and the conference ID, which have been registered.

The relay device 30 establishes a session for communicating image data having three resolutions, namely, low resolution, intermediate resolution, and high resolution, and audio data between the communication terminal 10*aa* and the information processing terminal 40*bd* (S47). Through the established session, the communication terminal 10*aa* starts participating in the videoconference carried by the information processing terminal 40*bd*.

In case there is other terminal that requests for participating in the videoconference with the communication terminal 10 or the information processing terminal 40, operation of FIG. 9 is performed in a substantially similar manner. That is, in response to a participation request from such terminal, the session manager 56 of the communication management apparatus 50 associates the conference ID for the videoconference that the terminals 10 and 40 are participating, with a session ID assigned to a session to be newly established for the request sender terminal. Accordingly, the communication terminal 10 or the information processing terminal 40 that is participating in the same videoconference will be assigned with the same conference ID, even each terminal communicates through a difference session. The relay device 30 relays image data and audio data between the communication terminals 10 or the information processing terminals 40, which are assigned with the same conference ID.

The transmitter/receiver 51 of the communication management apparatus 50 transmits terminal state change information to each terminal 10 or 40 that is registered in the terminal management DB 5002 (S48-1, S48-2). The terminal state change information includes the contact ID "01aa" of the communication terminal 10*aa* and the operating state "online (communicating)". With this terminal state change information, each communication terminal is able to store the current operating state of the communication terminal 10*aa* with the contact ID "01aa", for example, for display on the contact list screen.

Based on image data and audio data received from the information processing terminal 40*bd* through the established session, the communication terminal 10*aa* is able to display an image and output audio. Similarly, the information processing terminal 40*bd* is able to display an image and output audio based on image data and audio data received from the communication terminal 10*aa*. In case there are three or more terminals 10 or 40 that are participating in the videoconference, image data and audio data are communicated in a substantially similar manner as the above-described case of two terminals. In case of communicating between only two terminals, communication may be performed without intervening the relay device 30. In case of communicating between three or more terminals, image data and audio data may be communicated with a communication protocol, which requires intervention of the relay device 30.

<Recording Operation>

Referring to FIG. 10, operation of recording a videoconference, performed by the information processing terminal 40, is described according to an embodiment. FIG. 10 is a data sequence diagram illustrating operation of recording a videoconference, performed by the information processing terminal 40*bd*, according to the embodiment.

During videoconferencing, the user at the information processing terminal 40*bd* instructs the information processing terminal 40*bd* to start recording image data. The operation input acceptor 12 of the information processing terminal 40*bd* receives the user instruction for recording. At S1, the transmitter/receiver 11 of the information processing terminal 40*bd* transmits a recording start notification to the communication management apparatus 50, with the contact ID "04bd" of the information processing terminal 40*bd*.

The transmitter/receiver 51 of the communication management apparatus 50 receives the recording start notification. At S2, the state manager 53 changes the operating state of the information processing terminal 40*bd*, associated with the contact ID "04bd" in the terminal management table, to the operating state "recording".

The state manager 53 sets each of the operating states of all other communication terminals 10 and the information processing terminals 40 that are having the videoconference with the information processing terminal 40*bd*, to the operating state "recording". All participants or materials to be transmitted by any of the terminals 10 or 40 participating in the same videoconference are subject to recording. With the operating state "recording", the user who is thinking about joining in that videoconference is able to know that the videoconference is being recorded, before the user decides to join in that videoconference.

All of the communication terminals 10 or the information processing terminals 40, which are having the videoconference with the information processing terminal 40*bd* have been registered in the session management table. The terminal extractor 54 extracts, from the session management table, the conference ID associated with the contact ID "04bd" of the information processing terminal 40*bd*. The terminal extractor 54 further extracts all contact IDs that are associated with the extracted contact ID. In this example, the session management table of TABLE 5 indicates that the communication terminals 10*aa* and 10*ba*, with the contact IDs "01aa" and "01ba", are participating in the videoconference that the information processing terminal 40*bd* is participating. Accordingly, the state manager 53 sets the operating state of each of the communication terminals 10*aa* and 10*ba*, to "recording", in addition to setting the operate state "recording" for the information processing terminal 40*bd*.

The state manager 53 further registers the contact ID "04bd" of the information processing terminal 40*b* in the recording management table 5006. The contact IDs of the communication terminals 10*aa* and 10*ba* are not registered, as they are not recording.

At S3, the transmitter/receiver 51 of the communication management apparatus 50 transmits a recording start notification to each one of the communication terminals 10 or the information processing terminals 40 that are having the videoconference with the information processing terminal 40*bd*. The communication terminal 10 or the information processing terminal 40 that is having the videoconference with the information processing terminal 40*bd* can be identified in a substantially similar manner as described above referring to S2. In this example, the information processing terminal 40*bd*, and the communication terminals 10*aa* and 10*bd* are having the videoconference. The transmitter/receiver 51 of the communication management apparatus 50 transmits a recording start notification to the communication terminals 10*aa* and 10*bd*. However, for simplicity, the communication terminal 10*ba* is omitted in FIG. 10.

At S4, when the transmitter/receiver 11 of the communication terminal 10*aa* receives the recording start notification, the display control 17 controls the display 120 to display a recording notification. This operation of displaying is described below referring to FIG. 17.

In response to an instruction for starting recording at the operation input acceptor 12, at S5, the image recording unit 41 of the information processing terminal 40*bd* starts recording image data and audio data.

The user may input an instruction to end recording image and audio data at any time. The operation input acceptor 12 of the information processing terminal 40*bd* receives the user instruction for recording. In response to the instruction for ending recording at the operation input acceptor 12, the image recording unit 41 of the information processing terminal 40*bd* ends recording image data and audio data.

At S7, the transmitter/receiver 11 of the information processing terminal 40*bd* transmits a recording end notification to the communication management apparatus 50, with the contact ID "04bd" of the information processing terminal 40*bd*.

The transmitter/receiver 51 of the communication management apparatus 50 receives the recording end notification. The state manager 53 deletes, from the recording management table 5006, the contact ID "04bd" of the information processing terminal 40*bd*. If the recording management table 5006 does not store any contact ID, the state manager 53 sets the operating state "recording" to "online (communicating)" in the terminal management table for all terminals 10 or 40 that are participating in the videoconference. If the recording management table 5006 stores at least one contact ID, the state manager 53 keeps the operating state "recording" as it is in the terminal management table for all terminals 10 or 40 that are participating in the videoconference.

At S9, the transmitter/receiver 51 of the communication management apparatus 50 transmits a recording end notification to each one of the communication terminals 10 or the information processing terminals 40 that are having the videoconference with the information processing terminal 40*bd*. In this example, the recording end notification is transmitted to the communication terminal 10*aa* and the communication terminal 10*ba*. In FIG. 10, the communication terminal 10*ba* is omitted.

When the transmitter/receiver 11 of the communication terminal 10*aa* receives the recording end notification, at S10, the display control 17 controls the display 120 to stop displaying the recording notification. This operation of stopping display is described below referring to FIG. 17.

In the above-described example, the recording end notification is transmitted in response to the user instruction for ending recording. Alternatively, the recording end notification may be transmitted when an event that triggers ending of recording is detected. For example, when power of the information processing terminal 40*bd* is turned off, the recording end notification may be transmitted.

Further, the information processing terminal 40*bd* may directly transmit the recording start notification or the recording end notification to the communication terminal 10*aa*, without intervening the communication management apparatus 50. Furthermore, in addition to transmitting the recording start notification at the time when the instruction for starting recording is accepted, a recording notification may be transmitted to the communication management apparatus 50 at the time when recording actually starts or any time during when recording is being performed. For example, the recording notification, which indicates that recording is being performed, may be transmitted periodically or any desired time.

Next, example screens to be displayed on the display 120 by the communication terminal 10 are described.

<Contact List Screen>

FIG. 11 illustrates an example contact list screen, displayed at S32 of FIG. 8. The contact list screen includes the operating state and the terminal name, based on the counterpart terminal state information transmitted at S28. For the descriptive purposes, the contact list screen of FIG. 11 is assumed to be generated based on the terminal management table of Table 3(b) for display at the communication terminal 10*aa*. More specifically, the contact list screen of FIG. 11 is generated based on the counterpart terminal state information revived at S28 of FIG. 8, which includes information obtained from the terminal management table (Table 3(b)). However, since the contact list screen of FIG. 11 is displayed at the communication terminal 10*aa* before the terminal 10aa participates in the videoconference, in the terminal management table, the communication terminal 10aa still has the operating state "online (communication OK)". FIG. 11 is an illustration for explaining operation of generating a contact list screen based on the terminal management table, according to an embodiment.

The contact list management table (Table 4) stores, as contact IDs of counterpart terminals for the communication terminal 10aa with the contact ID "01aa", "01ab, 01ac, 01ba, 01bb, 01bc, 04bd, 04be, 01ca, 01cb, 01ca, 01da, 01db, and 01dc". Of those counterpart terminals, the information processing terminal 40bd with the contact ID "04bd" and the communication terminal 10ba with the contact ID "01ba" are participating in the videoconference being recorded. The contact list display unit 16 thus displays the recording site mark 71, in an area for displaying the operating state, for the terminals 10ba and 40bd. Since all other candidate counterpart terminals 10 or 40 each have the operating state "offline", the contact list display unit 16 displays the icon indicating the "offline" state for each of the other candidate counterpart terminals 10 or 40.

Since the operating state indicating recording (recording site mark 71) is displayed for each of the candidate counterpart terminals participating in the videoconference being recorded, the user is able to know beforehand whether a videoconference that the user is going to participate in is being recorded. Based on this information indicating that the videoconference is being recorded, the user may decide not to participate in such videoconference.

FIG. 12 is an example of a confirmation dialog 510 to be displayed, when the recording site mark 71 of FIG. 11 is selected by the user. The operation input acceptor 12 accepts a user selection of the recording site mark 71 on the contact list screen of FIG. 11. The contact list display unit 16 controls the display 120 to display the confirmation dialog 510.

The confirmation dialog 510 displays a message 511 "Are you sure you want to participate in conference being recorded?", an "OK" key 512, and a "Cancel" key 513. As the user selects the "OK" key 512, the communication terminal 10aa transmits the participation request information as described above referring to S41 of FIG. 9. As the user selects the "Cancel" key 513, the communication terminal 10aa does not transmit such participation request information, and returns to display the contact list screen of FIG. 11. Since the recording site mark 71 is displayed with the contact list screen that lists one or more candidate counterpart terminals, the user is able to know that the videoconference is being recorded, before the user participates in such videoconference to communicate with a specific counterpart terminal.

In this embodiment, the display control 17 controls the display 120 to display the full-screen display image in the full-screen display mode, and the information display image in the information display mode.

Figure 13:
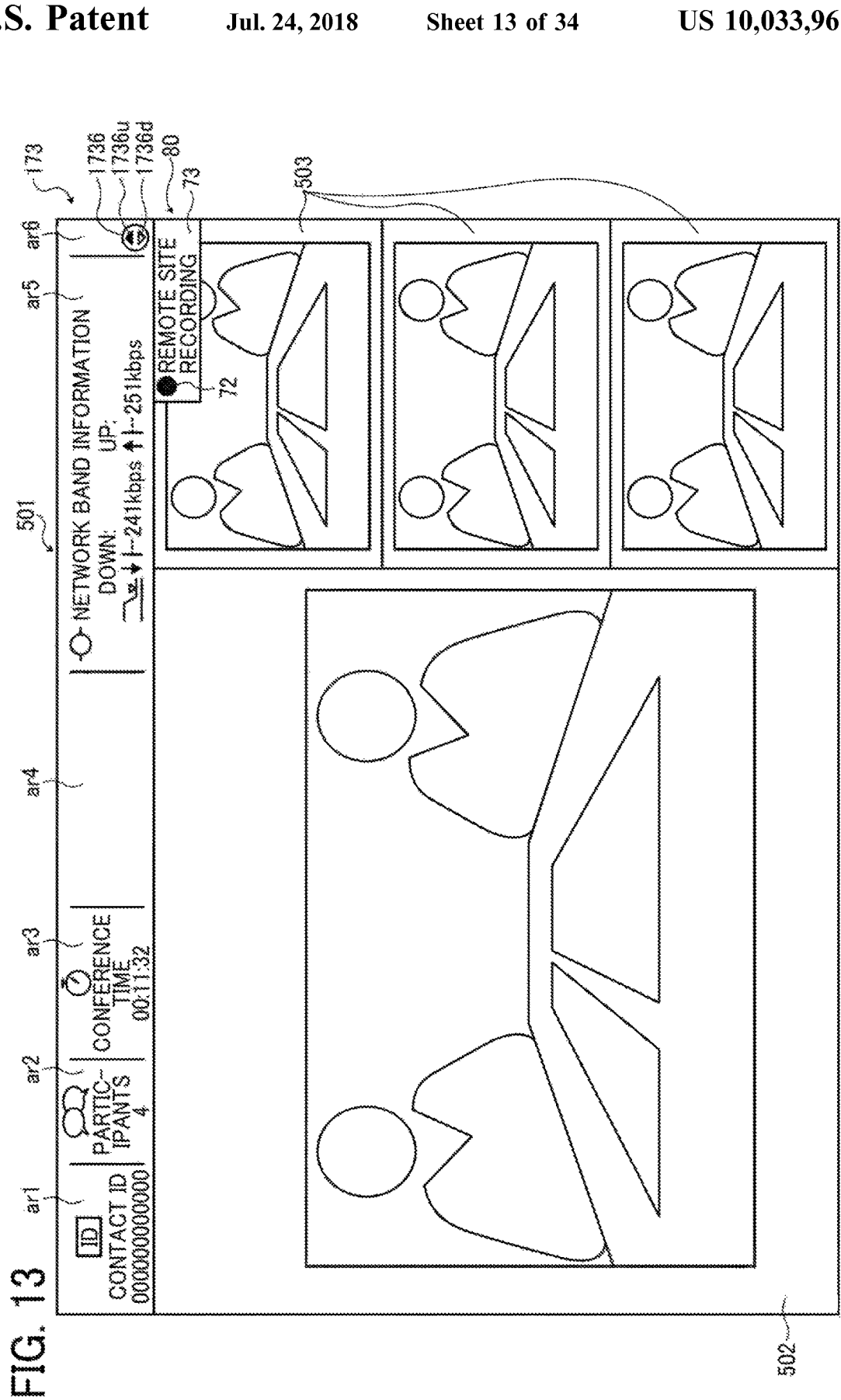
FIG. 13 is an illustration of an example full-screen display image, with an auxiliary area being displayed in a standard form.

FIG. 13 illustrates an example screen to be displayed on the display 120 in the full-screen display mode, which is referred to as the full-screen display image 501. The full-screen display image 501 is displayed, when transmission or reception of image data and audio data starts after establishing the session at S47 of FIG. 9. Of the above-described two types of images to be displayed in different modes, the full-screen display image 501 is displayed most during videoconferencing.

In the full-screen display mode, the display control 17 of the communication terminal 10 controls the display 120 to display images that are transmitted respectively from the counterpart terminals 10 or 40 that are participating in the videoconference. If an image area for displaying each image becomes too small due to a size of the entire screen being displayed, only a selected number of images may be displayed as long as the number of display images does not go over a predetermined maximum number of images.

The full-screen display image 501 illustrated in FIG. 13 includes a first image area 502 that is larger in size, and a second image area 503 that is smaller in size. For example, the second image area 503 may display images that are respectively transmitted from the terminals 10 or 40 that are participating in the videoconference. The first image area 502 displays an image that is transmitted from selected one of the terminals 10 or 40 that are participating in the videoconference.

For example, the display control 17 may select, from among the terminals 10 or 40 that are participating in the videoconference, the terminal 10 or 40 operated by the user who is currently speaking, bused on received audio data, to display an image of the user who is currently speaking in the first image area 502. If there are two or more selected terminals each being operated by the user speaking, the selected terminate are sorted in order from the terminal outputting audio with a higher volume (operated by the user with a larger voice) to the terminal output ting audio with a lower volume (operated by the user with a smaller voice). The display control 17 displays images of the users at those terminals in the first image area 502, in order from the user with a larger voice to the user with a smaller voice, based on sorting of the selected terminals.

The full-screen display image 501 illustrated in FIG. 13 is just exemplary. In another example, the full-screen display image may display a plurality of image areas each in the same size to display images of respective terminals. In another example, the full-screen display image may only display an image of the selected terminal in one screen.

The full-screen display image 501 further includes an auxiliary area 173. The auxiliary area display unit 18a controls the display 120 to display the auxiliary area 173 in the full-screen display mode. In FIG. 13, the auxiliary area 173 is displayed as a banner frame, which is placed at an upper portion of the full-screen display image. Alternatively, the auxiliary area 173 may be displayed at any portion, such as at a right, left, or lower portion of the full-screen display image. Alternatively, the auxiliary area 173 may be displayed over the image being displayed, in a manner that partially superimposes the image.

The auxiliary area 173 is divided into a plurality of sub-areas including a first sub-area area "ar1", second sub-area "ar2", third sub-area "ar3", fourth sub-area "ar4", fifth sub-area "ar5", and sixth sub-area "ar6". The first sub-area "ar1" displays the contact ID of the local communication terminal 10, that is, the communication terminal 10aa in this example. In case the user wants to join in videoconferencing with a terminal that is not registered (such as the user's own mobile terminal), the user may enter this contact ID being displayed at the communication terminal 10aa, into the user's terminal. With this contact ID, the user is able to participate in the same videoconference that the terminal 10aa is participating, as the user were operating the terminal 10aa. The second sub-area "ar2" displays a number of videoconferencing sites. The third sub-area "ar3" displays a videoconferencing time, counted from a time when the session is established. The fourth sub-area "ar4" displays information, which may be arbitrarily determined. The fifth sub-area "ar5" displays network broadband information, such as communication speeds both in an incoming direction and an outgoing direction. The sixth sub-area "ar6" displays a cursor 1736. The cursor 1736 includes an upward-pointing arrow 1736*u* displayed in black, and a downward-pointing arrow 1736*d* displayed in white. The upward-pointing arrow 1736*u* is operable, while the downward-pointing arrow 1736*d* is not operable. When the upward-pointing arrow 1736*u* is selected, the auxiliary area 173 is displayed in the simple form, as described below.

In this example, the auxiliary area 173 is preferably displayed as semi-transparent. Even when the auxiliary area 173 is displayed over the image being displayed in the first image area 502, the image in the first image area 502 can be made visible to the user.

The cursor 1736 in the sixth sub-area "ar6" informs the user that a display mode of the auxiliary area 173 can be switched to a simple display mode, which will be described below. In the simple display mode, the auxiliary area 173 is displayed in the simple form. In this disclosure, the auxiliary area of FIG. 13 that is displayed in a standard display mode is referred to as the "standard auxiliary area". The auxiliary area described below referring to FIG. 14 that is displayed in the simple display mode is referred to as the "simple auxiliary area".

In this example, the upward-pointing arrow 1736*u* and the downward-pointing arrow 1736*d* in the cursor 1736 are selected, respectively, by performing different operations using two portions of the operation key 108. More specifically, in this example, the operation key 108 is provided with a button having two portions, which can be selectively depressed. The upward-pointing arrow 1736*u* is selected in response to pressing of one portion of the button. The downward-pointing arrow 1736*d* is selected in response to pressing of the other portion of the button. In another example, the operation key 108 may be provided with a swing-away arm, which changes its pointing direction according to user operation.

In response to receiving the recording start notification, the auxiliary area display unit 18*a* extends the auxiliary area 173, and displays recording notification information 80 on the auxiliary area 173. In this example, the recording notification information 80 is preferably displayed as semi-transparent. In FIG. 13, a lower right portion of the auxiliary area 173 is extended to additionally display the recording notification information 80 and a remote site recording mark 72. The extended lower right portion of the auxiliary area 173 further displays a label 73 "REMOTE SITE RECORDING", at the right of the remote site recording mark 72. As the recording notification information 80, at least one of the remote site recording mark 72 and the label 73 may be displayed. With display of the remote site recording mark 72 or the label 73, the user at each terminal 10 or 40 is able to instantly know that the videoconference is being recorded at other site. As described referring to FIG. 10, whenever at least one site that is participating in the videoconference is recording, the auxiliary area display unit 18*a* displays the recording notification information 80.

In this example, the remote site recording mark 72 is displayed in the form of a circle of red or orange, the remote site recording mark 72 may be have any desired appearance in terms of color, shape, or size, for example. In another example, the remote site recording mark 72 may have a triangular or rectangular shape, or have a color of blue or green. The size may be made smaller or larger than that of FIG. 13 or 14. The place where the recording notification information 80 is displayed may be any place other than the lower right portion. Other examples include, but not limited to, a lower left portion, upper right portion, upper left portion, upper central portion, lower central portion of the auxiliary area 173. In case there is a blank space on the auxiliary area 173, at least one of the remote site recording mark 72 and the label 73 may be placed at such blank space.

Figure 14:
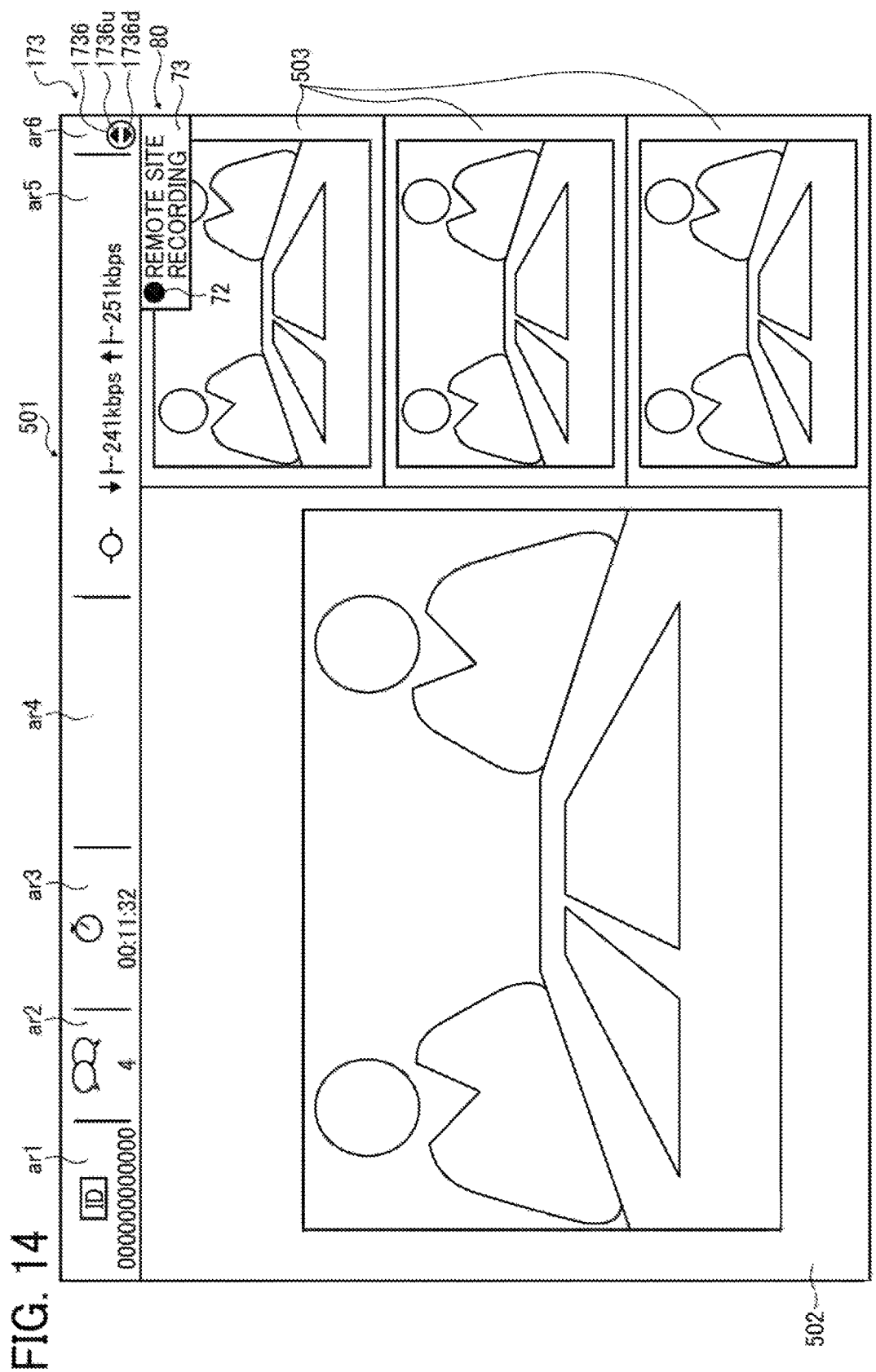
FIG. 14 is an illustration of an example full-screen display image, with an auxiliary area being displayed in a simple form.

FIG. 14 illustrates another example of the full-screen display image 501, with the auxiliary area 173 being displayed in a simple form, when the simple display mode is selected. FIG. 14 displays the example case of having four participating terminals as described above referring to FIG. 13. In the full-screen display image 501 of FIG. 14, information in the first to sixth sub-areas "ar1" to "ar6" are displayed in a simple form. More specifically, the auxiliary area 173 in the simple display mode does not show detailed information describing a type of information being displayed. The first sub-area "ar1" only displays a value of the contact ID. The second sub-area "ar2" only displays a number of videoconferencing sites that are participating. The third sub-area "ar3" only displays a value of the videoconferencing time. The fifth sub-area "ar5" only displays values of communication speeds indicating the network band.

The cursor 1736 in the sixth sub-area "ar6" differs in appearance from that of the standard auxiliary area 173 illustrated in FIG. 13. In the simple auxiliary area 173, the upward-pointing arrow 1736*u* and the downward-pointing arrow 1736*d* are displayed in black. That is, the upward-pointing arrow 1736*u* and the downward-pointing arrow 1736*d* may both be operated by the user with the operation key 108.

The display of the auxiliary area 173 is controlled according to operation of the cursor 1736. When the downward-pointing arrow 1736*d* is selected, the auxiliary area display unit 18*a* switches to the standard auxiliary area 173. When the upward-pointing arrow 1736*u* is selected, the auxiliary area display unit 18*a* does not display the auxiliary area 173 at all. That is, none of the standard auxiliary area 173 and the simple auxiliary area 173 is displayed.

Since the simple auxiliary area 173 has a display area smaller than that of the standard auxiliary area 173, the user can see more of the image in the display area 502 while still checking information on the auxiliary area 173.

In this example, the simple auxiliary area 173 is preferably displayed as semi-transparent.

As the recording notification information 80, the simple auxiliary area 173 may display one of the remote site recording mark 72 and the label 73 in a substantially similar manner as described above for the case of the standard auxiliary area 173. The auxiliary area display unit 18*a* may freely change appearance of the recording notification information 80, for example, by not displaying one of the remote site recording mark 72 and the label 73. As described above for the cases of the standard auxiliary area 173 and the simple auxiliary area 173, the recording notification information 80 is displayed to indicate that recording is being performed. This allows the user at each site to know a state of recording, in real time.

Figure 15:
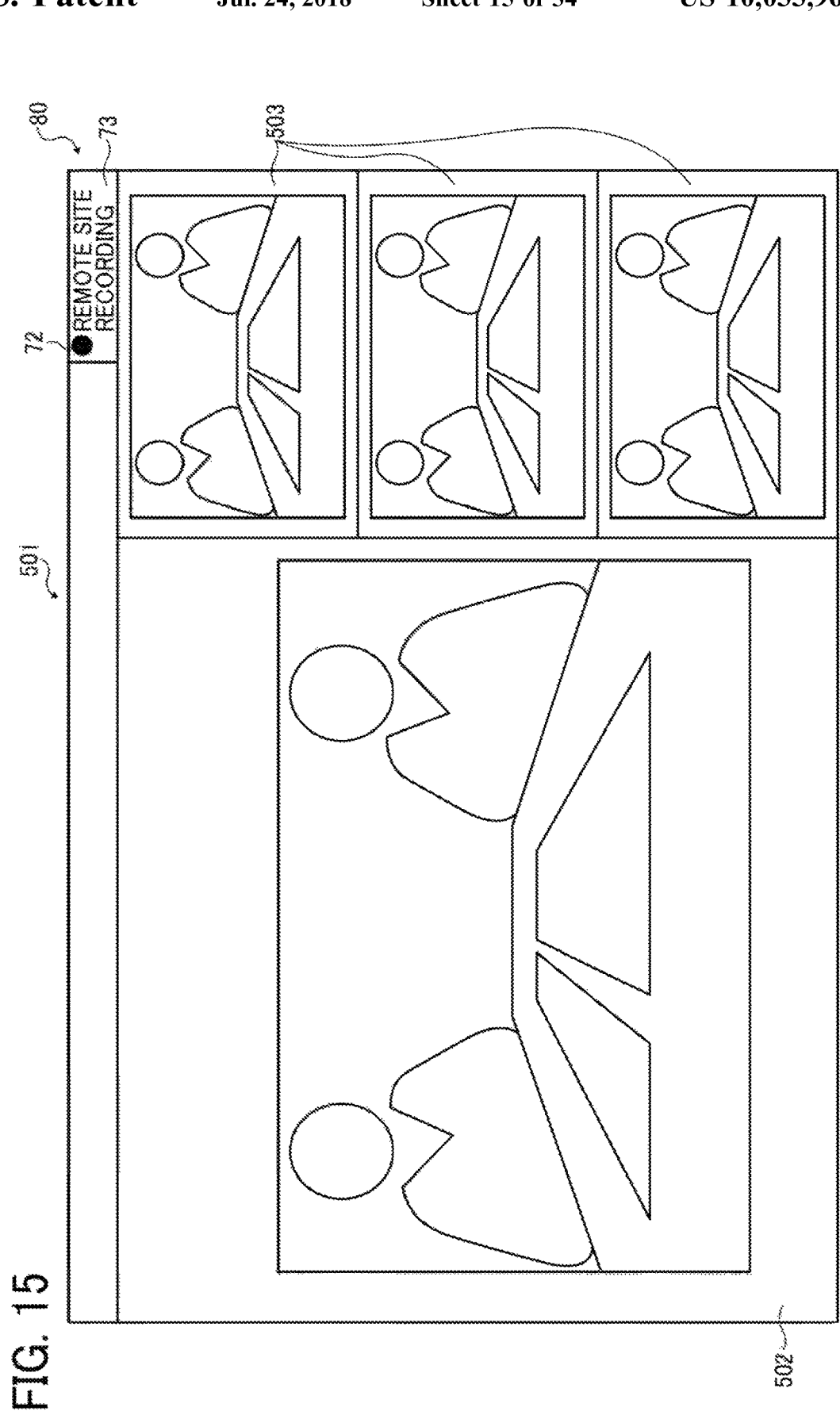
FIG. 15 is an illustration of an example full-screen display image, without an auxiliary area, but with a remote site recording mark and a label being displayed.

FIG. 15 illustrates another example screen, which displays the remote site recording mark 72 and the label 73, without displaying the auxiliary area 173. The screen of FIG. 15 is displayed, when the user selects the upward-pointing arrow 1736*u* on the screen illustrated in FIG. 14. The auxiliary area display unit 18*a* displays the recording notification information 80, even when the auxiliary area 173 is not displayed. That is, even the auxiliary area 173 is not displayed, for example, according to a user instruction, the auxiliary area display unit 18*a* keeps displaying the recording notification information 80 to indicate whether the videoconference is being recorded. This allows the user at each site to know a state of recording, in real time.

Figure 16:
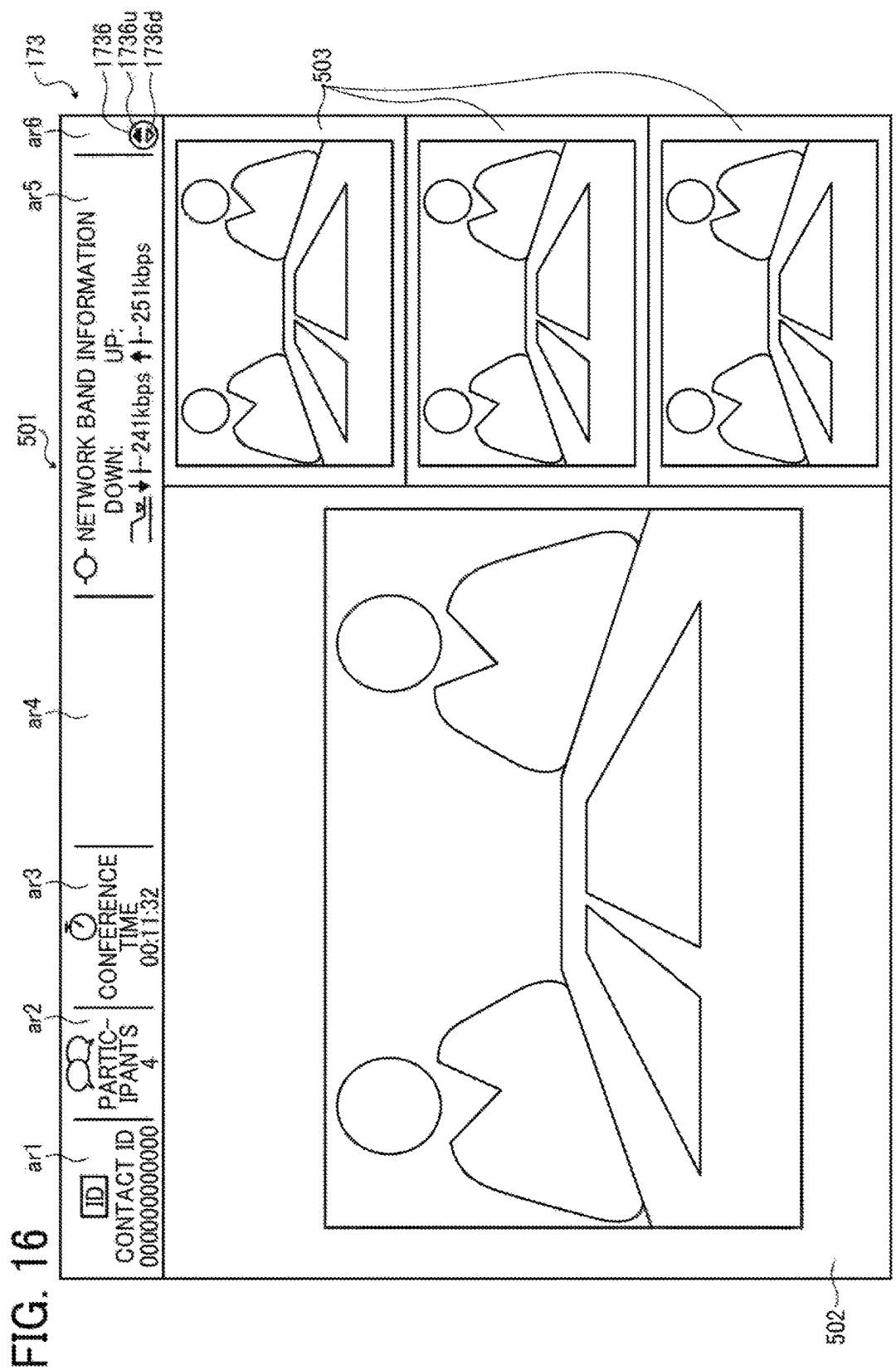
FIG. 16 is an illustration of an example full-screen display image, when none of videoconferencing sites is recording.

FIG. 16 illustrates another example screen of the full-screen display image 501, when none of the videoconferencing sites is recording. In FIG. 16, the standard auxiliary area 173 is displayed. As illustrated in FIG. 16, when there is no site that is recording, the auxiliary area display unit 18a does not display the recording notification information 80. This allows the user at each site to know that the videoconference is not being recorded, in real-time. When none of the sites is recording, the recording notification information 80 is not displayed in the case of the simple auxiliary area 173 (FIG. 14), or when the auxiliary area 173 is not displayed (FIG. 15).

<Display Control of Recording Notification>

Figure 17:
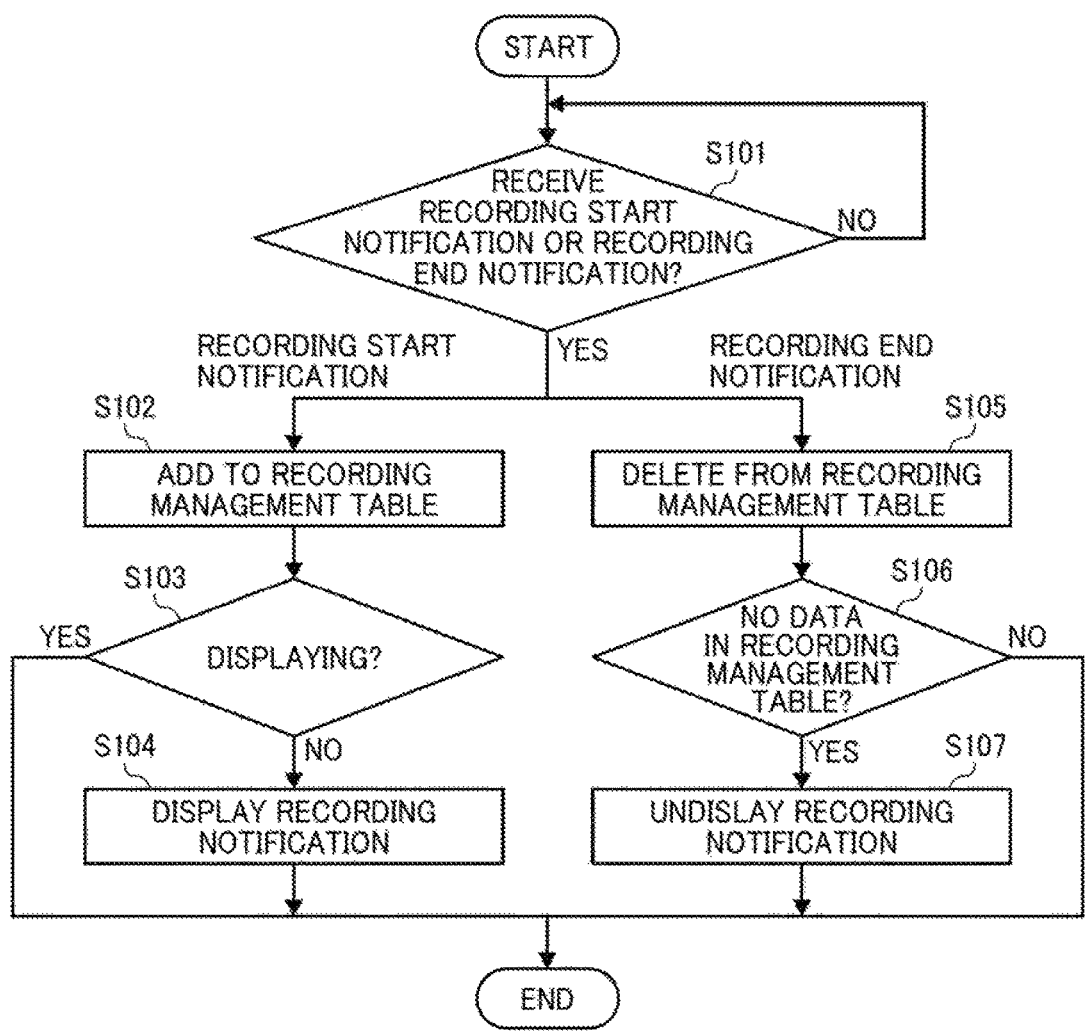
FIG. 17 is a flowchart illustrating operation of controlling display of recording notification information, performed by the communication terminal participating in the videoconference, according to an embodiment.

FIG. 17 is a flowchart illustrating operation of controlling display of recording notification information 80, performed by the communication terminal 10aa during videoconferencing, according to an embodiment. Since the full-screen display image 501 always displays the recording notification information 80 when recording is being performed, for the operation of FIG. 17, it does not matter whether the auxiliary area is being displayed or not or how the auxiliary area is being displayed. For this reasons, the operation of FIG. 17 applies to all of the cases illustrated in FIGS. 13 to 15.

The auxiliary area display unit 18a determines whether a recording start notification or a recording end notification is received (S101).

When it is determined that the recording start notification is received, the auxiliary area display unit 18a adds the contact ID, transmitted with the recording start notification, to the recording management table 1000b. The recording management table 1000b stores contact IDs of all communication terminals 10 or the information processing terminals 40 that are recording.

The auxiliary area display unit 18a determines whether the recording notification information 80 is being displayed. The recording notification information 80 is already displayed, when other communication terminal 10 or information processing terminal 40 transmits a recording start notification, after the communication terminal 10 or information processing terminal 40 participating in the videoconference has transmitted a recording start notification.

When it is determined that the recording notification information 80 is being displayed ("YES" at S103), the operation of FIG. 17 ends as the recording notification information 80 has been displayed.

When it is determined that the recording notification information 80 is not being displayed ("NO" at S103), the auxiliary area display unit 18a displays the recording notification information 80 (S104).

When the recording end notification is received at S101, the auxiliary area display unit 18a deletes from the recording management table 1000b the contact ID transmitted with the recording start notification (S105). The recording management table 1000b stores contact IDs of all communication terminals 10 or the information processing terminals 40 that keep recording.

The auxiliary area display unit 18a determines whether no contact ID is stored in the recording management table 1000b (S106).

When it is determined that at least one contact ID is stored in the recording management table 1000b ("NO" at S106), the auxiliary area display unit 18a determines that there is at least one communication terminal 10 or information processing terminal 40 that keeps recording. Thus, the operation of FIG. 17 ends as there is no need to stop displaying the recording notification information 80.

When it is determined that no contact ID is stored in the recording management table 1000b ("YES" at S106), the auxiliary area display unit 18a determines that there is no terminal 10 or 40 that keeps recording. Thus, the auxiliary area display unit 18a stops displaying recording notification information 80 (S107).

Through operation of FIG. 17, display of the recording notification information 80 is controlled in real time, to indicate whether the communication terminal 10 or information processing terminal 40 is recording or not. As long as at least one contact ID is stored in the recording management table 1000b, the recording notification information 80 is displayed.

<Communication Interruption>

During videoconferencing, a session may be interrupted due to network degradation, such as bandwidth degradation. In some cases, the user may accidentally unplug the cable to be used for communication. Even when the communication terminal 10 or information processing terminal 40 that is recording, becomes incapable of recording due to interruption in communication, other communication terminal 10 or information processing terminal 40 may still display the recording notification information 80 unless such communication failure is notified. In view of this, the communication management apparatus 50 may detect a communication state of the communication terminal 10 or information processing terminal 40 that is recording, and notify other communication terminal 10 or information processing terminal 40 of a communication failure if a communication failure is detected at the terminal 10 or 40 that is recording.

Figure 18:
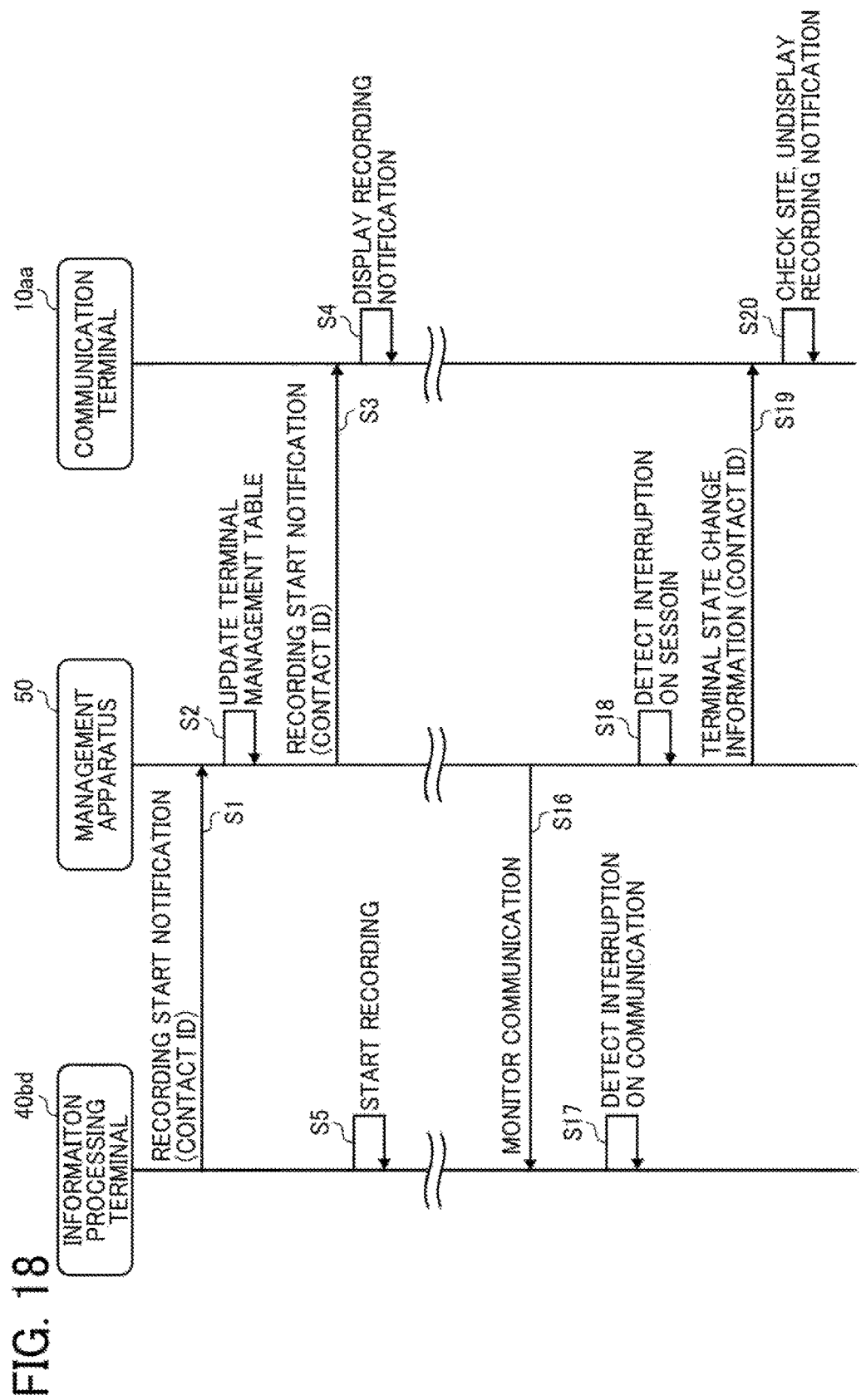
FIG. 18 is a data sequence diagram illustrating operation of controlling display of recording notification information when a communication failure is detected, performed by the communication system, according to an embodiment.

FIG. 18 is a data sequence diagram illustrating operation of monitoring a communication failure, performed by the communication system 1, according to an embodiment. S1 to S5 of FIG. 18 are performed in a substantially similar manner as described above referring to S1 to S5 of FIG. 10.

At S16, the session manager 56 of the communication management apparatus 50 periodically monitors whether the terminal 10 or 40 participating in the videoconference is communicable. That is, the communication management apparatus 50 requests for Ping response, to each one of the terminals 10 or 40 participating in the session, which can be identified with the contact IDs registered in the session management table.

When the session between the communication management apparatus 50 and the terminal 10 or 40 is being disconnected due to some reasons, at S17, the session manager 56 detects that the terminal 10 or 40 is not capable of communicating.

In response to detection of disconnection of a session at the session manager 56, at S18, the session manager 53 changes the operating state associated with the contact ID of the terminal 10 or 40 that is not communicating, to "offline". In this example, it is assumed that a communication failure is detected at the information processing terminal 40bd that is recording. In such case, the session manager 53 changes the operating state "recording" to "offline" for the information processing terminal 40bd. The state manager 53 deletes, from the recording management table 5006, the contact ID "04bd" of the information processing terminal 40bd. The state manager 53 further updates the operating state of each one of the terminals participating in the same videoconference in the terminal management table, in a substantially similar manner as described above referring to FIG. 17 for the case when the recording end notification is received.

At S19, the transmitter/receiver 51 of the communication management apparatus 50 transmits terminal state change information to the communication terminals 10 or information processing terminals 40 that are participating in the videoconference. The terminal state change information includes the contact ID "04bd" and the operating state "offline" of the information processing terminal 40bd.

At S20, the communication terminal 10aa, which receives the terminal state change information at the transmitter/receiver 11, controls display of the recording notification information 80. That is, when there is no contact ID is being stored in the recording management table 1000b for that videoconference, the communication terminal 10aa stops displaying the recording notification information 80.

Figure 19:
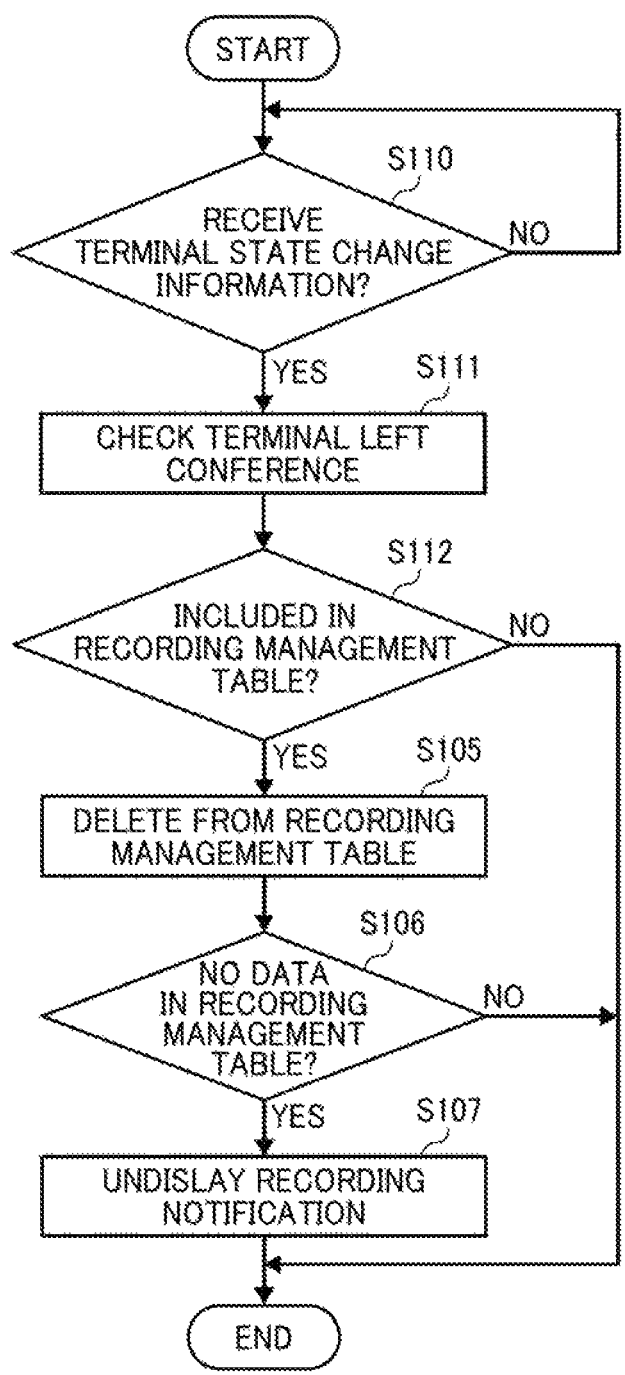
FIG. 19 is a flowchart illustrating operation of controlling display of the recording notification information based on terminal state change information, performed by the communication terminal, according to an embodiment.

The operation of S20 is described referring to FIG. 19. FIG. 19 is a flowchart illustrating operation of controlling display of the recording notification information based on terminal state change information, performed by the communication terminal 10aa, according to an embodiment. The operation of FIG. 19 is repeatedly performed during videoconferencing.

At S110, the data transmitter 11 of the communication terminal 10aa determines whether the terminal state change information is received from the communication management apparatus 50.

When it is determined that the terminal state change information is received ("YES" at S110), at S111, the auxiliary area display unit 18a checks the communication terminal 10 or the information processing terminal 40 that left from the videoconference (having the operating state "offline"). More specifically, the communication terminal 10aa constantly receives the counterpart terminal state information or terminal state change information. Thus, by checking the most recent counterpart terminal state information or terminal state change information, the communication terminal 10aa is able to check the current operating state of the terminal 10 or 40. For example, the communication terminal 10aa compares between the previously obtained counterpart terminal state information or terminal state change information, with the received terminal state change information, to reflect the current operating state of each terminal. Based on comparison, the communication terminal 10aa is able to obtain the contact ID of the terminal 10 or 40 with the operating state that changes from "recording" to "offline".

At S112, the auxiliary area display unit 18a determines whether the obtained contact ID is stored in the recording management table 1000b.

When the obtained contact ID is not stored in the recording management table 1000b ("NO" at S112), the operation of FIG. 19 ends based on a determination that the terminal that has left the videoconference has not been recording.

When the obtained contact ID is stored in the recording management table 1000b ("YES" at S112), at S105, the auxiliary area display unit 18a determines that the terminal has been recording, and deletes the obtained contact ID from the recording management table 1000b. In this example, the contact ID "04bd" of the information processing terminal 40bd is deleted.

The auxiliary area display unit 18a determines whether no contact ID is stored in the recording management table 1000b (S106).

When it is determined that at least one contact ID is stored in the recording management table 1000b ("NO" at S106), the auxiliary area display unit 18a determines that there is at least one communication terminal 10 or information processing terminal 40 that keeps recording. Thus, the operation of FIG. 19 ends as there is no need to stop displaying the recording notification information 80.

When it is determined that no contact ID is stored in the recording management table 1000b ("YES" at S106), the auxiliary area display unit 18a determines that there is no terminal 10 or 40 that keeps recording. Thus, the auxiliary area display unit 18a stops displaying recording notification information 80 (S107).

Through the operation of FIG. 19, even when the operating state of the videoconferencing site changes, the communication terminal 10aa is able to change display of the recording notification information 80 in real-time.

Now, the recording site mark 71 to be displayed on the information display image 601, is described according to an embodiment. The user may switch between two different display modes, for example, by operating the operation key 108. In case of the information processing terminal 40, instead of selecting with the operation key 108, the user selects a hardware key on the information processing terminal 40 or a software key displayed on a touch panel of the information processing terminal 40.

FIG. 20 illustrates an example of the information display image 601, displayed on the display 120, in the information display mode. FIG. 20 illustrates an example case in which the information display image 601 is displayed at the communication terminal 10aa. As illustrated in FIG. 20, in the information display mode, the site list display unit 18b of the communication terminal 10aa controls the display 120 to display, for each terminal 10 or 40 that is participating in the videoconference, a sequential number 614, the terminal name 615, and the contact ID (terminal ID) 616. The sequential number 614 is a number arbitrarily assigned to each terminal when the terminal starts participating in the session. The largest sequential number 614 corresponds to a total number of videoconferencing sites (or the number of participating terminals).

The recording site mark 71 is displayed for the information processing terminal 40bd. As described below, the site list display unit 18b displays the recording site mark 71, in front of the sequential number assigned to the terminal 10 or 40 having the operating state "recording". The recording site mark 71 may be displayed in any appearance other than that of FIG. 20.

The information display image 601 illustrated in FIG. 20 includes an image display area 520 for displaying an image, and a terminal information display area 530 for displaying terminal information. For example, the terminal information display area 530 lists the terminals 10 or 40 that are participating in the videoconference.

Of those participating terminals displayed on the list, the terminal with the sequential number "02" is the terminal 10 that is not registered as a candidate counterpart terminal for the terminal 10aa in the contact list management table 5003. For example, as illustrated in Table 4, the communication terminal 10ab with the contact ID "01ab" has been registered in the contact list management DB 5003 as a candidate for the communication terminal 10aa. Thus, the terminal name is displayed for the communication terminal 10ab. The communication terminal 10cd with the contact ID "01cd" is not registered in the contact list management DB 5003 as a candidate for the communication terminal 10aa. Thus, the terminal name is not displayed for the communication terminal 10cd having the contact ID "01cd".

The image display area 520 displays an image based on image data transmitted from at least one terminal, selected from among the terminals 10 or 40 participating in the videoconference. For example, the communication terminal 10 or the information processing terminal 40 that outputs audio data with the largest volume may be selected.

Still referring to FIG. 20, if all of the terminals 10 or 40 that are participating cannot be displayed in the entire screen of the information display image 601 at once, a scroll bar 613 may be displayed. The user may scroll up or down the scroll bar 613 to display any other terminal 10 or 40, which is not displayed on the information display image 601. For example, in addition to the terminal 40bd being displayed in FIG. 20, there may be any other terminal that is recording, which is indicated by the recording site mark 71.

Figure 21:
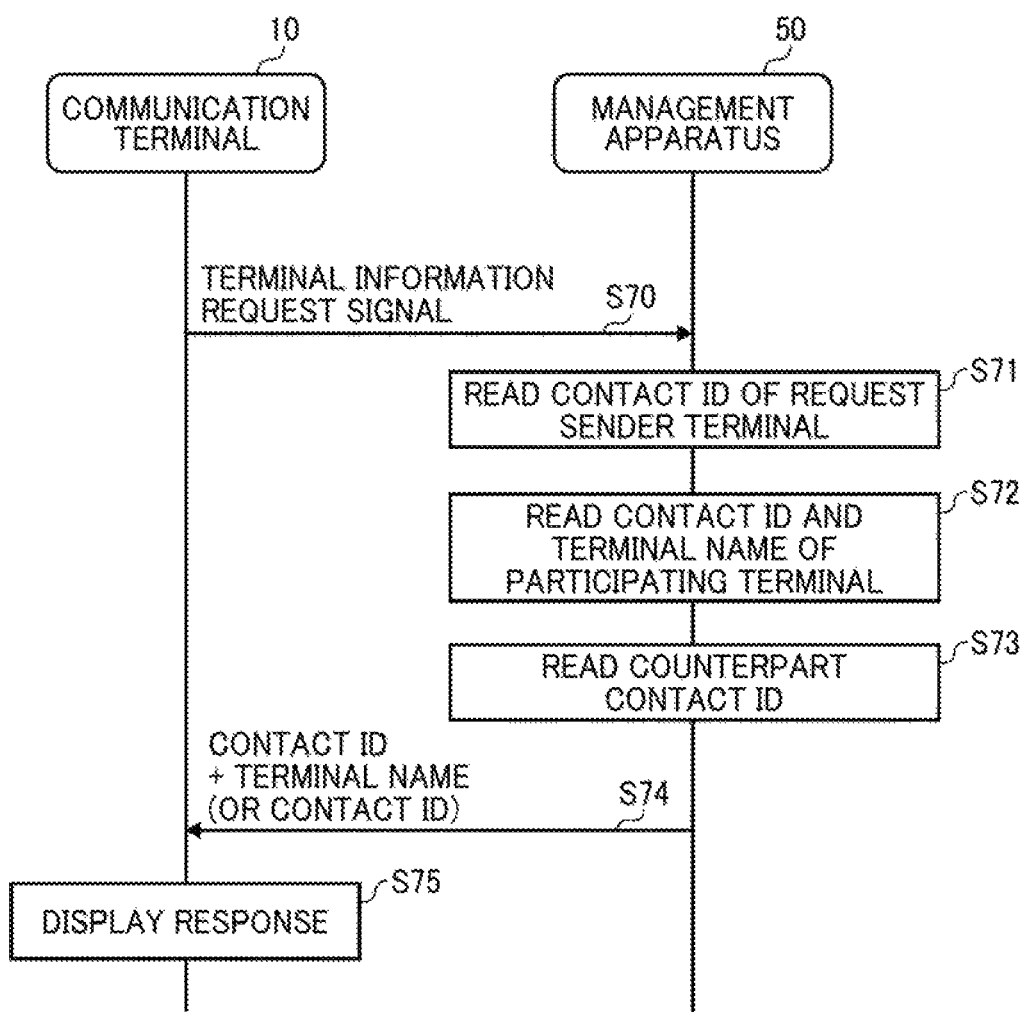
FIG. 21 is a data sequence diagram illustrating operation of displaying terminal information in a terminal information display area, when the communication terminal is switched to the information display mode, according to an embodiment.

FIG. 21 is a data sequence diagram illustrating operation of displaying terminal information in the terminal information display area 530, when the communication terminal 10aa is switched to the information display mode, according to an embodiment. In operation of preparing for displaying terminal information in FIG. 20, various information is transmitted or received through the management data session "sei".

The communication terminal 10aa transmits a terminal information request signal to the communication management apparatus 50, which requests for terminal information regarding the terminal 10 or 40 that are participating in the videoconference (S70). For example, in response to a user instruction to switch to the information display mode from the full-screen display mode with the operation key 108, the operation input acceptor 12 receives such user instruction, and transmits the terminal information request signal to the communication management apparatus 50. Together with the request, an IP address of the communication terminal 10aa may be sent.

The terminal state obtainer 55 of the communication management apparatus 50, which receives the terminal information request signal, searches the terminal management DB 5002 in the memory 5000 using the IP address of the terminal 10aa that sends the request as a search key, to obtain the contact ID of the terminal 10aa (S71). The communication terminal 10aa may send the contact ID of the communication terminal 10aa at S70. In such case, the communication management apparatus 50 obtains the contact ID from the request.

The terminal state obtainer 55 refers to the session management table, to obtain the contact IDs of the terminals 10 or 40 that are participating in the same videoconference that the communication terminal 10aa is participating. The terminal state obtainer 55 searches the terminal management DB 5002 using the obtained contact IDs, to only extract the contact IDs that are associated with the operation state "online (communicating)" or "recording". With the contact IDs, the terminal names that are stored in association are also extracted (S72). Accordingly, a pair of the contact ID and the terminal name is obtained for each participating terminal. However, in some cases, there may be only the contact ID stored in the terminal management DB 5002, for the terminal that is not registered to the contact list management DB 5003.

The terminal state obtainer 55 searches the contact list management DB 5003 in the memory 5000, using the contact ID "01aa" obtained at S71 as a search key, to obtain the contact IDs of the candidate counterpart terminals 10 or 40 for the request sender terminal 10aa (S73).

The terminal state obtainer 55 determines whether each one of the contact IDs obtained at S72 matches the contact ID "01aa" of the request sender terminal 10aa or any one of the counterpart contact IDs that are obtained at S73. When it is determined that the contact ID obtained at S72 matches, the terminal state obtainer 55 determines that the participating terminal is registered as a counterpart terminal for the request sender terminal 10aa. The transmitter/receiver 51 sends the contact ID and the associated terminal name of the registered counterpart terminal, to the request sender terminal 10aa. When it is determined that the contact ID does not match, the terminal state obtainer 55 determines that the participating terminal is not registered as a counterpart terminal for the request sender terminal 10aa. The transmitter/receiver 51 sends only the contact ID obtained at S72, to the request sender terminal 10aa (S74).

The contact list display unit 18b of the communication terminal 10aa controls the display 120 to display terminal information based on the received contact ID and terminal name (or the received contact ID) of each terminal that is participating in the videoconference, in the terminal information display area 530 of the information display image 601 (S75). The contact list display unit 18b assigns a sequential number to each pair of contact ID and terminal name (or a contact ID). The contact list display unit 18b obtains the contact IDs stored in the recording management table 1000b. The contact list display unit 18b additionally displays the recording site mark 71 in association with each contact ID obtained from the recording management table 1000b.

In the above-described embodiment, whether or not the participating terminal has been registered to the communication system 1 may be determined in various other ways. For example, at S73, the terminal state obtainer 55 may search the contact list management DB 5003 in the memory 5000, using the contact ID "01aa" obtained at S71 as a search key, to obtain the contact IDs of the request sender terminals 10 or 40 each registering the request sender terminal 10aa as a candidate counterpart terminal. Through the operation of FIG. 19, the recording site mark 71 is displayed on the information display image 601, to indicate the videoconferencing site that is recording. In any one of the above-described examples, in alternative to or in addition to displaying the recording site mark 71, the communication terminal 10aa may be caused to output a voice indicating the terminal name of the terminal that is recording. In such case, the communication terminal 10aa outputs the sound at a time determined based on the time when the recording start notification is received from such terminal that is recording. Alternatively, the communication terminal 10aa outputs the sound at a time determined based on the time when a user operation is performed on the communication terminal 10aa.

During display of the information display image 601, when the communication terminal 10aa receives the recording start notification, the recording end notification, or the terminal state change information, the site list display unit 18b of the display control 17 controls display of the recording site mark 71 in real-time.

In addition to or in alternative to the recording site mark 71, the label 73 may be displayed on the information display image 601.

Accordingly, while the communication terminal 10aa is having the videoconference with other videoconferencing sites, the user at the communication terminal 10aa is able to know whether each site (terminal 10 or 40) is recording or not, with the recording site mark 71. Since the recording site mark 71 is updated in real-time, the user at each terminal 10 or 40 can instantly know the recording site at a time when such site starts recording. The site that is recording may be checked with any one of the full-screen display image 501 and the information display image 601.

Referring to FIGS. 22 to 35, a communication system is described according to a second embodiment.

Figure 22:
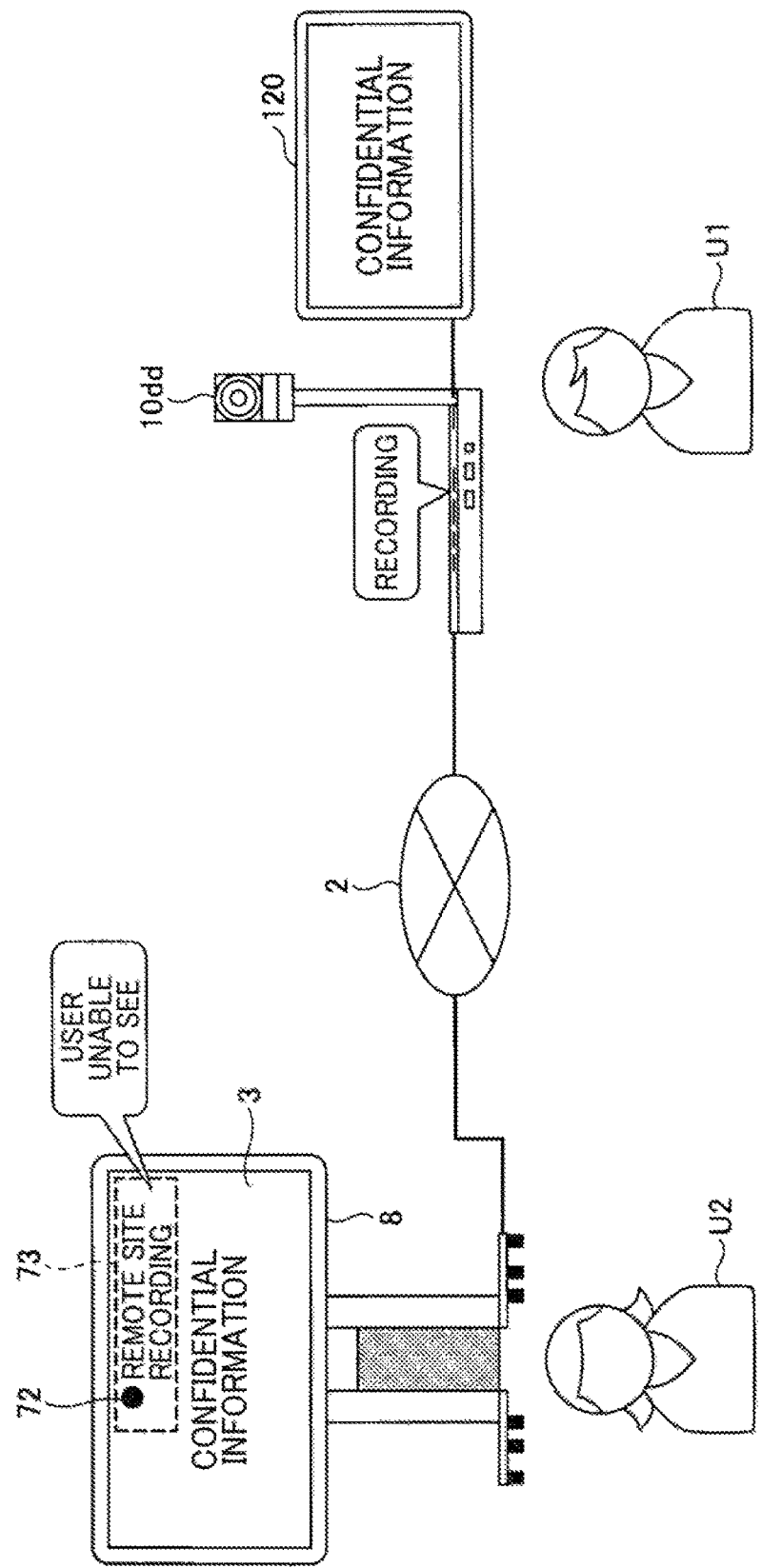
FIG. 22 is an illustration for explaining operation of the electronic whiteboard provided with the function of the communication terminal, according to an embodiment.

In this embodiment, as illustrated in FIG. 22, the communication system includes an electronic whiteboard 8 having the function of the communication terminal 10. The electronic whiteboard 8 displays, on a large-size display, a stroke image drawn onto a background image, according to a user input of characters, numerals, figures, etc. The electronic whiteboard 8 may be used at companies, educational organizations, government agencies, or other sectors.

The electronic whiteboard 8 is capable of displaying an image input from the outside, for example, in a manner that the input image is superimposed above or below the stroke image. Further, the electronic whiteboard 8 in this embodiment is provided with the function of the communication terminal 10, which enables transmission of the stroke image drawn onto the electronic whiteboard 8 to other terminal.

FIG. 22 is an illustration for explaining operation of the electronic whiteboard 8 provided with the function of the communication terminal 10. The electronic whiteboard 8 in one example operates as the general electronic whiteboard, and in another example operates as the communication terminal 10. The electronic whiteboard 8 communicates with other terminal (such as the communication terminal 10dd) to have a videoconference. In example operation, the electronic whiteboard 8 switches display between a stroke image drawn with electronic whiteboard application, and an image generated with videoconference application.

The stroke image usually requires a larger display size, such that even when the videoconference application is being activated, a state of the videoconference application is hardly noticeable by a user U2 at the electronic whiteboard 8. Thus, the user U2 can hardly see the change in state of the videoconference application, which operates on the electronic whiteboard 8.

For example, as illustrated in FIG. 22, during videoconferencing, the stroke image generated by the electronic whiteboard application on the electronic whiteboard 8 is transmitted to the counterpart communication terminal 10dd by the videoconference application for output to a user U1. It is assumed that the user U1 at the communication terminal 10dd starts recording. In such case, the videoconference application at the electronic whiteboard 8 receives the recording start notification from the terminal 10dd, and displays the recording notification information 80 (the recording site mark 71, the remote site recording mark 72, or the label 73). However, with the stroke image that occupies a large display area, the user U2 may not notice. For this reasons, confidential information may be accidentally recorded.

In FIG. 22, the drawing made by the user U2 on the electronic whiteboard 8, which is confidential information, is shared with the user U1 at the communication terminal 10dd. The videoconference application at the electronic whiteboard 8 continues to display the recording notification information 80 (the recording site mark 71, the remote site recording mark 72, or the label 73). However, depending on how the images are displayed on the electronic whiteboard 80, the user U2 can hardly see the recording notification information 80. Recording the confidential information may increase potential risks to companies or organizations, such as insider risk or any incident risk.

In view of this, in this embodiment, when the electronic whiteboard 8 having the function of the communication terminal 10 receives the recording start notification, the electronic whiteboard displays information generated by the videoconference application 710, on a display 3, in a manner that can be easily noticed by the user U2.

Figure 23A:
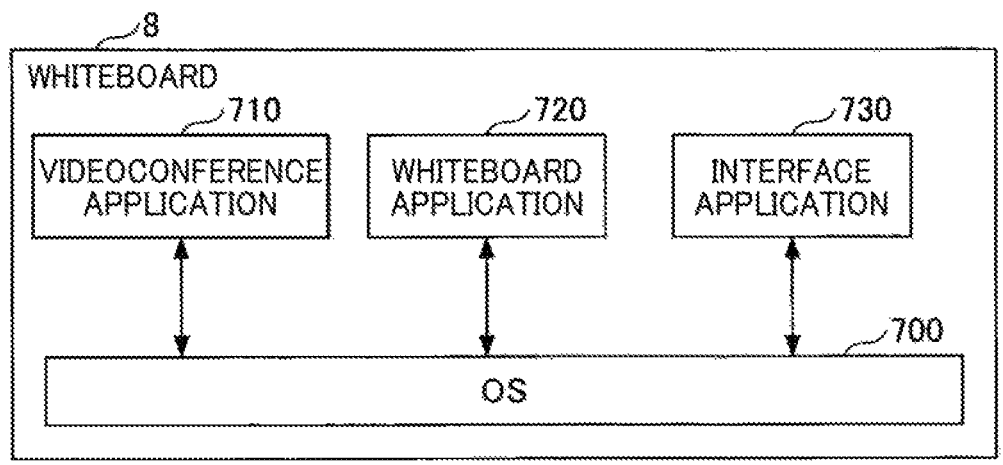
FIGS. 23A and 23B (FIG. 23) are a schematic diagram illustrating a software configuration of the electronic whiteboard according to an embodiment of the present invention.
Figure 23B:
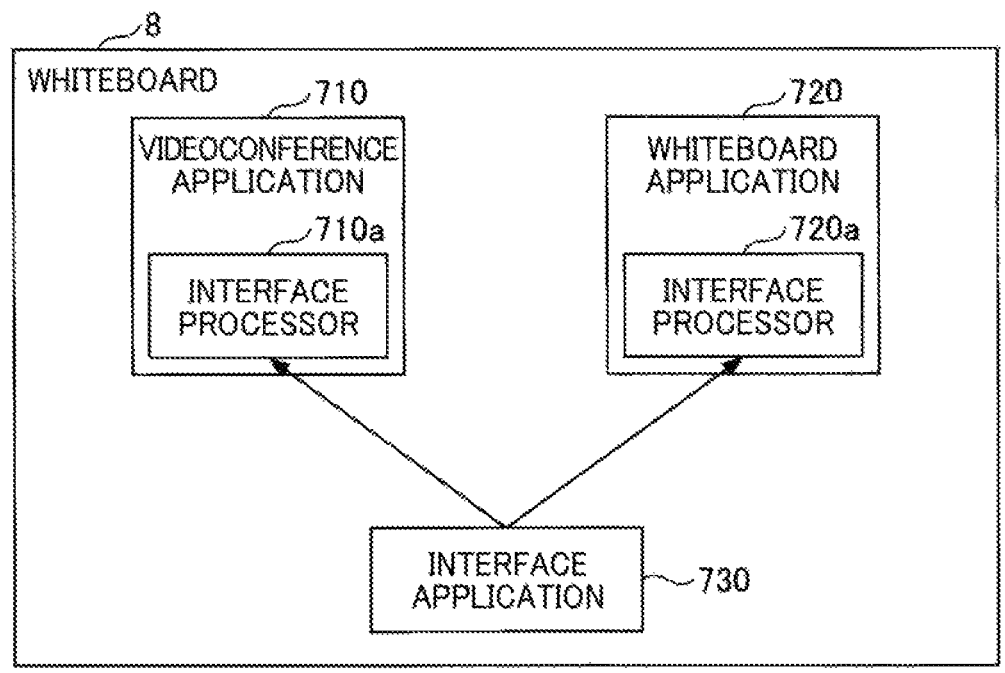

FIGS. 23A and 23B are a schematic diagram illustrating a software configuration of the electronic whiteboard 8 according to an embodiment of the present invention. As illustrated in FIG. 23A, the electronic whiteboard 8 includes videoconference application 710, electronic whiteboard application 720, and interface application 730. These application software run on an operating system (OS) 700. The OS 700 may be implemented by any desired operating system, such as Windows®, Linux®, and Android®.

The videoconference application 710 provides the function of the terminal 10 or 40, which is described above referring to FIGS. 1 to 21. The function of the electronic whiteboard application 720 is described below.

FIG. 23B is an illustration for explaining operation of the interface application 730. The interface application 730 functions as an interface for each of the videoconference application 710 and the electronic whiteboard application 720 that are independent from each other. The videoconference application 710 includes an interface processor 710a for communicating with the interface application 730. The electronic whiteboard application 720 includes an interface processor 720a for communicating with the interface application 730.

The interface application 730 communicates with the videoconference application 710 via the interface processor 710a. The interface application 730 communicates with the electronic whiteboard application 720 via the interface processor 720a. For example, the interface application 730 detects reception of the recording start notification by the videoconference application 710, the operating state indicating that the videoconference is being recorded, or the change in the recording management table, and sends a notification based on such detection to the electronic whiteboard application 720. With this notification, the electronic whiteboard application 720 is able to display that the other site is recording.

<Display Screen of Electronic Whiteboard>

FIG. 24 illustrates an example electronic whiteboard UI screen 740 generated with the electronic whiteboard 720, displayed on the display 3 of the electronic whiteboard 8. The electronic whiteboard UI screen 740 is a screen for displaying a stroke image drawn by the user. On the electronic whiteboard UI screen 740, the user is able to select a type or a color of a line to be drawn, figure to be drawn, or stamp to be added.

The screen of FIG. 24 includes an icon section 701, which displays a videoconference icon 702a. When the videoconference icon 702a is selected by the user, the electronic whiteboard 8 causes the display 3 to display a videoconference UI screen 750 that is generated with the videoconference application 710. That is, the electronic whiteboard 8 switches from the electronic whiteboard UI screen 740 to the videoconference UI screen 750, under control of the OS 700.

Figure 25:
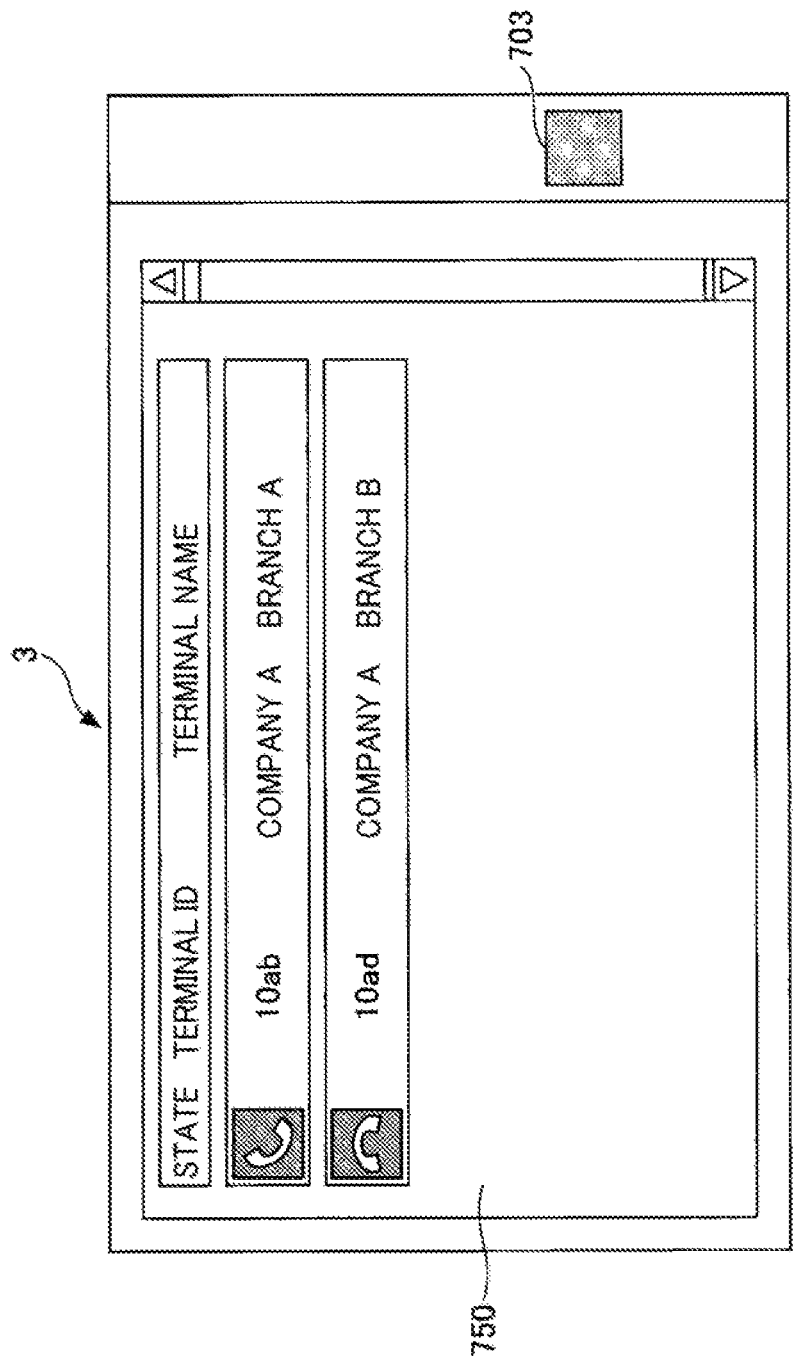
FIG. 25 is an illustration of an example videoconference UI screen generated with videoconference application, displayed on the display of the electronic whiteboard.

FIG. 25 illustrates an example videoconference UI screen 750 generated with the videoconference application 710, displayed on the display 3 of the electronic whiteboard 8. The videoconference UI screen 750 includes information similar to the information being displayed in the contact list screen of FIG. 11, and an electronic whiteboard icon 703. When the electronic whiteboard icon 703 is selected by the user, the electronic whiteboard 8 causes the display 3 to display the electronic whiteboard UI screen 740 generated with the electronic whiteboard application 720. That is, the electronic whiteboard 8 switches from the videoconference UI screen 750 to the electronic whiteboard UI screen 740, under control of the OS 700. Accordingly, the user is able to switch between the videoconference UI screen 750 and the electronic whiteboard UI screen 740.

In alternative to selectively displaying the videoconference UI screen 750 and the electronic whiteboard UI screen 740, both of the videoconference UI screen 750 and the electronic whiteboard UI screen 740 may be displayed at once while overlapping with each other. In such case, the remote site recording mark of the videoconference UI screen 750 may be caused to be hidden by the electronic whiteboard UI screen 740.

<Hardware Configuration of Electronic Whiteboard>

Figure 26:
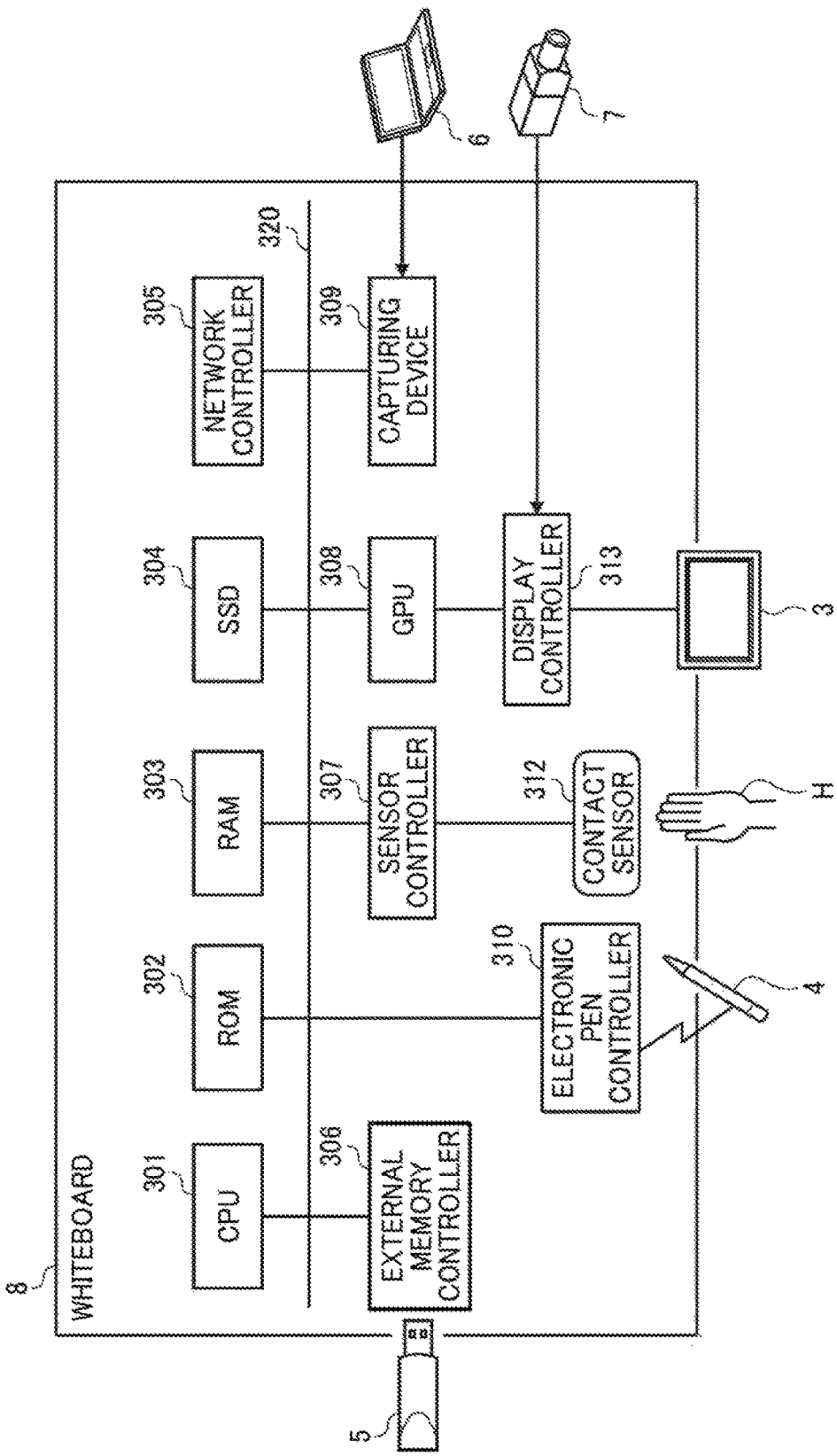
FIG. 26 is a schematic block diagram illustrating a hardware configuration of the electronic whiteboard, according to an embodiment.

FIG. 26 illustrates a hardware configuration of the electronic whiteboard 8, according to the embodiment. As illustrated in FIG. 26, the electronic whiteboard 8 includes a central processing unit (CPU) 301 that controls entire operation of the electronic whiteboard 8, a read only memory (ROM) 302 that stores a program for operating the CPU 301 such as an initial program loader (IPL), a random access memory (RAM) 303 that operates as a work area for the CPU 301, a solid state drive (SSD) 304 that controls reading or writing of various types of data including control program stared in a memory, a network controller 305 that controls communication via the communication network 2, and an external memory controller 306 that controls communication with a USB memory 5.

The electronic whiteboard 2 further includes a capturing device 309 that transmits image data (still or moving image) for display at a note PC 6, a graphics processing unit (GPU) 308 that processing graphics, and a display controller 313 that controls transmission of image data output from the GPU 212 to the display 3.

The electronic whiteboard 2 further includes a sensor controller 307 and a contact sensor 312. The sensor controller 307 controls operation of the contact sensor 312. The contact sensor 312 detects a touch onto the display 3 with the electronic pen 4 or the user's hand H. The contact sensor 312 senses a touch input to a specific coordinate on the display 3 using the infrared blocking system. More specifically, the display 3 is provided with two light receiving elements disposed on both upper side ends of the display 3, and a reflector frame. The light receiving elements emit a plurality of infrared rays in parallel to a touch panel of the display 3. The light receiving elements receive lights passing in the direction that is the same as an optical path of the emitted infrared rays, which are reflected by the reflector frame. The contact sensor 312 outputs an identifier (ID) of the infrared ray that is blocked by an object (such as the user's hand) after being emitted from the light receiving elements, to the sensor controller 307. Based on the ID of the infrared ray, the sensor controller 307 detects a specific coordinate that is touched.

The contact sensor 312 is not limited to the infrared blocking system type, and may be a different type of detector, such as a capacitance touch panel that identities the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display.

The electronic whiteboard 8 further includes an electronic pen controller 310. The electronic pen controller 310 communicates with the electronic pen 4 to detect a touch by the tip or bottom of the pen 4 to the display 3. In addition or in alternative to detecting a touch by the tip or bottom of the pen 4, the electronic pen controller 310 may also detect a touch by another part of the electronic pen 4, such as a part held by a hand.

The electronic whiteboard 8 further includes a bus line 320, such as an address bus or a data bus, which electrically connects the above-described elements illustrated in FIG. 26.

<Functional Configuration of Electronic Whiteboard Application>

Referring now to FIGS. 27 to 32, a functional configuration of the electronic whiteboard 8 is described according to the embodiment of the present invention. FIGS. 27A and 27B (FIG. 27) are a schematic block diagram illustrating a functional configuration of the electronic whiteboard 8.

The electronic whiteboard 8 includes an image obtainer 21, a coordinate detector 22, an automatic adjuster 23, a contact detector 24, an event classifier 25, an operation processor 26, a gesture processor 27, an image combiner 28, and an image processor 9. These functional elements indicated by a dotted line are implemented by activation of the videoconference application 710.

The image obtainer 21 obtains an output image, output from an image output device such as the note PC 6 connected to the cable. The image obtainer 21 analyzes an image signal of the output image to calculate a resolution of a frame of a display image generated based on the image signal of the output image, or image information such as an image frame rate. The analysis information is then output to the image obtainer 31.

The coordinate detector 22 detects a coordinate at which an event is detected due to a user operation on the display 3. For example, the user operation causing the event may be a touch on the display 3 with the user's hand H. The coordinate detector 22 also detects an area touched by the user's hand H, for example, based on the detected coordinates.

The automatic adjuster 23 is activated with activation of the electronic whiteboard 8, The automatic adjuster 23 adjusts image processing parameters of an optical sensor camera of the touch sensor 312, such that the touch sensor 312 is able to output a value suitable to the automatic detector 22.

The contact detector 24 detects an event due to a user operation on the display 3 via the electronic pen 4. For example, the user operation causing the event may be a touch on the display 3 with the tip or bottom of the electronic pen 4.

The event classifier 25 analyzes the event detected at the coordinate detector 22, and the event detected at the contact detector 24, to classify those detected events into a stroke drawing, a UI operation, and a gesture operation. Referring to FIG. 28, the stroke drawing, UI operation, and gesture operation are respectively explained. FIG. 28 illustrates example image layers, which may be displayed on the display 3.

The stroke drawing is drawn by the following event. The user presses the electronic pen 4 on the display 3, moves the electronic pen 4 on the display 3 while pressing, and leaves the electronic pen 4 from the display 3. With this stroke drawing, an alphabet "S" or "T" is drawn on the display 3. The stroke drawing may not only include the case of drawing an image, but also include operation of deleting a part of the image, or editing a part of the drawn image.

The UI operation corresponds to the following event. While the UI image (A) of FIG. 28 is being displayed on the display 3, the user presses a certain point or area with the electronic pen 4 or the user's hand H. With this UI operation, the user can select a color or a width of a line to be used for drawing with the electronic pen 4.

The gesture operation corresponds to the following event. While the stroke image (B) of FIG. 28 is being displayed, the user touches or moves an element on the stroke image (B) on the display 3, with the electronic pen 4 or the user's hand H. For example, with the gesture operation of moving the user's hand H while touching the display 3, the user is able to enlarge or reduce a size of the image being displayed, change a display size, or turns a display page.

Referring back to FIG. 27, the operation processor 26 performs the UI operation determined by the event classifier 25, on the UI element subject to that event causing the UI operation. Examples of such UI element include, but not limited to, a key, button, list, check box, and text box.

The gesture processor 27 performs the gesture operation determined by the event classifier 25.

The image combiner 28 outputs a combined image, which is combined by the display combiner 36, to the image output device (such as the display 3) for display. The image combiner 28 combines an image input from one image output device (such as the note PC 6), with other image input from other image output device (such as the camera 7), for example, using the picture-in-picture technique. The image combiner 28 may switch display of the display 3. For example, one image displayed as a part of the screen with the picture-in-picture technique may be displayed on the entire screen.

(Functional Configuration of Image Processor)

Next, a functional configuration of the image processor 9 is described in detail. The image combiner 9 combines a plurality of image layers as illustrated in FIG. 28.

The image processor 9 includes an image obtainer 31, stroke processor 32, UI image generator 33, background generator 34, layout manager 35, display combiner 36, page processor 37, file processor 42, and page data memory 300.

The image obtainer 31 obtains each frame of the image obtained by the image obtainer 21, as an output image. An example of the output image is displayed as an output image (C) in FIG. 28.

The stroke processor 32 draws an image, deletes at least a part of the image, or edits at least a part of the image, according to the stroke drawing that is classified by the event classifier 25. An example of the stroke image is displayed as a stroke image (B) in FIG. 28.

The UI image generator 33 generates a UI image, which is previously stored in the electronic whiteboard 8. An example of the UI image is displayed as a UI image (A) in FIG. 28.

The background generator 34 generates a background image to be displayed on the display 3. An example of the background image is displayed as a background image (D) in FIG. 28. The background image may have predetermined patterns such that the image is displayed in solid or grid.

The layout manager 35 manages layout information, which determines a layout of images respectively output from the image obtainer 31, stroke processor 32, UI image generator 33, and background generator 34. The layout information is to be referred to by the display combiner 36. The layout manager 35 sends the layout information to the display combiner 36, to instruct the display combiner 36, whether or not to display a specific image layer or an order of superimposing the image layers. The image layers include the output image (O), stroke image (B), UI image (A), and background image (D) as illustrated in FIG. 28.

The display combiner 36 combines the output image (C) output from the image obtainer 31, the stroke image (B) output from the stroke processor 32, the UI image (A) output from the UI image generator 33, and the background image (D) output from the background generator 34, according to the layout information determined by the layout manager 35. For example, as illustrated in FIG. 28, the UI image (A), the stroke image (B), the output image (C), and the background image (D) are superimposed one above the other in this order.

In another example, the display combiner 36 may display one of the output image (C) and the background image (D), as a background of the UI image (A) and the stroke image (B). For example, the cable for connecting the electronic whiteboard 8 and the image output device (such as the note PC 6) may be disconnected. In such case, the layout manager 35 instructs the display combiner 36 to display the background image (D), instead of the output image (C), with the UI image (A) and the stroke image (B) being displayed. Additionally, the display combiner 36 may enlarge or reduce a display size, or move a display area, of each one of the image layers.

The page processor 37 stores data of the stroke image (B) and the output image (C) in the page data memory 300 as one item of page data. The page processor 37 sends the page data read from the page data memory 300 to be display combiner 36 via the image obtainer 31, to cause the image combiner 28 to display again the page data on the display 3.

The page processor 37 sends the page data read from the page data memory 300 to the videoconference application 710 via the image obtainer 31, to cause the videoconference application 710 to send the page data to other electronic whiteboard 8 or communication terminal 10. The page data includes stroke arrangement data and medium data. In another example, the page processor 37 sends the page data to the stroke processor 32, to cause the stroke processor 32 to edit the stroke drawing. In another example, the page processor 37 deletes or copies the page data.

In case the page data is read from the page data memory 300, the page processor 37 segments the one item of page data into the stroke arrangement data represented by the stroke image (B) and the medium data represented by the background image (D). At the time when the page data is stored in the page data memory 300, the output image (C) to be displayed on the display 3 is stored in the page data memory 300. The page processor 37 then reads the output image (C) from the page data memory 300, as medium data represented by the background image (D). Of the page data read from the page data memory 300, the page processor 37 outputs the stroke arrangement data represented by the stroke image (B) to the stroke processor 32. The page processor 37 further outputs the medium data represented by the background image (D) to the image obtainer 31.

In this example, the page data memory 300 stores page data as illustrated in FIG. 29. FIG. 29 illustrates an example data structure of page data. The page data includes one-page data to be displayed on the display 3, which includes stroke arrangement data (items of stroke data for one character, etc.) and medium data. Referring to FIGS. 29 to 31, content of the page data is described, including various types of parameter included in the page data.

The file processor 42 restores page data, which is not stored, for example, when the electronic whiteboard 8 ends operation in error. For example, when operation normally ends, the file processor 42 obtains the page data from the page data memory 300, and stores the obtained page data in the USB 5 as a PDF file. Even in case operation ends in error due to shut-down of electric power, the page data is kept stored in the page data memory 300. When the power is turned on, the file processor 42 reads the page data from the page data memory 300. The file processor 42 reads the PDF file from the USB memory 5, and stores each page in the page data memory 300 as page data.

Now, page data is described in detail. As illustrated in FIG. 29, the page data includes a page data ID for identifying a specific page, start time when display of that page is started, end time when drawing to that page by a stroke drawing or a gesture is stopped, a stroke arrangement data ID for identifying stroke arrangement data, and a medium data ID for identifying medium data, in association with one another. The stroke arrangement data is a set of stroke drawings, which are made by the user with the electronic pen 4 or the user's hand H. The stroke arrangement data is to be used for displaying the stroke image (B) on the display 3, as illustrated in FIG. 28. The medium data is to be used for displaying the background image (D) on the display 3, as illustrated in FIG. 28.

For example, in case the user draws the alphabet "S" with the electronic pen 4 in one stroke, one stroke data ID is assigned to that stroke drawing "S". In case the user draws the alphabet "T" with the electronic pen 4 in two strokes, two stroke data IDs are assigned to those two stroke drawings "T".

The stroke arrangement data includes various information as illustrated in FIG. 30. FIG. 30 illustrates an example data structure of stroke arrangement data. As illustrated in FIG. 30, one stroke arrangement data includes a plurality of items of stroke data, each corresponding to a stroke drawing. Each stroke data includes a stroke data ID for identifying that stroke data, start time when drawing of that stroke starts, end time when drawing of that stroke ends, a color of the stroke, a width of the stroke, and a coordinate arrangement data ID for identifying arrangement of points of the stroke.

The coordinate arrangement data includes various information as illustrated in FIG. 31. FIG. 31 illustrates an example data structure of the coordinate arrangement data. As illustrated in FIG. 31, the coordinate arrangement data includes a single point (X coordinate value, Y coordinate value) on the display 3, difference time (ms) indicating a difference between the time when that point is drawn and the start time when drawing of the stroke starts, and pressure by the electronic pen 4 on that single point. That is, one item of coordinate arrangement data in FIG. 31 is a collection of single points in FIG. 30. For example, in case the user draws the alphabet "S" with the electronic pen 4 in one stroke, a plurality of points will be drawn, such that the coordinate arrangement data indicates those points in the stroke drawing.

The medium data of the page data in FIG. 29 includes various information as illustrated in FIG. 32. FIG. 32 illustrates an example data structure of medium data. As illustrated in FIG. 32, the medium data includes a medium data ID for identifying the medium data as managed with the table of FIG. 29, a type of the medium data, recording time when the medium data is recorded in the page data memory 300 by the page processor 37, a position of an image to be displayed on the display 3 based on the medium data (X coordinate, Y coordinate), a size of the image (width, height), and data indicating content of the medium data. The position of the image to be displayed based on the medium data indicates the upper left corner of that image, when the X and Y coordinates of the upper left corner of the display 3 are set to (0,0).

(Functional Configuration of Videoconference Application)

Next, a functional configuration of the videoconference application 710 is described. The videoconference application 710 controls communication of the electronic whiteboard 8, with other device such as the communication terminal 10, information processing terminal 40, UI providing apparatus 20, other electronic whiteboard 8, communication management apparatus 50, relay device 30, and program providing apparatus 90.

Figure 27A:
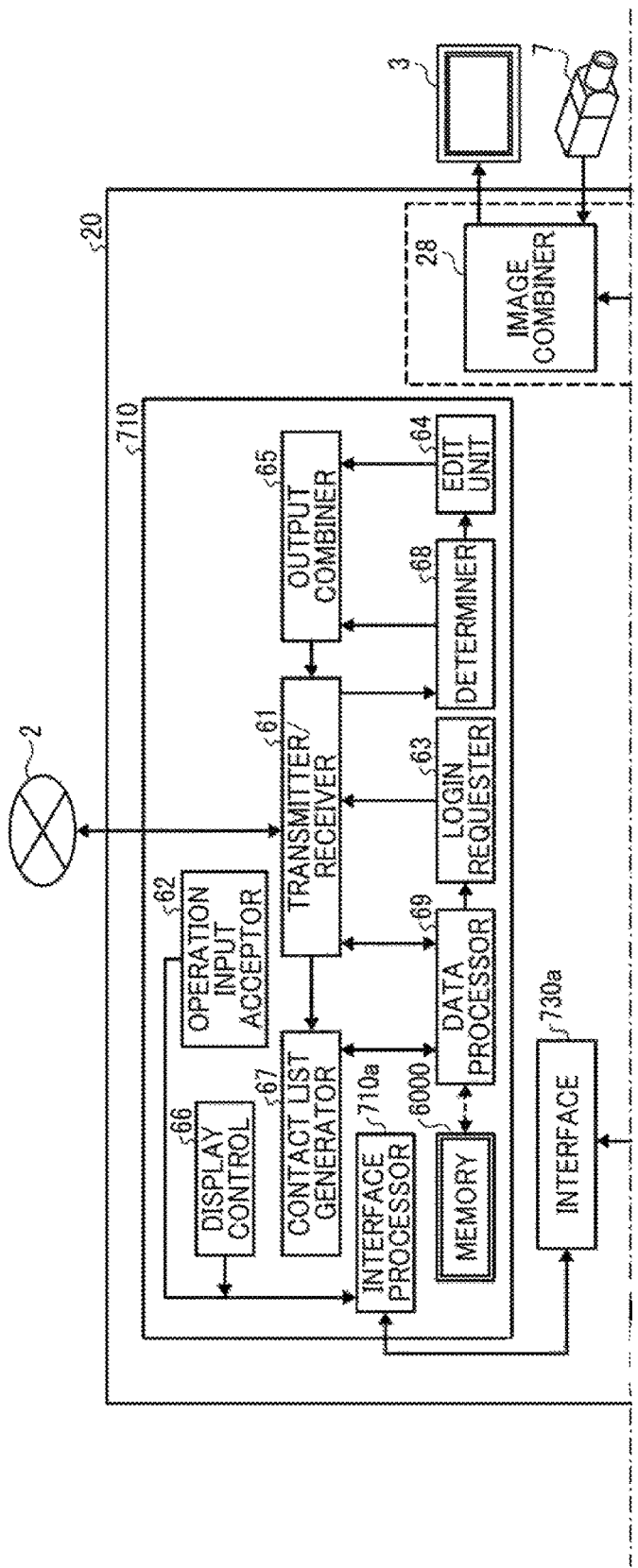
FIGS. 27A and 27B (FIG. 27) are a schematic block diagram illustrating a functional configuration of the electronic whiteboard, according to an embodiment.
Figure 27B:
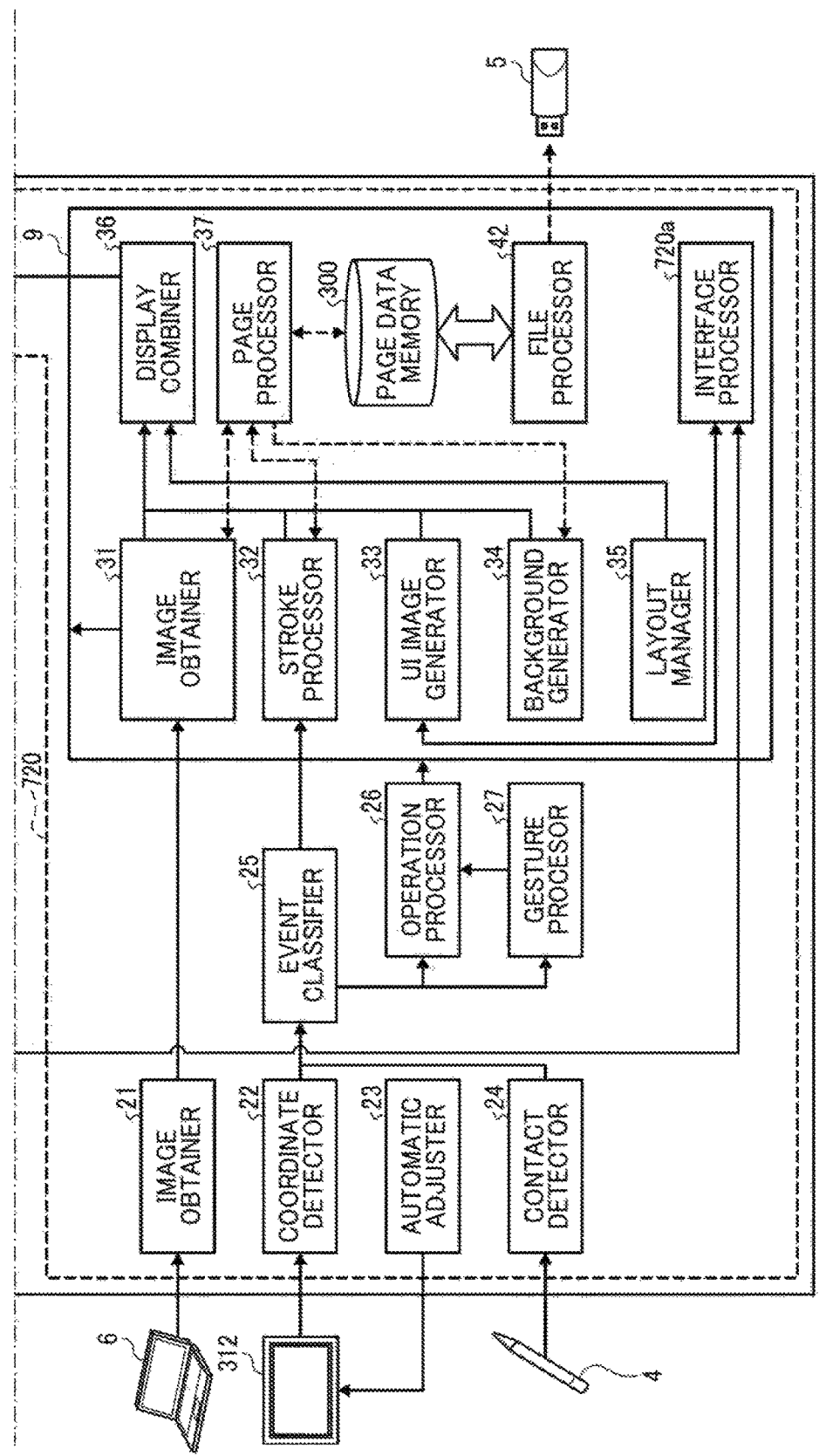

Referring to FIG. 27A, the videoconference application 710 includes a transmitter/receiver 61, operation input acceptor 62, login requester 63, edit unit 64, output combiner 65, display control 66, contact list generator 67, determiner 68, and data processor 69. The videoconference application 710 further includes a memory 6000 configured by the SSD 304 of FIG. 26.

The videoconference application 710 is substantially similar in function to the communication terminal 10 as illustrated in FIG. 6. More specifically, the transmitter/receiver 61, operation input acceptor 62, login requester 63, display control 66, contact list generator 67, and data processor 69 respectively correspond to the transmitter/receiver 11, operation input acceptor 12, login requester 13, contact list generator 16, display control 17, and data processor 19. The memory 6000 of the videoconference application 710 is similar in function to the memory 1000 of the communication terminal 10. For this reasons, description of the above-described functional units are omitted.

The edit unit 64 edits (applies processing on) the image data, when display capability information that is received by the transmitter/receiver 61 from an external terminal indicates that the external terminal is not capable of displaying an image in a predetermined format. For example, the display capability information indicates a screen size or an image resolution applicable to the terminal. In one example, the edit unit 64 obtains image data of a plurality of image layers that is superimposed one above the other, which includes the UI image (A) for enabling operation on the electronic whiteboard 8. The edit unit 64 cuts out operation image data of the UI image (A) by trimming, and enlarges a size of the operation image data to a size of the UI image (A) before trimming. The edit unit 64 may apply trimming, after enlarging a size of the entire UI image (A).

The output combiner 65 combines a plurality of image layers, in a substantially similar manner as described above for the display combiner 36.

The determiner 68 determines to edit the image data, when the display capability information of the external terminal that is received at the transmitter/receiver 61 indicates that the external terminal is not capable of displaying an image in a predetermined format. Based on this determination, the edit unit 64 edits the image data.

(Interface Application)

As illustrated in FIG. 27A, the electronic whiteboard 8 includes an interface 730a. The interface 730a is implemented by the instructions of the CPU 301 that controls hardware of FIG. 26 according to the interface application 730. At S203 and S204, the interface 730a monitors the data processor 69, which operates under control of the videoconference application 710, to determine whether the recording start notification is received via the interface processor 710a. This operation is performed every predetermined time. The interface 730a transmits a control signal to the OS 700, which instructs to display an image layer to be displayed on the top, which corresponds to specific application that is selected.

The videoconference application 710 includes an interface processor 710a. The interface processor 710a is implemented by the instructions of the CPU 301 that controls hardware of FIG. 26 according to the videoconference application 710. In response to selection of the electronic whiteboard icon 703, the interface processor 710a transmits an electronic whiteboard UI screen switch signal to the interface 730a, which indicates selection of the electronic whiteboard application 720. With this switch signal, the interface 730a causes the OS 700 to display the electronic whiteboard UI screen 740.

The electronic whiteboard application 720 includes an interface processor 720a. The interface processor 720a is implemented by the instructions of the CPU 301 that controls hardware of FIG. 26 according to the electronic whiteboard application 720. In response to selection of the videoconference application icon 702a, the interface processor 720a transmits a videoconference UI screen switch signal to the interface 730a, which indicates selection of the videoconference application 710. With this switch signal, the interface 730a causes the OS 700 to display the videoconference UI image 750.

<Operation>

Figure 33:
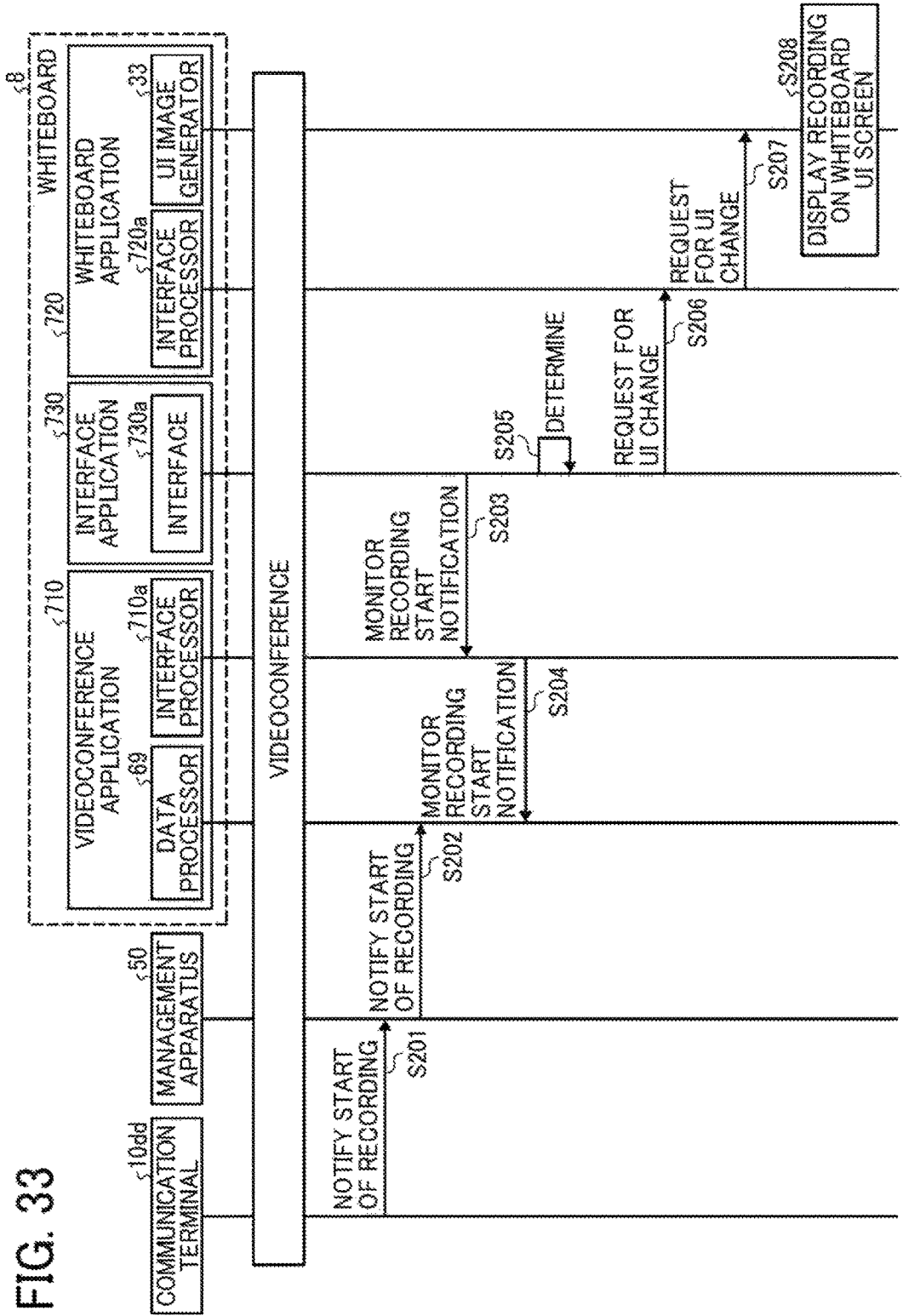
FIG. 33 is a data sequence diagram illustrating operation of controlling display, performed by the electronic whiteboard, when a recording start notification is received at the videoconference application on the electronic whiteboard, according to an embodiment.

FIG. 33 is a data sequence diagram illustrating operation of controlling display, performed by the electronic whiteboard 8, when a recording start notification is received at the videoconference application 710 on the electronic whiteboard 8 from the communication terminal 10dd. In FIG. 33, it is assumed that the videoconference is being performed after performing operation of FIGS. 8 and 9.

At S201, the communication terminal 10dd transmits a recording start notification to the communication management apparatus 50. The recording start notification is described above referring to FIG. 10.

At S202, the transmitter/receiver 51 of the communication management apparatus 50 transmits the recording start notification to the electronic whiteboard 8, which is having a videoconference with the communication terminal 10dd.

At S203 and S204, the interface 730a monitors the data processor 69, which operates under control of the videoconference application 710, to determine whether the recording start notification is received via the interface processor 710a. This operation is performed every predetermined time.

At S205, the interface 730a determines whether the videoconference application 710 receives the recording start notification for the first time. The videoconference application 710 stores the recording management table in the memory 6000. When no contact ID is stored in the recording management table, the interface 730a determines that the videoconference application 710 receives the recording start notification for the first time. With this determination of whether the recording start notification is received for the first time, the videoconference application 710 is not notified every time the recording start notification is received.

When it is determined that the videoconference application 710 receives the recording start notification for the first time, at S206 and S207, the interface 730a sends a UI change request to the UI image generator 33 via the interface processor 720a. The UI change request requests to cause the electronic whiteboard UI screen 740 to additionally display the operating state of the communication terminal 10dd. More specifically, the UI change request requests to display information indicating that the communication terminal 10dd is recording.

Figure 34:
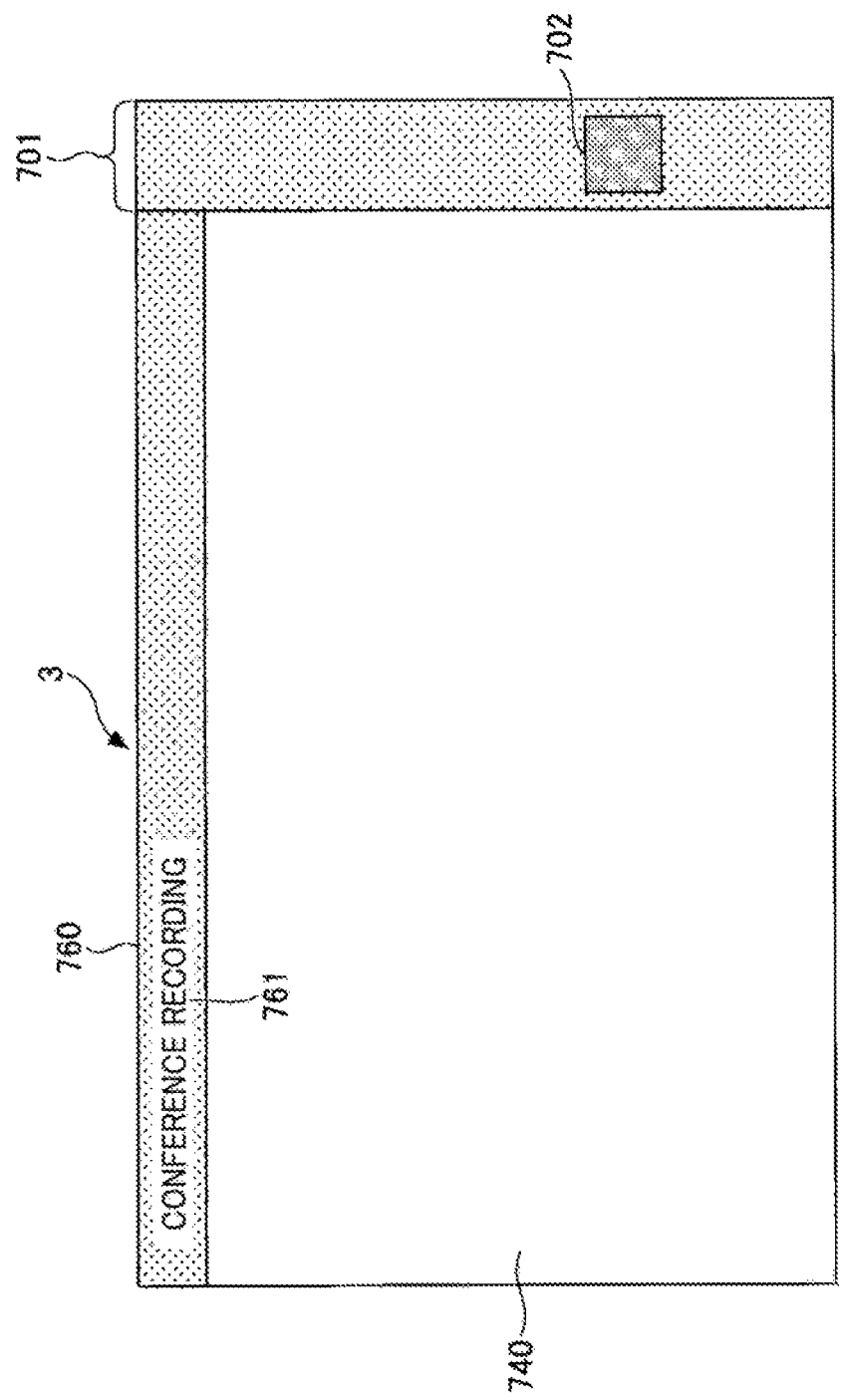
FIG. 34 is an illustration of an example electronic whiteboard UI screen, with a notification indicating that the other site is recording.

At S208, the UI image generator 33, which operates under control of the electronic whiteboard application 720, displays the electronic whiteboard UI screen 740, which additionally includes a notification indicating that the communication terminal 10dd is recording. FIG. 34 illustrates an example electronic whiteboard UI screen 740 with this notification.

At this time, the interface 730a does not have to transmit the videoconference UI screen switch signal to the OS 700. When the electronic whiteboard UI screen 740 is displayed on the display 3 of the electronic whiteboard 8, as long as the notification indicating that the communication terminal 10dd is recording is displayed at S208, the user can easily notice that the videoconference is being recorded. When the videoconference UI screen 750 is displayed on the display 3 of the electronic whiteboard 8, the recording site mark 71 or the remote site recording mark 72 is displayed on the full-screen display image 501 or the information display image 601. Accordingly, the user can easily notice that the videoconference is being recorded.

The interface 730a detects when the videoconference application 710 receives a recording end notification, in a substantially similar manner as described above. In such case, the interface 730a sends a UI change request to the UI image generator 33, which operates under control of the electronic whiteboard application 720. This UI change request requests to delete the notification indicating that the communication terminal 10dd is recording.

FIG. 34 illustrates an example of the electronic whiteboard UI screen 740, with the notification indicating that the other site is recording. The electronic whiteboard UI screen 740 of FIG. 34 includes a ticker section 760, which displays a text "conference recording" 761 ("text 761"). The ticker section 760, which is a part of the screen, displays information that is not related to content of the image being displayed. When displaying the ticker section 760, the size of the content being displayed may be reduced, while an aspect ratio of the content is being kept. This prevents the text 761, which is the notification, from overlaying the image (content) being displayed, thus improving visibility to the user.

In another example, the text 761 may be displayed at one of the corners or any portion on the edge of the electronic whiteboard UI screen 740. Since such display position is usually away from content (such as the stroke drawing), the size of the electronic whiteboard UI screen 740 may not be reduced.

In alternative to displaying the notification indicating that the recording is performed in the form of text 761 as illustrated in FIG. 34, the UI image generator 33 may display such notification in the form of blinking or changing a color of the videoconference icon 702a. In alternative to the text 761, the UI image generator 33 may display an icon indicating that the recording is being performed.

<Change in Display Order>

Figure 35:
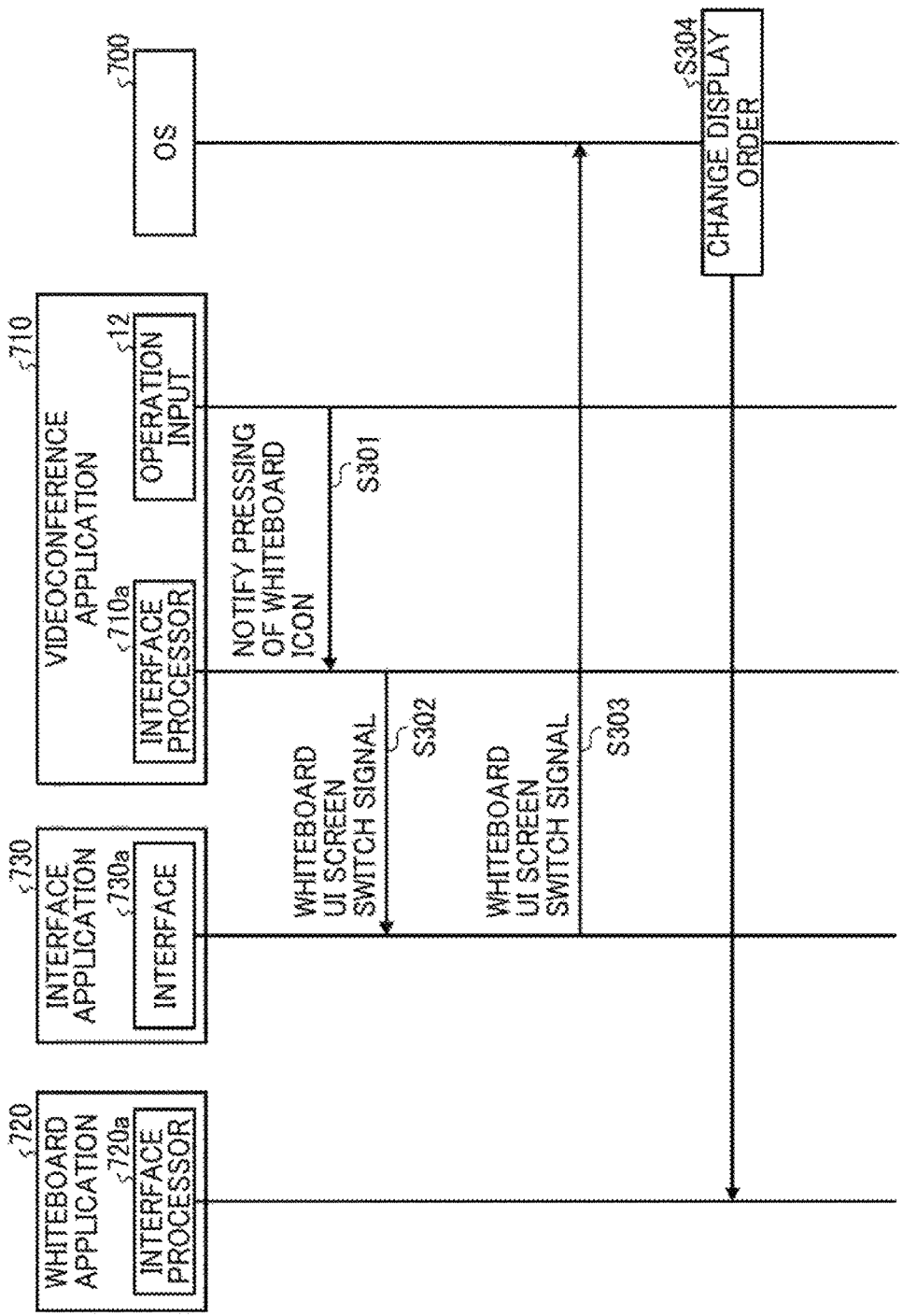
FIG. 35 is a data sequence diagram illustrating operation of changing the display order of the electronic whiteboard UI screen and the videoconference UI screen, performed by an interface of the electronic whiteboard, according to an embodiment.

Referring now to FIG. 35, operation of changing the order in displaying the electronic whiteboard UI screen 740 and the videoconference UI screen 750, is described according to an embodiment. FIG. 35 is a data sequence diagram illustrating operation of changing the display order of the electronic whiteboard UI screen 740 and the videoconference UI screen 750, performed by the interface 730a, according to an embodiment. The operation of FIG. 35 is performed during videoconferencing. It is assumed that the videoconference UI screen 750 is displayed on the display 3 of the electronic whiteboard 8.

When the user presses the electronic whiteboard icon 703 on the videoconference UI screen 750, at S301, the operation input acceptor 62 sends a notification indicating selection of the electronic whiteboard icon 703 to the interface processor 710a.

At S302, the interface processor 710a sends an electronic whiteboard UI screen switch signal to the interface 730a.

At S303, the interface 730a sends the electronic whiteboard UI screen switch signal to the OS 700.

At S304, the OS 700 causes the electronic whiteboard UI screen 740, which is generated by the image combiner 28 under control of the electronic whiteboard application 720, be displayed on the upper most layer on the display 3. The OS 700 further makes the electronic whiteboard UI screen 740 active. That is, the OS 700 causes the electronic whiteboard application 720 that generates the electronic whiteboard UI screen 740 be operable by the user. The OS 700 further assigns a higher priority level to the electronic whiteboard application 720, compared to a priority level assigned to other application. With this operation, the electronic whiteboard UI screen 740 is displayed on top on the display 3, while the videoconference application 710 is being active.

To display a screen controlled by the videoconference application 710, above a screen controlled by the electronic whiteboard application 720, the electronic whiteboard 8 performs operation in a substantially similar manner as described above referring to FIG. 35, except that the videoconference UI screen switch signal is output.

Accordingly, the user is able to switch between the electronic whiteboard application 720 and the videoconference application 710.

As described above in one or more embodiments, in response to a notification indicating that recording is started, or recording is being performed, the terminal displays information indicating that the videoconference is being recorded. That is, whenever there is at least one counterpart terminal that is recording, the terminal displays information indicating that the videoconference is being recorded. With this information, the user tends to be more careful not to disclose confidential information.

As described above in one or more embodiments, based on operating state information for each one of candidate counterpart terminals, the terminal displays, for each candidate counterpart terminal, whether recording is being performed. The user is able to instantly recognize that, before participating in a videoconference with a candidate counterpart terminal, whether the videoconference is being recorded. With this information, the user is able to decide whether to participate in such videoconference. For example, there may be a user who does not want to have his or her image being recorded.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, the relay device 30, communication management apparatus 50, and program providing apparatus 90 do not have to be independent from each other, such that any combination of two or more of these apparatuses may be configured by a single computer. Further, the functional units or the memories 1000, 2000, and 5000 of the communication terminal 10, communication management apparatus 50, and program providing apparatus 90 may be distributed over a plurality of computers. The function of the UI providing apparatus 20 may be implemented by any one of the communication terminal 10, communication management apparatus 50, and program providing apparatus 90.

In addition, although the case of a videoconference system has been described as an example of the communication system 1 in the above-described embodiment, the embodiment is not limited to this case, such that the communication system 1 may be a phone system such as an IP phone system or an Internet phone system.

The communication terminal 10 may communicate with the counterpart communication terminal 10, not via the communication management apparatus 50. For example, the communication terminal 10 may communicate using a communication protocol, such as Web RTC.

In another embodiment, the communication system 1 may be a car navigation system mounted on a mobile body. The communication terminal 10 may be connected to a PC for sharing images.

In addition, although image data and audio data are described as examples of content data in the above-described embodiment, the content data is not limited to these items of data, and the content data may be touch data. In this case, a feeling obtained by a user's contact at one terminal side is transmitted to the other terminal side.

Further, the content data may be smell data. In this case, a smell at one terminal side is transmitted to the other terminal side. In addition, the content data may be at least one of image data, audio data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

In any one of the above-described embodiments, a notification indicating that image data is being recorded is transmitted. Alternatively, a notification indicating that audio data is being recorded may be transmitted, for example, when only audio data is transmitted or received between the terminals.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
a transmitter to transmit content data to one or more counterpart information processing apparatuses through a network to have a communication with the one or more counterpart information processing apparatuses, the content data being at least one of image data and audio data;
a receiver to
receive, from a first information processing apparatus of the one or more counterpart information processing apparatuses, a recording start notification indicating that a first counterpart information processing apparatus starts recording or is recording the content data that is transmitted from the information processing apparatus, the recording start notification being transmitted separately from content data from the first information processing apparatus and being transmitted together with first identification information of the first counterpart information processing apparatus that is recording, and receive, before participating in a videoconference, operating state information indicating whether an information processing apparatus that is a candidate to be one of the one or more counterpart information processing apparatuses is in a recording state;

a memory to store the first identification information of the first counterpart information processing apparatus that is recording in response to the recording start notification; and circuitry to output, based on the recording start notification, notification information indicating that recording of the communication is being performed, in association with information regarding the first counterpart information processing apparatus, control a display to switch between a first screen and a second screen, the first screen including one or more images that are respectively generated based on image data transmitted from the one or more counterpart information processing apparatuses that are communicating with the information processing apparatus, and the second screen including information regarding the one or more counterpart information processing apparatuses that are communicating with the information processing apparatus, and receive the operating state information when switching from the first screen to the second screen, and displaying the second screen based on the received operating state information, wherein, when the circuitry determines that a memory stores the first identification information of at least one first counterpart information processing apparatus that is recording. the circuitry controls the display to display, in the first screen, the information indicating that recording of communication is being performed, and controls the display to display, in the second screen, the information indicating that the recording of the communication is being performed in association with the information regarding the at least one first counterpart information processing apparatus.

2. The information processing apparatus of claim 1, wherein, when the memory stores first identification information of a plurality of first counterpart information processing apparatuses each of which has transmitted the recording start notification, the circuitry displays on the display, for each one of the plurality of first counterpart information processing apparatuses that are recording, the notification information indicating that recording of the communication is being performed, in association with information regarding the first counterpart information processing apparatus.

3. The information processing apparatus of claim 2, wherein, when the circuitry determines that the memory stores the first identification information of the at least one first counterpart information processing apparatus that is recording, the circuitry continues to display on the display information indicating that recording of communication is being performed.

4. The information processing apparatus of claim 3, wherein, when the circuitry determines that the memory does not store any first identification information at a time when the receiver receives the recording start notification, such that only one first identification information is stored in response to the recording starting notification, the circuitry starts displaying, in the first screen, the information indicating that recording of communication is being performed, and the circuitry starts displaying, in the second screen, the information indicating that recording of communication is being performed in association with the information regarding the at least one first counterpart information processing apparatus.

5. The information processing apparatus of claim 3, wherein the receiver further receives a recording end notification indicating that the first counterpart information processing apparatus ends recording the content data, the recording end notification being transmitted with the first identification information of the first counterpart information processing apparatus that has been recording but ends recording, the circuitry deletes from the memory the first identification information of the first counterpart information processing apparatus that has transmitted the recording end notification, and when the circuitry determines that the memory stores no more first identification information, the circuitry stops displaying, in the first screen or the second screen, the information indicating that recording is being performed.

6. The information processing apparatus of claim 5, wherein, when the receiver further receives state change information indicating that the first counterpart information processing apparatus is not capable of communicating in response to a request transmitted from the information processing apparatus, the circuitry deletes from the memory the first identification information of the first counterpart information processing apparatus that is not capable of communicating.

7. The information processing apparatus of claim 1, wherein the receiver further receives, from a communication management apparatus, other operating state information indicating a current operating state of each one of a plurality of candidate counterpart information processing apparatuses capable of communicating with the information processing apparatus, the current operating state including information indicating whether or not a counterpart information processing apparatus is recording, and the circuitry controls the display to display, for each one of the plurality of candidate counterpart information processing apparatuses, information indicating whether or not recording of the communication is being performed, based on the other operating state information.

8. The information processing apparatus of claim 7, wherein, in response to a user selection of the first counterpart information processing apparatus that is recording from the plurality of candidate counterpart information processing apparatuses, the circuitry controls the display to display a confirmation screen that confirms participation in the communication being recorded.

9. The information processing apparatus of claim 1, wherein the second screen including an image generated at the information processing apparatus according to a user input to the information processing apparatus, and when the receiver receives the recording start notification, the circuitry displays, in the second screen, the information indicating that recording is being performed.

10. The information processing apparatus of claim 9, wherein
the first screen and the second screen are superimposed one above the other when displayed on the display, and
the circuitry controls the display to display one of the first screen and the second screen on an upper most layer.

11. A communication system comprising:
the information processing apparatus of claim 1; and
the first information processing apparatus capable of recording the content data transmitted from the information processing apparatus, the first information processing apparatus including:
a recording device that records at least one of the image data and the audio data; and
a transmitter that transmits the recording start notification to the information processing apparatus.

12. A communication system comprising:
the information processing apparatus of claim 7; and
the communication management apparatus that controls communication between the information processing apparatus and the one or more counterpart information processing apparatuses, the communication management apparatus including:
a memory that stores:
counterpart information indicating the plurality of candidate counterpart information processing apparatuses each capable of communicating with the information processing apparatus; and
the other operating state information indicating a current operating state of each one of the plurality of candidate counterpart information processing apparatuses, the current operating state including the information indicating whether or not recording of the communication is being performed; and
a transmitter that transmits the other operating state information to the information processing apparatus.

13. The communication system of claim 12, wherein
the communication management apparatus stores the operating state including the information indicating recording of the communication is being performed, for each one of the one or more counterpart information processing apparatuses that are participating in the same communication with the first counterpart information processing apparatus that is recording, and
the information processing apparatus displays on the display, for each one of the candidate counterpart information processing apparatuses that are participating in the same communication, information indicating that recording of the communication is being performed, even when the candidate counterpart information processing apparatus is not recording.

14. An information processing method comprising:
transmitting content data to one or more counterpart information processing apparatuses through a network to have a communication with the one or more counterpart information processing apparatuses, the content data being at least one of image data and audio data;
receiving, from a first information processing apparatus of the one or more counterpart information processing apparatuses, a recording start notification indicating that a first counterpart information processing apparatus starts recording or is recording the content data that is transmitted separately from content data from the first information processing apparatus and being transmitted together from the information processing apparatus, the recording start notification being transmitted with first identification information of the first counterpart information processing apparatus that is recording;
receiving, before participating in a videoconference, operating state information indicating whether an information processing apparatus that is a candidate to be one of the one or more counterpart information processing apparatuses is in a recording state;
storing, in a memory, the first identification information of the first counterpart information processing apparatus that is recording in response to the recording start notification;
outputting, based on the recording start notification, notification information indicating that recording of the communication is being performed, in association with information regarding the first counterpart information processing apparatus:
controlling a display to switch between a first screen and a second screen, the first screen including one or more images that are respectively generated based on image data transmitted from the one or more counterpart information processing apparatuses that are communicating with the information processing apparatus, and the second screen including information regarding the one or more counterpart information processing apparatuses that are communicating with the information processing apparatus; and
receiving the operating state information when switching from the first screen to the second screen, and displaying the second screen based on the received operating state information, wherein
when the circuitry determines that a memory stores the first identification information of at least one first counterpart information processing apparatus that is recording, the circuitry
controls the display to display, in the first screen, the information indicating that recording of communication is being performed, and
controls the display to display, in the second screen, the information indicating that the recording of the communication is being performed in association with the information regarding the at least one first counterpart information processing apparatus.

15. A non-transitory recording medium which, when executed by one or more processors, cause the processors to perform an information processing method, the method comprising:
transmitting content data to one or more counterpart information processing apparatuses through a network to have a communication with the one or more counterpart information processing apparatuses, the content data being at least one of image data and audio data;
receiving, from a first information processing apparatus of the one or more counterpart information processing apparatuses, a recording start notification indicating that the first counterpart information processing apparatus starts recording or is recording the content data that is transmitted from the information processing apparatus, the recording start notification being transmitted separately from content data from the first information processing apparatus and being transmitted together with first identification information of a first counterpart information processing apparatus that is recording;

receiving, before participating in a videoconference, operating state information indicating whether an information processing apparatus that is a candidate to be one of the one or more counterpart information processing apparatuses is in a recording state;

storing, in a memory, the first identification information of the first counterpart information processing apparatus that is recording in response to the recording start notification;

outputting, based on the recording start notification, notification information indicating that recording of the communication is being performed, in association with information regarding the first counterpart information processing apparatus;

controlling a display to switch between a first screen and a second screen, the first screen including one or more images that are respectively generated based on image data transmitted from the one or more counterpart information processing apparatuses that are communicating with the information processing apparatus, and the second screen including information regarding the one or more counterpart information processing apparatuses that are communicating with the information processing apparatus; and receiving the operating state information when switching from the first screen to the second screen, and displaying the second screen based on the received operating state information, wherein when circuitry determines that a memory stores the first identification information of at least one first counterpart information processing apparatus that is recording, the circuitry controls the display to display, in the first screen, the information indicating that recording of communication is being performed, and controls the display to display, in the second screen, the information indicating that the recording of the communication is being performed in association with the information regarding the at least one first counterpart information processing apparatus.

* * * * *